US012764485B2

(12) United States Patent
Disch et al.

(10) Patent No.: US 12,764,485 B2
(45) **Date of Patent: *Oct. 13, 2026**

(54) MULTI-CHANNEL DECORRELATOR, MULTI-CHANNEL AUDIO DECODER, MULTI-CHANNEL AUDIO ENCODER, METHODS AND COMPUTER PROGRAM USING A PREMIX OF DECORRELATOR INPUT SIGNALS

(71) Applicant: Fraunhofer-Gesellschaft zur Foerderung der angewandten Forschung e.V., Munich (DE)

(72) Inventors: Sascha Disch, Fuerth (DE); Harald Fuchs, Roettenbach (DE); Oliver Hellmuth, Budenhof (DE); Juergen Herre, Erlangen (DE); Adrian Murtaza, Craiova (RO); Jouni Paulus, Nuremberg (DE); Falko Ridderbusch, Augsburg (DE); Leon Terentiv, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/459,904

(22) Filed: Aug. 27, 2021

(65) Prior Publication Data

US 2022/0167102 A1 May 26, 2022

Related U.S. Application Data

(63) Continuation of application No. 15/004,738, filed on Jan. 22, 2016, now Pat. No. 11,115,770, which is a (Continued)

(30) Foreign Application Priority Data

Jul. 22, 2013 (EP) .................................... 13177374
Oct. 18, 2013 (EP) .................................... 13189339

(51) Int. Cl.
*H04S 3/02* (2006.01)
*G10L 19/008* (2013.01)
(Continued)

(52) U.S. Cl.
CPC .............. *H04S 3/02* (2013.01); *G10L 19/008* (2013.01); *G10L 19/032* (2013.01); *G10L 19/20* (2013.01);
(Continued)

(58) Field of Classification Search
CPC .............. H04S 3/02; H04S 3/008; H04S 3/00; H04S 5/005; H04S 5/00; H04S 1/007;
(Continued)

(56) References Cited

U.S. PATENT DOCUMENTS 8,255,228 B2 8/2012 Hilpert et al.
8,588,427 B2 11/2013 Uhle et al.
(Continued)

FOREIGN PATENT DOCUMENTS

CN 1926607 A 3/2007
CN 101010723 A 8/2007
(Continued)

OTHER PUBLICATIONS

Taiwanese Office Action dated Jan. 26, 2016, Taiwan Patent Appl. No. 103124969 with English Translation.
(Continued)

*Primary Examiner* — Leshui Zhang
(74) *Attorney, Agent, or Firm* — Ashurst Perkins Coie US LLP; Michael A. Glenn

(57) ABSTRACT

A multi-channel decorrelator for providing a plurality of decorrelated signals on the basis of a plurality of decorrelator input signals is configured to premix a first set of N decorrelator input signals into a second set of K decorrelator input signals, wherein K<N. The multi-channel decorrelator is configured to provide a first set of K' decorrelator output signals on the basis of the second set of K decorrelator input signals. The multi-channel decorrelator is further configured to upmix the first set of K' decorrelator output signals into a second set of N' decorrelator output signals, wherein N'>K'. The multi-channel decorrelator can be used in a multi-channel audio decoder. A multi-channel audio encoder provides complexity control information for the multi-channel decorrelator.

9 Claims, 40 Drawing Sheets

Related U.S. Application Data continuation of application No. PCT/EP2014/065395, filed on Jul. 17, 2014.

(51) Int. Cl.

| | |
|---|---|
| ***G10L 19/032*** | (2013.01) |
| ***G10L 19/20*** | (2013.01) |
| ***G10L 19/22*** | (2013.01) |
| ***G10L 19/26*** | (2013.01) |
| ***H04S 3/00*** | (2006.01) |

(52) U.S. Cl.

CPC ............ *G10L 19/22* (2013.01); *G10L 19/265* (2013.01); *H04S 3/008* (2013.01); *H04S 2400/03* (2013.01); *H04S 2400/11* (2013.01); *H04S 2420/03* (2013.01)

(58) Field of Classification Search

CPC .... H04S 1/00; H04S 2400/03; H04S 2400/11; H04S 2420/03; G10L 21/0316; G10L 19/032; G10L 19/20; G10L 19/22; G10L 19/265; G10L 19/26; G10L 19/008; G10L 19/00; G10L 19/0018; G10L 19/08; G10H 1/183; G10H 1/18

USPC ... 381/1–23, 61, 63, 300–311, 119, 123, 77, 381/80, 81, 82, 85, 86; 704/500–504; 700/94

See application file for complete search history.

(56) References Cited

U.S. PATENT DOCUMENTS

| | | | |
|---|---|---|---|
| 8,818,764 | B2 | 8/2014 | Kishi et al. |
| 2006/0083385 | A1 | 4/2006 | Allamanche et al. |
| 2006/0165238 | A1 | 7/2006 | Spille et al. |
| 2007/0121954 | A1 | 5/2007 | Kim et al. |
| 2007/0189426 | A1 | 8/2007 | Kim et al. |
| 2007/0194952 | A1 | 8/2007 | Breebaart et al. |
| 2007/0233296 | A1 | 10/2007 | Kim et al. |
| 2007/0236858 | A1 | 10/2007 | Disch et al. |
| 2008/0097750 | A1 | 4/2008 | Seefeldt et al. |
| 2008/0126104 | A1 | 5/2008 | Seefeldt et al. |
| 2009/0003635 | A1 | 1/2009 | Pang et al. |
| 2009/0080666 | A1 | 3/2009 | Uhle et al. |
| 2009/0110203 | A1 | 4/2009 | Taleb |
| 2009/0147975 | A1 | 6/2009 | Horbach et al. |
| 2009/0185693 | A1 | 7/2009 | Johnston et al. |
| 2009/0194756 | A1 | 8/2009 | Kau et al. |
| 2009/0240503 | A1 | 9/2009 | Miyasaka et al. |
| 2009/0262949 | A1* | 10/2009 | Takagi .................. G10L 19/008 381/63 |
| 2009/0274308 | A1 | 11/2009 | Oh et al. |
| 2010/0094631 | A1* | 4/2010 | Engdegard ............ G10L 19/008 704/258 |
| 2010/0153118 | A1 | 6/2010 | Hotho et al. |
| 2010/0226500 | A1 | 9/2010 | Wang et al. |
| 2010/0329466 | A1 | 12/2010 | Berge |
| 2011/0013790 | A1 | 1/2011 | Hilpert et al. |
| 2011/0022402 | A1 | 1/2011 | Engdegard et al. |
| 2011/0091045 | A1 | 4/2011 | Schuijers et al. |
| 2011/0106543 | A1 | 5/2011 | Jaillet et al. |
| 2011/0182432 | A1 | 7/2011 | Ishikawa et al. |
| 2011/0194712 | A1 | 8/2011 | Potard |
| 2011/0255714 | A1 | 10/2011 | Neusinger et al. |
| 2011/0264456 | A1 | 10/2011 | Koppens et al. |
| 2012/0076308 | A1* | 3/2012 | Kuech ...................... H04R 3/02 381/66 |
| 2012/0143613 | A1* | 6/2012 | Herre .................... G10L 19/008 704/500 |
| 2012/0177204 | A1 | 7/2012 | Hellmuth et al. |
| 2012/0207307 | A1 | 8/2012 | Engdegard et al. |
| 2013/0138446 | A1 | 5/2013 | Hellmuth et al. |
| 2015/0296086 | A1* | 10/2015 | Eckert ...................... H04S 5/00 381/17 |
| 2016/0005406 | A1 | 1/2016 | Yen et al. |
| 2016/0157039 | A1 | 6/2016 | Disch et al. |

FOREIGN PATENT DOCUMENTS

| | | | |
|---|---|---|---|
| CN | 101061751 | A | 10/2007 |
| CN | 101809654 | A | 8/2010 |
| CN | 101911732 | A | 12/2010 |
| CN | 101933344 | A | 12/2010 |
| EP | 2093911 | A2 | 8/2009 |
| EP | 2102856 | A1 | 9/2009 |
| EP | 2225893 | B1 | 9/2012 |
| EP | 2495723 | A1 | 9/2012 |
| JP | 2009531724 | A | 9/2009 |
| JP | 2009539283 | A | 11/2009 |
| JP | 2010507114 | A | 3/2010 |
| JP | 2010525403 | A | 7/2010 |
| JP | 2012505575 | A | 3/2012 |
| JP | 2012530952 | A | 12/2012 |
| KR | 20070094422 | A | 9/2007 |
| RU | 2011100135 | A | 7/2012 |
| TW | 200627380 | A | 8/2006 |
| TW | 200803190 | A | 1/2008 |
| TW | 200828269 | A | 7/2008 |
| TW | 200915300 | A | 4/2009 |
| TW | 201108204 | A | 3/2011 |
| WO | 2006026452 | A1 | 3/2006 |
| WO | 2007109338 | A1 | 9/2007 |
| WO | 2007140809 | A1 | 12/2007 |
| WO | 2008069593 | A1 | 6/2008 |
| WO | 2008131903 | A1 | 11/2008 |
| WO | 2012009851 | A1 | 1/2012 |
| WO | 2012025282 | A1 | 3/2012 |
| WO | 2012025283 | A1 | 3/2012 |
| WO | 2013064957 | A1 | 5/2013 |
| WO | 2014126689 | A1 | 8/2014 |

OTHER PUBLICATIONS

"ISO/IEC 23003-1: 2006(E), Part 1: MPEG Surround" , 75. MPEG Meeting; Jan. 16-20, 2006; Bangkok; No. 7947 , Mar. 3, 2006 , pp. 1-289.

"ISO/IEC 23003-1:2006/FCD, Mpeg Surround", Motion Pictureexpert Group or ISO/IEC JTC1/SC29/WG11; No. N7947 , Jan. 16-20, 2006 , pp. 1-178.

"ISO/IEC 23003-2, 1st edit, Part 2: Spatial Audio Object Coding SAOC" , , Oct. 1, 2010.

"ISO/IEC FDIS 23003-2: 2010, Spatial Audio Object Coding" , Motion Picture Expertgroup or ISO/IEC JTC1/SC29/WG11 No. N11207, ISSN 0000-0030, XP030017704 [DA] 3 *Section 3.1.1*, Jan. 18-22, 2010 , pp. 79-127.

"Spatial Audio Object Coding SAOC—The Upcoming MPEG Standard on Parametric Object Based Audio Coding" , Audio Engineering Society Convention Paper presented at the 124th Convention , May 17-20, 2008 , pp. 1-15.

(56) References Cited

OTHER PUBLICATIONS

Blauert, Jens , "Spatial Hearing—The Psychophysics of Human Sound Localization" , Revised Edition, The MIT Press, London , 8 pages.
Breebaart, J , et al. , "MPEG Spatial Audio Coding/MPEG Surround: Overview and Current Status" , Audio Engineering Society Convention Paper presented at the 119th Convention , pp. 1-17.
Breebart, J., et al. , "MPEG Spatial Audio Coding/MPEG Surround: Overview and Current Status" , Convention Paper 6599; Presented at the 119th Convention Oct. 7-10, 2005, New York, NY, USA , 1-17.
Engdegard, Jonas , et al. , "Spatial Audio Object Coding (SAOC)—The Upcoming MPEG Standard on Parametric Object Based Audio Coding" , 124th AES Convention, Amsterdam , 15 pages.
Faller, Christof , et al. , "Binaural Cue Coding—Part II: Schemes and applications" , IEEE Trans. on Speech and Audio Proc., vol. 11, No. 6 , pp. 520-531.
Faller, Christof , "Parametric Joint-Coding of Audio Sources" , AES Convention Paper 6752, Presented at the 120th Convention, Paris, France , 12 pages.
Girin, Laurent , et al. , "Informed Audio Source Separation from Compressed Linear Stereo Mixtures" , AES 42nd International Conference: Semantic Audio, Ilmenau, Germany , 10 pages.
Herre, Jurgen , et al. , "From SAC to SAOC—Recent Developments in Parametric Coding of Spatial Audio" , Fraunhofer Institute for Integrated Circuits, Illusions in Sound, AES 22nd UK Conference 2007, , pp. 12-1-12-8.
Herre, Jurgen , et al. , "MPEG Surround—The ISO/MPEG Standard for Efficient and Compatible Multi-Channel Audio Coding" , Audio Engineering Society Convention Paper presented at the 122nd Convention , pp. 1-23.
Herre, Jurgen , et al. , "MPEG Surround—The ISO/MPEG Standard for Efficient and Compatible Multichannel Audio Coding" , J. Audio Eng. Soc., vol. 56, No. 11, Nov. 2008, pp. 932-955.
Herre, Jurgen , et al. , "New Concepts in Parametric Coding of Spatial Audio: From SAC to SAOC", IEEE International Conference on Multimedia and Expo; ISBN 978-1-4244-1016-3 , pp. 1894-1897.
ISO/IEC , "Information Technology—MPEG Audio Technologies—Part 1: MPEG Surround" , ISO/IEC FDIS 23003-1:2006(E), ISO/IEC JTC 1/SC 29/WG11 , Jul. 21, 2006 , 289 pages.
ISO/IEC , "Information Technology: Generic coding of moving pictures an associated audio information" , Part 7: Advanced Audio Coding AAC , 2003 , 198 pages.
ISO/IEC , "Information Technology-MPEG Audio Technologies—Part 1: MPEG Surround" , ISO/IED 23003-1:2007(E) , Feb. 15, 2007 , 288 pages.
ISO/IEC , "Informational Technology-MPEG audio technologies Part 2: Spatial Audio Object Coding (SAOC)" , ISO/IEC 23003-2 1st Edition Oct. 1, 2010 , Oct. 1, 2010 , 138 pages.
ISO/IEC , "MPEG audio technologies—Part 2: Spatial Audio Object Coding (SAOC)" , ISO/IEC JTC1/SC29/WG11 (MPEG) International Standard 23003-2. , Oct. 1, 2010 , pp. 1-130.
ISO/IEC 23003-1 , "2006/FCD, MEPEG Surround, 75. MPEG Meeting" , (Motion Picture Expert Group or ISO/IEC JTC1/SC29/WG11), Mar. 3, 2006, NR:N7947 , Mar. 3, 2006.
ISO/IEC 23003-1: 2007 , "Information technology—MPEG audio technologies—Part 1 : MPEG Surround" , ISO/IEC JTC1/SC29/WG11 (MPEG) International Standard: , Feb. 15, 2007 , 288 pages.
ISO/IEC 23003-1:2006 , "MPEG Surround" , MPEG Meeting, Jan. 16-Jan. 20, 2006, Bangkok; Motion Picture Expert Group or ISO/IEC JTC1/ SC29/ WG11 , Mar. 3, 2006.
ISO/IEC 23003-3 , "Information Technology—MPEG audio technologies—Part 3: Unified Speech and Audio Coding" , , 286 pages.
Lang, Yue , et al. , "Novel Low Complexity Coherence Estimation and Synthesis Algorithms for Parametric Stereo Coding" , Huawei European Research Center, Germany. Illusonic GmbH, Switzerland. , pp. 2427-2431.
Liutkus, Antoine , et al. , "Informed source separation through spectrogram coding and data embedding" , Signal Processing Journal , 30 pages.
Ozerov, Alexey , et al. , "Informed source separation: source coding meets source separation" , IEEE Workshop on Applications of Signal Processing to Audio and Acoustics , 4 pages.
Parvaix, Mathieu , et al. , "A Watermarking-Based Method for Informed Source Separation of Audio Signals With a Single Sensor" , IEEE Transactions on Audio, Speech and Language Processing, vol. 18, No. 6 , pp. 1464-1475.
Parvaix, Mathieu , et al. , "Informed Source Separation of underdetermined instantaneous Stereo Mixtures using Source Index Embedding" , IEEE ICASSP , pp. 245-248.
Mlkamo, Juha , et al. , "Optimized covariance domain framework for time-frequency processing of spatial audio" , Journal of the Audio Engineering Society , pp. 403-411.
Zhang, Shuhua , et al. , "An informed source separation system for speech signals" , 12th Annual Conference of the International Speech Communication Association (Interspeech 2011) , pp. 573-576.

* cited by examiner

OVERVIEW OF AN MMSE BASED PARAMETRIC DOWNMIX/UPMIX CONCEPT

Geometric representation for orthogonality principle in three-dimensional space

PARAMETRIC RECONSTRUCTION SYSTEM WITH DECORRELATION APPLIED ON RENDERED OUTPUT

DECORRELATAION UNIT

REDUCED COMPLEXITY DECORRELATAION UNIT

Loudspeaker positions and output formats

1800

| | | | | | | output formats | | | | | |
|---|---|---|---|---|---|---|---|---|---|---|---|
| No. | LS Label | Az. ° | Az. Tol. ° | El. ° | El. Tol. ° | 0-2.0 | 0-5.1 | 0-7.1 | 0-8.1 | 0-10.1 | 0-22.2 |
| 1 | CH_M_000 | 0 | ±2 | 0 | ±2 | | 3 | 3 | | 3 | 3 |
| 2 | CH_M_L030 | 30 | ±2 | 0 | ±2 | 1 | 1 | 1 | 1 | 1 | 7 |
| 3 | CH_M_R030 | -30 | ±2 | 0 | ±2 | 2 | 2 | 2 | 2 | 2 | 8 |
| 4 | CH_M_L060 | 60 | ±2 | 0 | ±2 | | | | | | 1 |
| 5 | CH_M_R060 | -60 | ±2 | 0 | ±2 | | | | | | 2 |
| 6 | CH_M_L090 | 90 | ±5 | 0 | ±2 | | | | | | 11 |
| 7 | CH_M_R090 | -90 | ±5 | 0 | ±2 | | | | | | 12 |
| 8 | CH_M_L110 | 110 | ±5 | 0 | ±2 | | 5 | 5 | 5 | 5 | |
| 9 | CH_M_R110 | -110 | ±5 | 0 | ±2 | | 6 | 6 | 6 | 6 | |
| 10 | CH_M_L135 | 135 | ±5 | 0 | ±2 | | | | | | 5 |
| 11 | CH_M_R135 | -135 | ±5 | 0 | ±2 | | | | | | 6 |
| 12 | CH_M_180 | 180 | ±5 | 0 | ±2 | | | | | | 9 |
| 13 | CH_U_000 | 0 | ±2 | 35 | ±10 | | | | 3 | | 15 |
| 14 | CH_U_L045 | 45 | ±5 | 35 | ±10 | | | | | | 13 |
| 15 | CH_U_R045 | -45 | ±5 | 35 | ±10 | | | | | | 14 |
| 16 | CH_U_L030 | 30 | ±5 | 35 | ±10 | | | 7 | 7 | 7 | |
| 17 | CH_U_R030 | -30 | ±5 | 35 | ±10 | | | 8 | 8 | 8 | |
| 18 | CH_U_L090 | 90 | ±5 | 35 | ±10 | | | | | | 19 |
| 19 | CH_U_R090 | -90 | ±5 | 35 | ±10 | | | | | | 20 |
| 20 | CH_U_L110 | 110 | ±5 | 35 | ±10 | | | | | 9 | |
| 21 | CH_U_R110 | -110 | ±5 | 35 | ±10 | | | | | 10 | |
| 22 | CH_U_L135 | 135 | ±5 | 35 | ±10 | | | | | | 17 |
| 23 | CH_U_R135 | -135 | ±5 | 35 | ±10 | | | | | | 18 |
| 24 | CH_U_180 | 180 | ±5 | 35 | ±10 | | | | | | 21 |
| 25 | CH_T_000 | 0 | ±2 | 90 | ±10 | | | | | 11 | 16 |
| 26 | CH_L_000 | 0 | ±2 | -15 | +5-25 | | | | 9 | | 22 |
| 27 | CH_L_L045 | 45 | ±5 | -15 | +5-25 | | | | | | 23 |
| 28 | CH_L_R045 | -45 | ±5 | -15 | +5-25 | | | | | | 24 |
| 29 | CH_LFE1 | 45 | ±15 | -15 | ±15 | | 4 | 4 | 4 | 4 | 4 |
| 30 | CH_LFE2 | -45 | ±15 | -15 | ±15 | | | | | | 10 |

1810 1820 1830 1832 1840 1842 1850 1860 1864 1870 1880 1890

FIG 18

Complexity reduction for 22.2 output format

- Premixing coefficients for $N=22$ and $K=11$, $cond(M_{pre}M_{pre}^{H})=1$.

1910

| Ch. ID | CH_M_000 | CH_L_000 | CH_U_000 | CH_T_000 | CH_M_L135 | CH_U_L135 | CH_M_R135 | CH_U_R135 | CH_M_180 | CH_U_180 | CH_M_L030 | CH_L_L045 | CH_M_R030 | CH_L_R045 | CH_M_L090 | CH_U_L090 | CH_M_R090 | CH_U_R090 | CH_M_L060 | CH_U_L045 | CH_M_R060 | CH_U_R045 |
|---|---|---|---|---|---|---|---|---|---|---|---|---|---|---|---|---|---|---|---|---|---|---|
| $M_{pre}^{i,j}$ | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
| 1 | 1 | 1 | 0 | 0 | 0 | 0 | 0 | 0 | 0 | 0 | 0 | 0 | 0 | 0 | 0 | 0 | 0 | 0 | 0 | 0 | 0 | 0 |
| 2 | 0 | 0 | 1 | 1 | 0 | 0 | 0 | 0 | 0 | 0 | 0 | 0 | 0 | 0 | 0 | 0 | 0 | 0 | 0 | 0 | 0 | 0 |
| 3 | 0 | 0 | 0 | 0 | 1 | 1 | 0 | 0 | 0 | 0 | 0 | 0 | 0 | 0 | 0 | 0 | 0 | 0 | 0 | 0 | 0 | 0 |
| 4 | 0 | 0 | 0 | 0 | 0 | 0 | 1 | 1 | 0 | 0 | 0 | 0 | 0 | 0 | 0 | 0 | 0 | 0 | 0 | 0 | 0 | 0 |
| 5 | 0 | 0 | 0 | 0 | 0 | 0 | 0 | 0 | 1 | 1 | 0 | 0 | 0 | 0 | 0 | 0 | 0 | 0 | 0 | 0 | 0 | 0 |
| 6 | 0 | 0 | 0 | 0 | 0 | 0 | 0 | 0 | 0 | 0 | 1 | 1 | 0 | 0 | 0 | 0 | 0 | 0 | 0 | 0 | 0 | 0 |
| 7 | 0 | 0 | 0 | 0 | 0 | 0 | 0 | 0 | 0 | 0 | 0 | 0 | 1 | 1 | 0 | 0 | 0 | 0 | 0 | 0 | 0 | 0 |
| 8 | 0 | 0 | 0 | 0 | 0 | 0 | 0 | 0 | 0 | 0 | 0 | 0 | 0 | 0 | 1 | 1 | 0 | 0 | 0 | 0 | 0 | 0 |
| 9 | 0 | 0 | 0 | 0 | 0 | 0 | 0 | 0 | 0 | 0 | 0 | 0 | 0 | 0 | 0 | 0 | 1 | 1 | 0 | 0 | 0 | 0 |
| 10 | 0 | 0 | 0 | 0 | 0 | 0 | 0 | 0 | 0 | 0 | 0 | 0 | 0 | 0 | 0 | 0 | 0 | 0 | 1 | 1 | 0 | 0 |
| 11 | 0 | 0 | 0 | 0 | 0 | 0 | 0 | 0 | 0 | 0 | 0 | 0 | 0 | 0 | 0 | 0 | 0 | 0 | 0 | 0 | 1 | 1 |

FIG 19A

- Premixing coefficients for N=22 and K=10, $cond(M_{pre}M_{pre}^{H})=2$.

| Ch. ID | CH_M_000 | CH_L_000 | CH_U_000 | CH_T_000 | CH_M_L135 | CH_U_L135 | CH_M_R135 | CH_U_R135 | CH_M_180 | CH_U_180 | CH_M_L030 | CH_L_L045 | CH_M_R030 | CH_L_R045 | CH_M_L090 | CH_U_L090 | CH_M_R090 | CH_U_R090 | CH_M_L060 | CH_U_L045 | CH_M_R060 | CH_U_R045 |
|---|---|---|---|---|---|---|---|---|---|---|---|---|---|---|---|---|---|---|---|---|---|---|
| $M_{pre}^{i,j}$ | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
| 1 | 1 | 1 | 1 | 1 | 0 | 0 | 0 | 0 | 0 | 0 | 0 | 0 | 0 | 0 | 0 | 0 | 0 | 0 | 0 | 0 | 0 | 0 |
| 2 | 0 | 0 | 0 | 0 | 1 | 1 | 0 | 0 | 0 | 0 | 0 | 0 | 0 | 0 | 0 | 0 | 0 | 0 | 0 | 0 | 0 | 0 |
| 3 | 0 | 0 | 0 | 0 | 0 | 0 | 1 | 1 | 0 | 0 | 0 | 0 | 0 | 0 | 0 | 0 | 0 | 0 | 0 | 0 | 0 | 0 |
| 4 | 0 | 0 | 0 | 0 | 0 | 0 | 0 | 0 | 1 | 1 | 0 | 0 | 0 | 0 | 0 | 0 | 0 | 0 | 0 | 0 | 0 | 0 |
| 5 | 0 | 0 | 0 | 0 | 0 | 0 | 0 | 0 | 0 | 0 | 1 | 1 | 0 | 0 | 0 | 0 | 0 | 0 | 0 | 0 | 0 | 0 |
| 6 | 0 | 0 | 0 | 0 | 0 | 0 | 0 | 0 | 0 | 0 | 0 | 0 | 1 | 1 | 0 | 0 | 0 | 0 | 0 | 0 | 0 | 0 |
| 7 | 0 | 0 | 0 | 0 | 0 | 0 | 0 | 0 | 0 | 0 | 0 | 0 | 0 | 0 | 1 | 1 | 0 | 0 | 0 | 0 | 0 | 0 |
| 8 | 0 | 0 | 0 | 0 | 0 | 0 | 0 | 0 | 0 | 0 | 0 | 0 | 0 | 0 | 0 | 0 | 1 | 1 | 0 | 0 | 0 | 0 |
| 9 | 0 | 0 | 0 | 0 | 0 | 0 | 0 | 0 | 0 | 0 | 0 | 0 | 0 | 0 | 0 | 0 | 0 | 0 | 1 | 1 | 0 | 0 |
| 10 | 0 | 0 | 0 | 0 | 0 | 0 | 0 | 0 | 0 | 0 | 0 | 0 | 0 | 0 | 0 | 0 | 0 | 0 | 0 | 0 | 1 | 1 |

FIG 19B

- Premixing coefficients for N=22 and K=9, cond($M_{pre}M_{pre}^{H}$)=2.

| Ch. ID | CH_M_000 | CH_L_000 | CH_U_000 | CH_T_000 | CH_M_L135 | CH_U_L135 | CH_M_R135 | CH_U_R135 | CH_M_180 | CH_U_180 | CH_M_L030 | CH_L_L045 | CH_M_R030 | CH_L_R045 | CH_M_L090 | CH_U_L090 | CH_M_R090 | CH_U_R090 | CH_M_L060 | CH_U_L045 | CH_M_R060 | CH_U_R045 |
|---|---|---|---|---|---|---|---|---|---|---|---|---|---|---|---|---|---|---|---|---|---|---|
| $M_{pre}^{i,j}$ | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
| 1 | 1 | 1 | 1 | 1 | 0 | 0 | 0 | 0 | 0 | 0 | 0 | 0 | 0 | 0 | 0 | 0 | 0 | 0 | 0 | 0 | 0 | 0 |
| 2 | 0 | 0 | 0 | 0 | 1 | 1 | 1 | 1 | 0 | 0 | 0 | 0 | 0 | 0 | 0 | 0 | 0 | 0 | 0 | 0 | 0 | 0 |
| 3 | 0 | 0 | 0 | 0 | 0 | 0 | 0 | 0 | 1 | 1 | 0 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 1 | 1 | 0 | 0 | 0 | 0 | 0 | 0 | 0 | 0 | 0 | 0 |
| 5 | 0 | 0 | 0 | 0 | 0 | 0 | 0 | 0 | 0 | 0 | 0 | 0 | 1 | 1 | 0 | 0 | 0 | 0 | 0 | 0 | 0 | 0 |
| 6 | 0 | 0 | 0 | 0 | 0 | 0 | 0 | 0 | 0 | 0 | 0 | 0 | 0 | 0 | 1 | 1 | 0 | 0 | 0 | 0 | 0 | 0 |
| 7 | 0 | 0 | 0 | 0 | 0 | 0 | 0 | 0 | 0 | 0 | 0 | 0 | 0 | 0 | 0 | 0 | 1 | 1 | 0 | 0 | 0 | 0 |
| 8 | 0 | 0 | 0 | 0 | 0 | 0 | 0 | 0 | 0 | 0 | 0 | 0 | 0 | 0 | 0 | 0 | 0 | 0 | 1 | 1 | 0 | 0 |
| 9 | 0 | 0 | 0 | 0 | 0 | 0 | 0 | 0 | 0 | 0 | 0 | 0 | 0 | 0 | 0 | 0 | 0 | 0 | 0 | 0 | 1 | 1 |

FIG 19C

- Premixing coefficients for N=22 and K=8, $\mathrm{cond}(M_{pre} M_{pre}^{H}) = 2$.

| Ch. ID | CH_M_000 | CH_L_000 | CH_U_000 | CH_T_000 | CH_M_L135 | CH_U_L135 | CH_M_R135 | CH_U_R135 | CH_M_180 | CH_U_180 | CH_M_L030 | CH_L_L045 | CH_M_R030 | CH_L_R045 | CH_M_L090 | CH_U_L090 | CH_M_R090 | CH_U_R090 | CH_M_L060 | CH_U_L045 | CH_M_R060 | CH_U_R045 |
|---|---|---|---|---|---|---|---|---|---|---|---|---|---|---|---|---|---|---|---|---|---|---|
| $M_{pre}^{i,j}$ | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
| 1 | 1 | 1 | 1 | 1 | 0 | 0 | 0 | 0 | 0 | 0 | 0 | 0 | 0 | 0 | 0 | 0 | 0 | 0 | 0 | 0 | 0 | 0 |
| 2 | 0 | 0 | 0 | 0 | 1 | 1 | 1 | 1 | 0 | 0 | 0 | 0 | 0 | 0 | 0 | 0 | 0 | 0 | 0 | 0 | 0 | 0 |
| 3 | 0 | 0 | 0 | 0 | 0 | 0 | 0 | 0 | 1 | 1 | 0 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 1 | 1 | 0 | 0 | 0 | 0 | 0 | 0 | 0 | 0 | 0 | 0 |
| 5 | 0 | 0 | 0 | 0 | 0 | 0 | 0 | 0 | 0 | 0 | 0 | 0 | 1 | 1 | 0 | 0 | 0 | 0 | 0 | 0 | 0 | 0 |
| 6 | 0 | 0 | 0 | 0 | 0 | 0 | 0 | 0 | 0 | 0 | 0 | 0 | 0 | 0 | 1 | 1 | 0 | 0 | 0 | 0 | 0 | 0 |
| 7 | 0 | 0 | 0 | 0 | 0 | 0 | 0 | 0 | 0 | 0 | 0 | 0 | 0 | 0 | 0 | 0 | 1 | 1 | 0 | 0 | 0 | 0 |
| 8 | 0 | 0 | 0 | 0 | 0 | 0 | 0 | 0 | 0 | 0 | 0 | 0 | 0 | 0 | 0 | 0 | 0 | 0 | 1 | 1 | 1 | 1 |

FIG 19D

- Premixing coefficients for N=22 and K=7, cond($M_{pre}M_{pre}^{H}$)=2.

| Ch. ID | CH_M_000 | CH_L_000 | CH_U_000 | CH_T_000 | CH_M_L135 | CH_U_L135 | CH_M_R135 | CH_U_R135 | CH_M_180 | CH_U_180 | CH_M_L030 | CH_L_L045 | CH_M_R030 | CH_L_R045 | CH_M_L090 | CH_U_L090 | CH_M_R090 | CH_U_R090 | CH_M_L060 | CH_U_L045 | CH_M_R060 | CH_U_R045 |
|---|---|---|---|---|---|---|---|---|---|---|---|---|---|---|---|---|---|---|---|---|---|---|
| $M_{pre}^{i,j}$ | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
| 1 | 1 | 1 | 1 | 1 | 0 | 0 | 0 | 0 | 0 | 0 | 0 | 0 | 0 | 0 | 0 | 0 | 0 | 0 | 0 | 0 | 0 | 0 |
| 2 | 0 | 0 | 0 | 0 | 1 | 1 | 1 | 1 | 0 | 0 | 0 | 0 | 0 | 0 | 0 | 0 | 0 | 0 | 0 | 0 | 0 | 0 |
| 3 | 0 | 0 | 0 | 0 | 0 | 0 | 0 | 0 | 1 | 1 | 0 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 1 | 1 | 0 | 0 | 0 | 0 | 0 | 0 | 0 | 0 | 0 | 0 |
| 5 | 0 | 0 | 0 | 0 | 0 | 0 | 0 | 0 | 0 | 0 | 0 | 0 | 1 | 1 | 0 | 0 | 0 | 0 | 0 | 0 | 0 | 0 |
| 6 | 0 | 0 | 0 | 0 | 0 | 0 | 0 | 0 | 0 | 0 | 0 | 0 | 0 | 0 | 1 | 1 | 1 | 1 | 0 | 0 | 0 | 0 |
| 7 | 0 | 0 | 0 | 0 | 0 | 0 | 0 | 0 | 0 | 0 | 0 | 0 | 0 | 0 | 0 | 0 | 0 | 0 | 1 | 1 | 1 | 1 |

FIG 19E

- Premixing coefficients for $N=22$ and $K=6$, $cond(M_{pre}M_{pre}^{H})=2$.

| Ch. ID | $M_{pre}^{i,j}$ | 1 | 2 | 3 | 4 | 5 | 6 |
|---|---|---|---|---|---|---|---|
| CH_M_000 | 1 | 1 | 0 | 0 | 0 | 0 | 0 |
| CH_L_000 | 2 | 1 | 0 | 0 | 0 | 0 | 0 |
| CH_U_000 | 3 | 1 | 0 | 0 | 0 | 0 | 0 |
| CH_T_000 | 4 | 1 | 0 | 0 | 0 | 0 | 0 |
| CH_M_L135 | 5 | 0 | 1 | 0 | 0 | 0 | 0 |
| CH_U_L135 | 6 | 0 | 1 | 0 | 0 | 0 | 0 |
| CH_M_R135 | 7 | 0 | 1 | 0 | 0 | 0 | 0 |
| CH_U_R135 | 8 | 0 | 1 | 0 | 0 | 0 | 0 |
| CH_M_180 | 9 | 0 | 0 | 1 | 0 | 0 | 0 |
| CH_U_180 | 10 | 0 | 0 | 1 | 0 | 0 | 0 |
| CH_M_L030 | 11 | 0 | 0 | 0 | 1 | 0 | 0 |
| CH_L_L045 | 12 | 0 | 0 | 0 | 1 | 0 | 0 |
| CH_M_R030 | 13 | 0 | 0 | 0 | 1 | 0 | 0 |
| CH_L_R045 | 14 | 0 | 0 | 0 | 1 | 0 | 0 |
| CH_M_L090 | 15 | 0 | 0 | 0 | 0 | 1 | 0 |
| CH_U_L090 | 16 | 0 | 0 | 0 | 0 | 1 | 0 |
| CH_M_R090 | 17 | 0 | 0 | 0 | 0 | 1 | 0 |
| CH_U_R090 | 18 | 0 | 0 | 0 | 0 | 1 | 0 |
| CH_M_L060 | 19 | 0 | 0 | 0 | 0 | 0 | 1 |
| CH_U_L045 | 20 | 0 | 0 | 0 | 0 | 0 | 1 |
| CH_M_R060 | 21 | 0 | 0 | 0 | 0 | 0 | 1 |
| CH_U_R045 | 22 | 0 | 0 | 0 | 0 | 0 | 1 |

FIG 19F

- Premixing coefficients for $N=22$ and $K=5$, $cond(M_{pre}M_{pre}^H)=1.5$.

| Ch. ID | CH_M_000 | CH_L_000 | CH_U_000 | CH_T_000 | CH_M_L135 | CH_U_L135 | CH_M_R135 | CH_U_R135 | CH_M_180 | CH_U_180 | CH_M_L030 | CH_L_L045 | CH_M_R030 | CH_L_R045 | CH_M_L090 | CH_U_L090 | CH_M_R090 | CH_U_R090 | CH_M_L060 | CH_U_L045 | CH_M_R060 | CH_U_R045 |
|---|---|---|---|---|---|---|---|---|---|---|---|---|---|---|---|---|---|---|---|---|---|---|
| $M_{pre}^{i,j}$ | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
| 1 | 1 | 1 | 1 | 1 | 0 | 0 | 0 | 0 | 0 | 0 | 0 | 0 | 0 | 0 | 0 | 0 | 0 | 0 | 0 | 0 | 0 | 0 |
| 2 | 0 | 0 | 0 | 0 | 1 | 1 | 1 | 1 | 1 | 1 | 0 | 0 | 0 | 0 | 0 | 0 | 0 | 0 | 0 | 0 | 0 | 0 |
| 3 | 0 | 0 | 0 | 0 | 0 | 0 | 0 | 0 | 0 | 0 | 1 | 1 | 1 | 1 | 0 | 0 | 0 | 0 | 0 | 0 | 0 | 0 |
| 4 | 0 | 0 | 0 | 0 | 0 | 0 | 0 | 0 | 0 | 0 | 0 | 0 | 0 | 0 | 1 | 1 | 1 | 1 | 0 | 0 | 0 | 0 |
| 5 | 0 | 0 | 0 | 0 | 0 | 0 | 0 | 0 | 0 | 0 | 0 | 0 | 0 | 0 | 0 | 0 | 0 | 0 | 1 | 1 | 1 | 1 |

FIG 19G

Complexity reduction for 10.1 output format

- Premixing coefficients for N=10 and K=5, $cond(M_{pre}M_{pre}^{H})=1$.

| Ch. ID | CH_M_L030 | CH_U_L030 | CH_M_R030 | CH_U_R030 | CH_M_000 | CH_T_000 | CH_M_L110 | CH_U_L110 | CH_M_R110 | CH_U_R110 |
|---|---|---|---|---|---|---|---|---|---|---|
| $M_{pre}^{i,j}$ | 1 | 2 | 3 | 4 | 5 | 6 | 7 | 8 | 9 | 10 |
| 1 | 1 | 1 | 0 | 0 | 0 | 0 | 0 | 0 | 0 | 0 |
| 2 | 0 | 0 | 1 | 1 | 0 | 0 | 0 | 0 | 0 | 0 |
| 3 | 0 | 0 | 0 | 0 | 1 | 1 | 0 | 0 | 0 | 0 |
| 4 | 0 | 0 | 0 | 0 | 0 | 0 | 1 | 1 | 0 | 0 |
| 5 | 0 | 0 | 0 | 0 | 0 | 0 | 0 | 0 | 1 | 1 |

FIG 20A

- Premixing coefficients for N=10 and K=4, $cond(M_{pre}M_{pre}^{H})=2$.

| Ch. ID | CH_M_L030 | CH_U_L030 | CH_M_R030 | CH_U_R030 | CH_M_000 | CH_T_000 | CH_M_L110 | CH_U_L110 | CH_M_R110 | CH_U_R110 |
|---|---|---|---|---|---|---|---|---|---|---|
| $M_{pre}^{i,j}$ | 1 | 2 | 3 | 4 | 5 | 6 | 7 | 8 | 9 | 10 |
| 1 | 1 | 1 | 0 | 0 | 0 | 0 | 0 | 0 | 0 | 0 |
| 2 | 0 | 0 | 1 | 1 | 0 | 0 | 0 | 0 | 0 | 0 |
| 3 | 0 | 0 | 0 | 0 | 1 | 1 | 0 | 0 | 0 | 0 |
| 4 | 0 | 0 | 0 | 0 | 0 | 0 | 1 | 1 | 1 | 1 |

FIG 20B

- Premixing coefficients for N=10 and K=3, cond($M_{pre}M_{pre}^H$)=2.

| Ch. ID | CH_M_L030 | CH_U_L030 | CH_M_R030 | CH_U_R030 | CH_M_000 | CH_T_000 | CH_M_L110 | CH_U_L110 | CH_M_R110 | CH_U_R110 |
|---|---|---|---|---|---|---|---|---|---|---|
| $M_{pre}^{i,j}$ | 1 | 2 | 3 | 4 | 5 | 6 | 7 | 8 | 9 | 10 |
| 1 | 1 | 1 | 1 | 1 | 0 | 0 | 0 | 0 | 0 | 0 |
| 2 | 0 | 0 | 0 | 0 | 1 | 1 | 0 | 0 | 0 | 0 |
| 3 | 0 | 0 | 0 | 0 | 0 | 0 | 1 | 1 | 1 | 1 |

FIG 20C

- Premixing coefficients for N=10 and K=2, cond($M_{pre}M_{pre}^H$)=1.5.

| Ch. ID | CH_M_L030 | CH_U_L030 | CH_M_R030 | CH_U_R030 | CH_M_000 | CH_T_000 | CH_M_L110 | CH_U_L110 | CH_M_R110 | CH_U_R110 |
|---|---|---|---|---|---|---|---|---|---|---|
| $M_{pre}^{i,j}$ | 1 | 2 | 3 | 4 | 5 | 6 | 7 | 8 | 9 | 10 |
| 1 | 1 | 1 | 1 | 1 | 1 | 1 | 0 | 0 | 0 | 0 |
| 2 | 0 | 0 | 0 | 0 | 0 | 0 | 1 | 1 | 1 | 1 |

FIG 20D

Complexity reduction for 8.1 output format

- Premixing coefficients for N=8 and K=4, $cond(M_{pre}M_{pre}^{H})=1$.

| Ch. ID | CH_M_L030 | CH_U_L030 | CH_M_R030 | CH_U_R030 | CH_M_000 | CH_T_000 | CH_M_L110 | CH_M_R110 |
|---|---|---|---|---|---|---|---|---|
| $M_{pre}^{i,j}$ | 1 | 2 | 3 | 4 | 5 | 6 | 7 | 8 |
| 1 | 1 | 1 | 0 | 0 | 0 | 0 | 0 | 0 |
| 2 | 0 | 0 | 1 | 1 | 0 | 0 | 0 | 0 |
| 3 | 0 | 0 | 0 | 0 | 1 | 1 | 0 | 0 |
| 4 | 0 | 0 | 0 | 0 | 0 | 0 | 1 | 1 |

FIG 21A

- Premixing coefficients for N=8 and K=3, $cond(M_{pre}M_{pre}^{H})=2$.

| Ch. ID | CH_M_L030 | CH_U_L030 | CH_M_R030 | CH_U_R030 | CH_M_000 | CH_T_000 | CH_M_L110 | CH_M_R110 |
|---|---|---|---|---|---|---|---|---|
| $M_{pre}^{i,j}$ | 1 | 2 | 3 | 4 | 5 | 6 | 7 | 8 |
| 1 | 1 | 1 | 1 | 1 | 0 | 0 | 0 | 0 |
| 2 | 0 | 0 | 0 | 0 | 1 | 1 | 0 | 0 |
| 3 | 0 | 0 | 0 | 0 | 0 | 0 | 1 | 1 |

FIG 21B

- Premixing coefficients for N=8 and K=2, $cond(M_{pre}M_{pre}^{H})=3$.

| Ch. ID | CH_M_L030 | CH_U_L030 | CH_M_R030 | CH_U_R030 | CH_M_000 | CH_T_000 | CH_M_L110 | CH_M_R110 |
|---|---|---|---|---|---|---|---|---|
| $M_{pre}^{i,j}$ | 1 | 2 | 3 | 4 | 5 | 6 | 7 | 8 |
| 1 | 1 | 1 | 1 | 1 | 1 | 1 | 0 | 0 |
| 3 | 0 | 0 | 0 | 0 | 0 | 0 | 1 | 1 |

FIG 21C

Complexity reduction for 7.1 output format

- Premixing coefficients for N=7 and K=4, $cond(M_{pre}M_{pre}^{H})=1$.

| Ch. ID | CH_M_L030 | CH_U_L030 | CH_M_R030 | CH_U_R030 | CH_M_000 | CH_M_L110 | CH_M_R110 |
|---|---|---|---|---|---|---|---|
| $M_{pre}^{i,j}$ | 1 | 2 | 3 | 4 | 5 | 6 | 7 |
| 1 | 1 | 1 | 0 | 0 | 0 | 0 | 0 |
| 2 | 0 | 0 | 1 | 1 | 0 | 0 | 0 |
| 3 | 0 | 0 | 0 | 0 | 1 | 0 | 0 |
| 4 | 0 | 0 | 0 | 0 | 0 | 1 | 1 |

FIG 21D

- Premixing coefficients for N=7 and K=3, $cond(M_{pre}M_{pre}^{H})=2$.

| Ch. ID | CH_M_L030 | CH_U_L030 | CH_M_R030 | CH_U_R030 | CH_M_000 | CH_M_L110 | CH_M_R110 |
|---|---|---|---|---|---|---|---|
| $M_{pre}^{i,j}$ | 1 | 2 | 3 | 4 | 5 | 6 | 7 |
| 1 | 1 | 1 | 1 | 1 | 0 | 0 | 0 |
| 2 | 0 | 0 | 0 | 0 | 1 | 0 | 0 |
| 3 | 0 | 0 | 0 | 0 | 0 | 1 | 1 |

FIG 21E

- Premixing coefficients for N=7 and K=2, $cond(M_{pre}M_{pre}^{H})=2.5$.

| Ch. ID | CH_M_L030 | CH_U_L030 | CH_M_R030 | CH_U_R030 | CH_M_000 | CH_M_L110 | CH_M_R110 |
|---|---|---|---|---|---|---|---|
| $M_{pre}^{i,j}$ | 1 | 2 | 3 | 4 | 5 | 6 | 7 |
| 1 | 1 | 1 | 1 | 1 | 1 | 0 | 0 |
| 2 | 0 | 0 | 0 | 0 | 0 | 1 | 1 |

FIG 21F

Complexity reduction for 5.1 output format

- Premixing coefficients for N=5 and K=3, $cond(M_{pre}M_{pre}^{H})=2$.

| Ch. ID | CH_M_L030 | CH_M_R030 | CH_M_000 | CH_M_L110 | CH_M_R110 |
|---|---|---|---|---|---|
| $M_{pre}^{i,j}$ | 1 | 2 | 3 | 4 | 5 |
| 1 | 1 | 1 | 0 | 0 | 0 |
| 2 | 0 | 0 | 1 | 0 | 0 |
| 3 | 0 | 0 | 0 | 1 | 1 |

FIG 22A

- Premixing coefficients for N=5 and K=2, $cond(M_{pre}M_{pre}^{H})=1.5$.

| Ch. ID | CH_M_L030 | CH_M_R030 | CH_M_000 | CH_M_L110 | CH_M_R110 |
|---|---|---|---|---|---|
| $M_{pre}^{i,j}$ | 1 | 2 | 3 | 4 | 5 |
| 1 | 1 | 1 | 1 | 0 | 0 |
| 2 | 0 | 0 | 0 | 1 | 1 |

FIG 22B

Complexity reduction for 2.0 output format

- Premixing coefficients for N=2 and K=1, $\mathrm{cond}(M_{pre}M_{pre}^{H})=2$.

| Ch. ID | CH_M_L030 | CH_M_R030 |
|---|---|---|
| $M_{pre}^{i,j}$ | 1 | 2 |
| 1 | 1 | 1 |

FIG 23

| | | | | | | | |
|---|---|---|---|---|---|---|---|
| 2410 | Group 1 | CH_M_000 | CH_L_000 | CH_U_000 | CH_T_000 | | |
| | | (Ch. ID. 3) | (Ch. ID. 22) | (Ch. ID. 15) | (Ch. ID. 16) | | |
| 2412 | Group 2 | CH_M_L135 | CH_U_L135 | CH_M_R135 | CH_U_R135 | CH_M_180 | CH_U_180 |
| | | (Ch. ID. 5) | (Ch. ID. 17) | (Ch. ID. 6) | (Ch. ID. 18) | (Ch. ID. 9) | (Ch. ID. 21) |
| 2414 | Group 3 | CH_M_L030 | CH_L_L045 | CH_M_R030 | CH_L_R045 | | |
| | | (Ch. ID. 7) | (Ch. ID. 23) | (Ch. ID. 8) | (Ch. ID. 24) | | |
| 2416 | Group 4 | CH_M_L090 | CH_U_L090 | CH_M_R090 | CH_U_R090 | | |
| | | (Ch. ID. 11) | (Ch. ID. 19) | (Ch. ID. 12) | (Ch. ID. 20) | | |
| 2418 | Group 5 | CH_M_L060 | CH_U_L045 | CH_M_R060 | CH_U_R045 | | |
| | | (Ch. ID. 1) | (Ch. ID. 13) | (Ch. ID. 2) | (Ch. ID. 14) | | |

FIG 24

| | | |
|---|---|---|
| bsDecorrelationMethod; | 2 | uimsbf |
| bsDecorrelationLevel; | 2 | uimsbf |

FIG 25 bsDecorrelationMethod

Indicates the decoder decorrelation operating mode according to:

bsDecorrelationMethod

| bsDecorrelationMethod | Meaning |
|---|---|
| 0 | Energy compensation mode |
| 1 | Limited covariance adjustment mode |
| 2 | General covariance adjustment mode |
| 3 | N/A |

FIG 26 bsDecorrelationLevel

Defines the decorrelation level according to:

bsDecorrelationLevel

| bsDecorrelationLevel | 22.2 | 10.1 | 8.1 | 7.1 | 5.1 | 2.1 |
|---|---|---|---|---|---|---|
| 0 | 11 | 10 | 8 | 7 | 5 | 2 |
| 1 | 9 | 5 | 4 | 4 | 3 | 1 |
| 2 | 7 | 3 | 3 | 3 | 2 | 0 |
| 3 | 5 | 2 | 2 | 2 | 0 | 0 |

FIG 27

OVERVIER 3D-AUDIO ENCODER

OVERVIER 3D-AUDIO DECODER

| bsNumSaocDmxObjects | decoding mode | meaning |
|---|---|---|
| 0 | combined | The input channel based signals and the input object based signals are downmixed together into $N_{ch}$ channels. |
| >=1 | independent | The input channel based signals are downmixed into $N_{ch}$ channels. The input object based signals are downmixed into $N_{obj}$ channels. |

- Syntax of SAOC3DSpecificConfig()

| Syntax | No. of bits | Mnemonic |
|---|---|---|
| SAOC3DSpecificConfig() | | |
| { | | |
| bsSamplingFrequencyIndex; | 4 | uimsbf |
| if ( bsSamplingFrequencyIndex == 15 ) { | | |
| bsSamplingFrequency; | 24 | uimsbf |
| } | | |
| bsFreqRes; | 3 | uimsbf |
| bsFrameLenth; | 7 | uimsbf |
| bsNumSaocDmxChannels; | 5 | uimsbf |
| bsNumSaocDmxObjects; | 5 | uimsbf |
| bsDecorrelationMethod; | 2 | uimsbf |
| NumInputSignals = 0; | | |
| if (bsNumSaocDmxChannels < 0) { | | |
| bsNumSaocChannels; | 6 | uimsbf |
| bsNumSaocLFEs; | 2 | uimsbf |
| NumInputSigns += bsNumSaocChannels; | | |
| } | | |
| bsNumSaocObjects; | 8 | uimsbf |
| bsDecorrelationLevel; | 2 | uimsbf |
| NumInputSignals += bsNumSaocObjects; | | |
| for ( i=0; i<bsNumSaocChannels; i++ ) { | | |
| bsRelatedTo[i][j] = 1; | | |
| for( j=i+1; j< bsNumSaocChannels; j++ ) { | | |
| bsRelatedTo[i][j]; | 1 | uimsbf |
| bsRelatedTo[j][i] = bsRelatedTo[i][j]; | | |
| } | | |
| } | | |

FIG 33A-1

| | | |
|---|---|---|
| for ( i=bsNumSaocChannels; i<NumInputSignals; i++ ) { | | |
|     for ( j=0; j<bsNumSaocChannels; j++ ) { | | |
|         bsRelatedTo[i][j] = 0; | | |
|         bsRelatedTo[j][i] = 0; | | |
|     } | | |
| } | | |
| for ( i=bsNumSaocChannels; i<NumInputSignals; i++ ) { | | |
|     bsRelatedTo[i][j] = 1; | | |
|     for ( j=i+1; j<NumInputSignals; j++ ) { | | |
|         bsRelatedTo[i][j]; | 1 | uimsbf |
|         bsRelatedTo[j][i] = bsRelatedTo[i][j]; | | |
|     } | | |
| } | | |
| bsOneIOC; | 1 | uimsbf |
| bsSaocDmxMethod; | 4 | uimsbf |
| if (bsSaocDmxMethod == 15) { | | |
|     bsNumPremixedChannels; | 5 | uimsbf |
| } | | |
| bsDualMode; | 1 | uimsbf |
| if (bsDualMode) { | | |
|     bsBandsLow; | 5 | uimsbf |
|     bsBandsHigh = numBands; | | Note 1 |
| } else { | | |
|     bsBandsLow = numBands; | | |

FIG 33A-2

| | | |
|---|---|---|
|     } | | |
|     **bsDcuFlag;** | 1 | uimsbf |
|     if ( bsDcuFlag == 1 ) { | | |
|         **bsDcuMandatory;** | 1 | uimsbf |
|         **bsDcuDynamic;** | 1 | uimsbf |
|         if ( bsDcuDynamic == 0 ) { | | |
|             **bsDcuMode;** | 1 | uimsbf |
|             **bsDcuParam;** | 4 | uimsbf |
|         } | | |
|     } ele { | | |
|         bsDcuMandatory = 0; | | |
|         bsDcuDynamic = 0; | | |
|         bsDcuMode = 0; | | |
|         bsDcuParam = 0; | | |
|     } | | |
|     **bsSaocReserved;** | 3 | uimsbf |
|     ByteAlign(); | | |
|     SAOC3DExtensionConfig(); | | |
| } | | |
| Note 1: numBands is defined in Table 33 in ISO/IEC 23003-2:2010. | | |

FIG 33B

MULTI-CHANNEL DECORRELATOR, MULTI-CHANNEL AUDIO DECODER, MULTI-CHANNEL AUDIO ENCODER, METHODS AND COMPUTER PROGRAM USING A PREMIX OF DECORRELATOR INPUT SIGNALS

CROSS-REFERENCE TO RELATED APPLICATIONS

This application is a continuation of copending U.S. patent application Ser. No. 15/004,738, filed Jan. 22, 2016, which in turn is a continuation of copending International Application No. PCT/EP2014/065395, filed Jul. 17, 2014, which is incorporated herein by reference in its entirety, and additionally claims priority from European Application No. 13177374.9, filed Jul. 22, 2013, and from European Application No. 13189339.8, filed Oct. 18, 2013, which are also incorporated herein by reference in their entirety.

BACKGROUND OF THE INVENTION

Embodiments according to the invention are related to a multi-channel decorrelator for providing a plurality of decorrelated signals on the basis of a plurality of decorrelator input signals.

Further embodiments according to the invention are related to a multi-channel audio decoder for providing at least two output audio signals on the basis of an encoded representation.

Further embodiments according to the invention are related to a multi-channel audio encoder for providing an encoded representation on the basis of at least two input audio signals.

Further embodiments according to the invention are related to a method for providing a plurality of decorrelated signals on the basis of a plurality of decorrelator input signals.

Some embodiments according to the invention are related to a method for providing at least two output audio signals on the basis of an encoded representation.

Some embodiments according to the invention are related to a method for providing an encoded representation on the basis of at least two input audio signals.

Some embodiments according to the invention are related to a computer program for performing one of said methods.

Some embodiments according to the invention are related to an encoded audio representation.

Generally speaking, some embodiments according to the invention are related to a decorrelation concept for multi-channel downmix/upmix parametric audio object coding systems.

In recent years, demand for storage and transmission of audio contents has steadily increased. Moreover, the quality requirements for the storage and transmission of audio contents have also steadily increased. Accordingly, the concepts for the encoding and decoding of audio content have been enhanced.

For example, the so called "Advanced Audio Coding" (AAC) has been developed, which is described, for example, in the international standard ISO/IEC 13818-7:2003. Moreover, some spatial extensions have been created, like for example the so called "MPEG Surround" concept, which is described, for example, in the international standard ISO/IEC 23003-1:2007. Moreover, additional improvements for encoding and decoding of spatial information of audio signals are described in the international standard ISO/IEC 23003-2:2010, which relates to the so called "Spatial Audio Object Coding".

Moreover, a switchable audio encoding/decoding concept which provides the possibility to encode both general audio signals and speech signals with good coding efficiency and to handle multi-channel audio signals is defined in the international standard ISO/IEC 23003-3:2012, which describes the so called "Unified Speech and Audio Coding" concept.

Moreover, further conventional concepts are described in the references, which are mentioned at the end of the present description.

However, there is a desire to provide an even more advanced concept for an efficient coding and decoding of 3-dimensional audio scenes.

SUMMARY

An embodiment may have a multi-channel decorrelator for providing a plurality of decorrelated signals on the basis of a plurality of decorrelator input signals, wherein the multi-channel decorrelator is configured to premix a first set of N decorrelator input signals into a second set of K decorrelator input signals, wherein $K<N$; wherein the multi-channel decorrelator is configured to provide a first set of K' decorrelator output signals on the basis of the second set of K decorrelator input signals; and wherein the multi-channel decorrelator is configured to upmix the first set of K' decorrelator output signals into a second set of N' decorrelator output signals, wherein $N'>K'$.

Another embodiment may have a multi-channel audio decoder for providing at least two output audio signals on the basis of an encoded representation, wherein the multi-channel audio decoder includes an inventive multi-channel decorrelator.

Another embodiment may have a multi-channel audio encoder for providing an encoded representation on the basis of at least two input audio signals, wherein the multi-channel audio encoder is configured to provide one or more downmix signals on the basis of the at least two input audio signals, and wherein the multi-channel audio encoder is configured to provide one or more parameters describing a relationship between the at least two input audio signals, and wherein the multi-channel audio encoder is configured to provide a decorrelation complexity parameter describing a complexity of a decorrelation to be used at the side of an audio decoder.

According to another embodiment, a method for providing a plurality of decorrelated signals on the basis of a plurality of decorrelator input signals may have the steps of: premixing a first set of N decorrelator input signals into a second set of K decorrelator input signals, wherein $K<N$; providing a first set of K' decorrelator output signals on the basis of the second set of K decorrelator input signals; and upmixing the first set of K' decorrelator output signals into a second set of N' decorrelator output signals, wherein $N'>K'$.

According to another embodiment, a method for providing at least two output audio signals on the basis of an encoded representation may have the step of providing a plurality of decorrelated signals on the basis of a plurality of decorrelator input signals according to the above method.

According to another embodiment, a method for providing an encoded representation on the basis of at least two input audio signals may have the steps of: providing one or more downmix signals on the basis of the at least two input audio signals, and providing one or more parameters describing a relationship between the at least two input audio signals, and providing a decorrelation complexity parameter describing a complexity of a decorrelation to be used at the side of an audio decoder.

Another embodiment may have a non-transitory digital storage medium having a computer program stored thereon to perform the inventive methods when said computer program is run by a computer.

According to another embodiment, an encoded audio representation may have: an encoded representation of a downmix signal; an encoded representation of one or more parameters describing a relationship between the at least two input audio signals, and an encoded decorrelation complexity parameter describing a complexity of a decorrelation to be used at the side of an audio decoder.

An embodiment according to the invention creates a multi-channel decorrelator for providing a plurality of decorrelated signals on the basis of a plurality of decorrelator input signals.

The multi-channel decorrelator is configured to premix a first set of N decorrelator input signals into a second set of K decorrelator input signals, wherein K<N. The multi-channel decorrelator is configured to provide a first set of K' decorrelator output signals on the basis of the second set of K decorrelator input signals. The multi-channel decorrelator is further configured to upmix the first set of K' decorrelator output signals into a second set of N' decorrelator output signals, wherein N'>K'.

This embodiment according to the invention is based on the idea that a complexity of the decorrelation can be reduced by premixing the first set of N decorrelator input signals into a second set of K decorrelator input signals, wherein the second set of K decorrelator input signals comprises less signals than the first set of N decorrelator input signals. Accordingly, the fundamental decorrelator functionality is performed on only K signals (the K decorrelator input signals of the second set) such that, for example, only K (individual) decorrelators (or individual decorrelations) are necessitated (and not N decorrelators). Moreover, to provide N' decorrelator output signals, an upmix is performed, wherein the first set of K' decorrelator output signals is upmixed into the second set of N' decorrelator output signals. Accordingly, it is possible to obtain a comparatively large number of decorrelated signals (namely, N' signals of the second set of decorrelator output signals) on the basis of a comparatively large number of decorrelator input signals (namely, N signals of the first set of decorrelator input signals), wherein a core decorrelation functionality is performed on the basis of only K signals (for example using only K individual decorrelators). Thus, a significant gain in decorrelation efficiency is achieved, which helps to save processing power and resources (for example, energy).

In one embodiment, the number K of signals of the second set of decorrelator input signals is equal to the number K' of signals of the first set of decorrelator output signals. Accordingly, there may for example be K individual decorrelators, each of which receives one decorrelator input signal (of the second set of decorrelator input signals) from the premixing, and each of which provides one decorrelator output signals (of the first set of decorrelator output signals) to the upmixing. Thus, simple individual decorrelators can be used, each of which provides one output signal on the basis of one input signal.

In another embodiment, number N of signals of the first set of decorrelator input signals may be equal to the number N' of signals of the second set of decorrelator output signals.

Thus, the number of signals received by the multi-channel decorrelator is equal to the number of signals provided by the multi-channel decorrelator, such that the multi-channel decorrelator appears, from outside, like a bank of N independent decorrelators (wherein, however, the decorrelation result may comprise some imperfections due to the usage of only K input signals for the core decorrelator). Accordingly, the multi-channel decorrelator may be used as drop-in replacement for conventional decorrelators having an equal number of input signals and output signals. Moreover, it should be noted that the upmixing may, for example, be derived from the premixing in such a configuration with moderate effort.

In one embodiment, the number N of signals of the first set of decorrelator input signals may be larger than or equal to 3, and the number N' of signals of the second set of decorrelator output signals may also be larger than or equal to 3. In such a case, the multi-channel decorrelator may provide particular efficiency.

In one embodiment, the multi-channel decorrelator may be configured to premix the first set of N decorrelator input signals into a second set of K decorrelator input signals using a premixing matrix (i.e., using a linear premixing functionality). In this case, the multi-channel decorrelator may be configured to obtain the first set of K' decorrelator output signals on the basis of the second set of K decorrelator input signals (for example, using individual decorrelators). The multi-channel decorrelator may also be configured to upmix the first set of K' decorrelator output signals into the second set of N' decorrelator output signals using a postmixing matrix, i.e., using a linear postmixing function. Accordingly, distortions may be kept small. Also, the premixing and post mixing (also designated as upmixing) may be performed in a computationally efficient manner.

In one embodiment, the multi-channel decorrelator may be configured to select the premixing matrix in dependence on spatial positions to which the channel signals of the first set of N decorrelator input signals are associated. Accordingly, spatial dependencies (or correlations) may be considered in the premixing process, which is helpful to avoid an excessive degradation due to the premixing process performed in the multi-channel decorrelator.

In one embodiment, the multi-channel decorrelator may be configured to select the premixing matrix in dependence on correlation characteristics or covariance characteristics of the channel signals of the first set of N decorrelator input signals. Such a functionality may also help to avoid excessive distortions due to the premixing performed by the multi-channel decorrelator. For example, decorrelator input signals (of the first set of decorrelator input signals), which are closely related (i.e., comprise a high cross-correlation or a high cross-covariance) may, for example, be combined into a single decorrelator input signal of the second set of decorrelator input signals, and may consequently be processed, for example, by a common individual decorrelator (of the decorrelator core). Thus, it can be avoided that substantially different decorrelator input signals (of the first set of decorrelator input signals) are premixed (or downmixed) into a single decorrelator input signal (of the second set of decorrelator input signals), which is input into the decorrelator core, since this will typically result in inappropriate decorrelator output signals (which would, for example, disturb a spatial perception when used to bring audio signals to desired cross-correlation characteristics or cross-covariance characteristics). Accordingly, the multi-channel decorrelator may decide, in an intelligent manner, which signals should be combined in the premixing (or downmixing) process to allow for a good compromise between decorrelation efficiency and audio quality.

In one embodiment, the multi-channel decorrelator is configured to determine the premixing matrix such that a matrix-product between the premixing matrix and a Hermitian thereof is well-conditioned with respect to an inversion operation. Accordingly, the premixing matrix can be chosen such that a postmixing matrix can be determined without numerical problems.

In one embodiment, the multi-channel decorrelator is configured to obtain the postmixing matrix on the basis of the premixing matrix using some matrix multiplication and matrix inversion operations. In this way, the postmixing matrix can be obtained efficiently, such that the postmixing matrix is well-adapted to the premixing process.

In one embodiment, the multi-channel decorrelator is configured to receive an information about a rendering configuration associated with the channel signals of the first set of N decorrelator input signals. In this case, the multi-channel decorrelator is configured to select a premixing matrix in dependence on the information about the rendering configuration.

Accordingly, the premixing matrix may be selected in a manner which is well-adapted to the rendering configuration, such that a good audio quality can be obtained.

In one embodiment, the multi-channel decorrelator is configured to combine channel signals of the first set of N decorrelator input signals which are associated with spatially adjacent positions of an audio scene when performing the premixing. Thus, the fact that channel signals associated with spatially adjacent positions of an audio scene are typically similar is exploited when setting up the premixing. Consequently, similar audio signals may be combined in the premixing and processed using the same individual decorrelator in the decorrelator core. Accordingly, inacceptable degradations of the audio content can be avoided.

In one embodiment, the multi-channel decorrelator is configured to combine channel signals of the first set of N decorrelator input signals which are associated with vertically spatially adjacent positions of an audio scene when performing the premixing. This concept is based on the finding that audio signals from vertically spatially adjacent positions of the audio scene are typically similar. Moreover, the human perception is not particularly sensitive with respect to differences between signals associated with vertically spatially adjacent positions of the audio scene. Accordingly, it has been found that combining audio signals associated with vertically spatially adjacent positions of the audio scene does not result in a substantial degradation of a hearing impression obtained on the basis of the decorrelated audio signals.

In one embodiment, the multi-channel decorrelator may be configured to combine channel signals of the first set of N decorrelator input signals which are associated with a horizontal pair of spatial positions comprising a left side position and a right side position. It has been found that channel signals which are associated with a horizontal pair of spatial positions comprising a left side position and a right side position are typically also somewhat related since channel signals associated with a horizontal pair of spatial positions are typically used to obtain a spatial impression. Accordingly, it has been found that it is a reasonable solution to combine channel signals associated with a horizontal pair of spatial positions, for example if it is not sufficient to combine channel signals associated with vertically spatially adjacent positions of the audio scene, because combining channel signals associated with a horizontal pair of spatial positions typically does not result in an excessive degradation of a hearing impression.

In one embodiment, the multi-channel decorrelator is configured to combine at least four channel signals of the first set of N decorrelator input signals, wherein at least two of said at least four channel signals are associated with spatial positions on a left side of an audio scene, and wherein at least two of said at least four channel signals are associated with spatial positions on a right side of an audio scene. Accordingly, four or more channels signals are combined, such that an efficient decorrelation can be obtained without significantly comprising a hearing impression.

In one embodiment, the at least two left-sided channel signals (i.e., channel signals associated with spatial positions on the left side of the audio scene) to be combined are associated with spatial positions which are symmetrical, with respect to a center plane of the audio scene, to the spatial positions associated with the at least two right-sided channel signals to be combined (i.e., channel signals associated with spatial positions on the right side of the audio scene). It has been found that a combination of channel signals associated with "symmetrical" spatial positions typically brings along good results, since signals associated with such "symmetrical" spatial positions are typically somewhat related, which is advantageous for performing the common (combined) decorrelation.

In one embodiment, the multi-channel decorrelator is configured to receive a complexity information describing a number K of decorrelator input signals of the second set of decorrelator input signals. In this case, the multi-channel decorrelator may be configured to select a premixing matrix in dependence on the complexity information. Accordingly, the multi-channel decorrelator can be adapted flexibly to different complexity requirements. Thus, it is possible to vary a compromise between audio quality and complexity.

In one embodiment, the multi-channel decorrelator is configured to gradually (for example, step-wisely) increase a number of decorrelator input signals of the first set of decorrelator input signals which are combined together to obtain the decorrelator input signals of the second set of decorrelator input signals with a decreasing value of the complexity information. Accordingly, it is possible to combine more and more decorrelator input signals of the first set of decorrelator input signals (for example, into a single decorrelator input signal of the second set of decorrelator input signals) if it is desired to decrease the complexity, which allows to vary the complexity with little effort.

In one embodiment, the multi-channel decorrelator is configured to combine only channel signals of the first set of N decorrelator input signals which are associated with vertically spatially adjacent positions of an audio scene when performing the premixing for a first value of the complexity information. However, the multi-channel decorrelator may (also) be configured to combine at least two channel signals of the first set of N decorrelator input signals which are associated with vertically spatially adjacent positions on the left side of the audio scene and at least two channel signals of the first set of N decorrelator input signals which are associated with vertically spatially adjacent positions on the right side of the audio scene in order to obtain a given signal of the second set of decorrelator input signals when performing the premixing for a second value of the complexity information. In other words, for the first value of the complexity information, no combination of channel signals from different sides of the audio scene may be performed, which results in a particularly good quality of the audio signals (and of a hearing impression, which can be obtained on the basis of the decorrelated audio signals). In contrast, if a smaller complexity is necessitated, a horizontal combination may also be performed in addition to the vertical combination. It has been found that this a reasonable concept for a step-wise adjustment of the complexity, wherein a somewhat higher degradation of a hearing impression is found for reduced complexity.

In one embodiment, the multi-channel decorrelator is configured to combine at least four channel signals of the first set of N decorrelator input signals, wherein at least two of said at least four channel signals are associated with spatial positions on a left side of an audio scene, and wherein at least two of said at least four channel signals are associated with spatial positions on a right side of the audio scene when performing the premixing for a second value of the complexity information. This concept is based on the finding that a comparatively low computational complexity can be obtained by combining at least two channel signals associated with spatial positions on a left side of the audio scene and at least two channel signals associated with spatial positions on a right side of the audio scene, even if said channel signals are not vertically adjacent (or at least not perfectly vertically adjacent).

In one embodiment, the multi-channel decorrelator is configured to combine at least two channel signals of the first set of N decorrelator input signals which are associated with vertically spatially adjacent positions on a left side of the audio scene, in order to obtain a first decorrelator input signal of the second set of decorrelator input signals, and to combine at least two channel signals of the first set of N decorrelator input signals which are associated with vertically spatially adjacent positions on a right side of the audio scene, in order to obtain a second decorrelator input signal of the second set of decorrelator input signals for a first value of the complexity information. Moreover, the multi-channel decorrelator may be configured to combine the at least two channel signals of the first set of N decorrelator input signals which are associated with vertically spatially adjacent positions on the left side of the audio scene and the at least two channel signals of the first set of N decorrelator input signals which are associated with vertically spatially adjacent positions on the right side of the audio scene, in order to obtain a decorrelator input signal of the second set of decorrelator input signals for a second value of the complexity information. In this case, a number of decorrelator input signals of the second set of decorrelator input signals is larger for the first value of the complexity information than for the second value of the complexity information. In other words, four channel signals, which are used to obtain two decorrelator input signals of the second set of decorrelator input signals for the first value of the complexity information may be used to obtain a single decorrelator input signal of the second set of decorrelator input signals for the second value of the complexity information. Thus, signals which serve as input signals for two individual decorrelators for the first value of the complexity information are combined to serve as input signals for a single individual decorrelator for the second value of the complexity information. Thus, an efficient reduction of the number of individual decorrelators (or of the number of decorrelator input signals of the second set of decorrelator input signals) can be obtained for a reduced value of the complexity information.

An embodiment according to the invention creates a multi-channel audio decoder for providing at least two output audio signals on the basis of an encoded representation. The multi-channel audio decoder comprises a multi-channel decorrelator, as discussed herein. This embodiment is based on the finding that the multi-channel audio decorrelator is well-suited for application in a multi-channel audio decoder.

In one embodiment, the multi-channel audio decoder is configured to render a plurality of decoded audio signals, which are obtained on the basis of the encoded representation, in dependence on one or more rendering parameters, to obtain a plurality of rendered audio signals. The multi-channel audio decoder is configured to derive one or more decorrelated audio signals from the rendered audio signals using the multi-channel decorrelator, wherein the rendered audio signals constitute the first set of decorrelator input signals, and wherein the second set of decorrelator output signals constitute the decorrelated audio signals. The multi-channel audio decoder is configured to combine the rendered audio signals, or a scaled version thereof, with the one or more decorrelated audio signals (of the second set of decorrelator output signals), to obtain the output audio signals. This embodiment according to the invention is based on the finding that the multi-channel decorrelator described herein is well-suited for a post-rendering processing, wherein a comparatively large number of rendered audio signals is input into the multi-channel decorrelator, and wherein a comparatively large number of decorrelated signals is then combined with the rendered audio signals. Moreover, it has been found that the imperfections caused by the usage of a comparatively small number of individual decorrelators (complexity reduction in the multi-channel decorrelator) typically does not result in a severe degradation of a quality of the output audio signals output by the multi-channel decoder.

In one embodiment, the multi-channel audio decoder is configured to select a premixing matrix for usage by the multi-channel decorrelator in dependence on a control information included in the encoded representation. Accordingly, it is even possible for an audio encoder to control the quality of the decorrelation, such that the quality of the decorrelation can be well-adapted to the specific audio content, which brings along a good tradeoff between audio quality and decorrelation complexity.

In one embodiment, the multi-channel audio decoder is configured to select a premixing matrix for usage by the multi-channel decorrelator in dependence on an output configuration describing an allocation of output audio signals with spatial positions of the audio scene.

Accordingly, the multi-channel decorrelator can be adapted to the specific rendering scenario, which helps to avoid substantial degradation of the audio quality by the efficient decorrelation.

In one embodiment, the multi-channel audio decoder is configured to select between three or more different premixing matrices for usage by the multi-channel decorrelator in dependence on a control information included in the encoded representation for a given output representation. In this case, each of the three or more different premixing matrices is associated with a different number of signals of the second set of K decorrelator input signals. Thus, the complexity of the decorrelation can be adjusted over a wide range.

In one embodiment, the multi-channel audio decoder is configured to select a premixing matrix ($M_{pre}$) for usage by the multi-channel decorrelator in dependence on a mixing matrix (Dconv, Drender) which is used by an format converter or renderer which receives the at least two output audio signals.

In another embodiment, the multi-channel audio decoder is configured to select the premixing matrix ($M_{pre}$) for usage by the multi-channel decorrelator to be equal to a mixing matrix (Dconv, Drender) which is used by a format converter or renderer which receives the at least two output audio signals.

An embodiment according to the invention creates a multi-channel audio encoder for providing an encoded representation on the basis of at least two input audio signals. The multi-channel audio encoder is configured to provide one or more downmix signals on the basis of the at least two input audio signals. The multi-channel audio encoder is also configured to provide one or more parameters describing a relationship between the at least two input audio signals. Moreover, the multi-channel audio encoder is configured to provide a decorrelation complexity parameter describing a complexity of a decorrelation to be used at the side of an audio decoder. Accordingly, the multi-channel audio encoder is able to control the multi-channel audio decoder described above, such that the complexity of the decorrelation can be adjusted to the requirements of the audio content which is encoded by the multi-channel audio encoder.

Another embodiment according to the invention creates a method for providing a plurality of decorrelated signals on the basis of a plurality of decorrelator input signals. The method comprises premixing a first set of N decorrelator input signals into a second set of K decorrelator input signals, wherein K<N. The method also comprises providing a first set of K' decorrelator output signals on the basis of the second set of K decorrelator input signals. Moreover, the method comprises upmixing the first set of K' decorrelator output signals into a second set of N' decorrelator output signals, wherein N'>K'. This method is based on the same ideas as the above described multi-channel decorrelator.

Another embodiment according to the invention creates a method for providing at least two output audio signals on the basis of an encoded representation. The method comprises providing a plurality of decorrelated signals on the basis of a plurality of decorrelator input signals, as described above. This method is based on the same findings as the multi-channel audio decoder mentioned above.

Another embodiment creates a method for providing an encoded representation on the basis of at least two input audio signals. The method comprises providing one or more downmix signals on the basis of the at least two input audio signals. The method also comprises providing one or more parameters describing a relationship between the at least two input audio signals. Further, the method comprises providing a decorrelation complexity parameter describing a complexity of a decorrelation to be used at the side of an audio decoder. This method is based on the same ideas as the above described audio encoder.

Furthermore, embodiments according to the invention create a computer program for performing said methods.

Another embodiment according to the invention creates an encoded audio representation. The encoded audio representation comprises an encoded representation of a downmix signal and an encoded representation of one or more parameters describing a relationship between the at least two input audio signals. Furthermore, the encoded audio representation comprises an encoded decorrelation method parameter describing which decorrelation mode out of a plurality of decorrelation modes should be used at the side of an audio decoder. Accordingly, the encoded audio representation allows to control the multi-channel decorrelator described above, as well as the multi-channel audio decoder described above.

Moreover, it should be noted that the methods described above can be supplemented by any of the features and functionality described with respect to the apparatuses as mentioned above.

BRIEF DESCRIPTION OF THE DRAWINGS

Embodiments according to the present invention will subsequently be described taking reference to the enclosed figures in which:

FIG. 18 shows a table representation of loudspeaker positions, according to an embodiment of the present invention;

FIGS. 19*a* to 19*g* show table representations of premixing coefficients for N=22 and K between 5 and 11;

FIGS. 20*a* to 20*d* show table representations of premixing coefficients for N=10 and K between 2 and 5;

FIGS. 21*a* to 21*c* show table representations of premixing coefficients for N=8 and K between 2 and 4;

FIGS. 21*d* to 21*f* show table representations of premixing coefficients for N=7 and K between 2 and 4;

FIGS. 22*a* and 22*b* show table representations of premixing coefficients for N=5 and K=2 or K=3;

FIG. 23 shows a table representation of premixing coefficients for N=2 and K=1;

FIG. 24 shows a table representation of groups of channel signals;

FIG. 25 shows a syntax representation of additional parameters, which may be included into the syntax of SAOCSpecifigConfig( ) or, equivalently, SAOC3DSpecificConfig( );

FIG. 26 shows a table representation of different values for the bitstream variable bsDecorrelationMethod;

FIG. 27 shows a table representation of a number of decorrelators for different decorrelation levels and output configurations, indicated by the bitstream variable bsDecorrelationLevel;

FIGS. 33*a* and 33*b* shows a syntax representation of a bitstream element "SAOC3DSpecificConfig".

DETAILED DESCRIPTION OF THE INVENTION

1. Multi-Channel Audio Decoder According to FIG. 1

Figure 1:
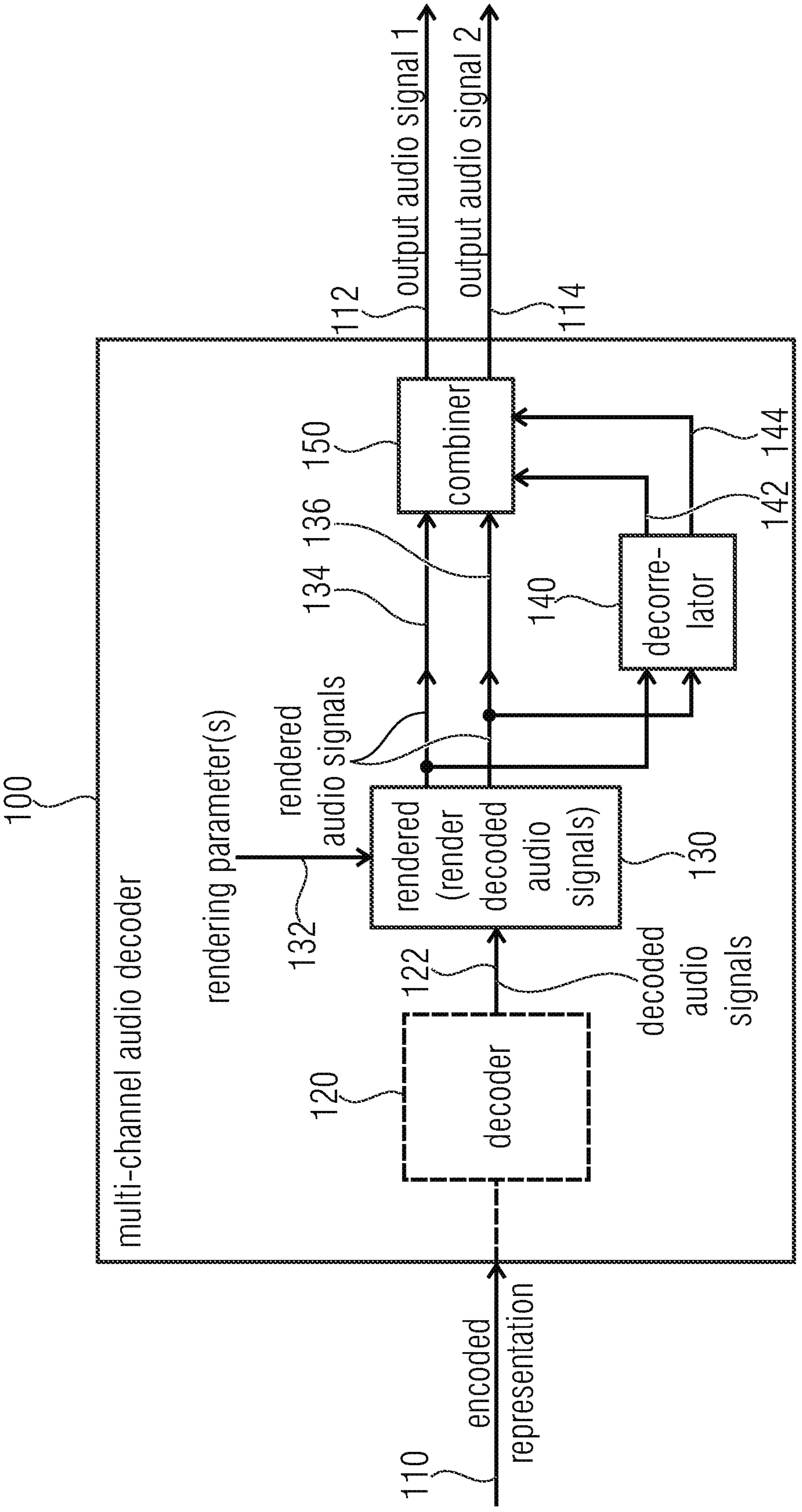
FIG. 1 shows a block schematic diagram of a multi-channel audio decoder, according to an embodiment of the present invention.

FIG. 1 shows a block schematic diagram of a multi-channel audio decoder 100, according to an embodiment of the present invention.

The multi-channel audio decoder 100 is configured to receive an encoded representation 110 and to provide, on the basis thereof, at least two output audio signals 112, 114.

The multi-channel audio decoder 100 may comprise a decoder 120 which is configured to provide decoded audio signals 122 on the basis of the encoded representation 110. Moreover, the multi-channel audio decoder 100 comprises a renderer 130, which is configured to render a plurality of decoded audio signals 122, which are obtained on the basis of the encoded representation 110 (for example, by the decoder 120) in dependence on one or more rendering parameters 132, to obtain a plurality of rendered audio signals 134, 136. Moreover, the multi-channel audio decoder 100 comprises a decorrelator 140, which is configured to derive one or more decorrelated audio signals 142, 144 from the rendered audio signals 134, 136. Moreover, the multi-channel audio decoder 100 comprises a combiner 150, which is configured to combine the rendered audio signals 134, 136, or a scaled version thereof, with the one or more decorrelated audio signals 142, 144 to obtain the output audio signals 112, 114.

However, it should be noted that a different hardware structure of the multi-channel audio decoder 100 may be possible, as long as the functionalities described above are given.

Regarding the functionality of the multi-channel audio decoder 100, it should be noted that the decorrelated audio signals 142, 144 are derived from the rendered audio signals 134, 136, and that the decorrelated audio signals 142,144 are combined with the rendered audio signals 134, 136 to obtain the output audio signals 112, 114. By deriving the decorrelated audio signals 142, 144 from the rendered audio signals 134, 136, a particularly efficient processing can be achieved, since the number of rendered audio signals 134, 136 is typically independent from the number of decoded audio signals 122 which are input into the renderer 130. Thus, the decorrelation effort is typically independent from the number of decoded audio signals 122, which improves the implementation efficiency. Moreover, applying the decorrelation after the rendering avoids the introduction of artifacts, which could be caused by the renderer when combining multiple decorrelated signals in the case that the decorrelation is applied before the rendering. Moreover, characteristics of the rendered audio signals can be considered in the decorrelation performed by the decorrelator 140, which typically results in output audio signals of good quality.

Moreover, it should be noted that the multi-channel audio decoder 100 can be supplemented by any of the features and functionalities described herein. In particular, it should be noted that individual improvements as described herein may be introduced into the multi-channel audio decoder 100 in order to thereby even Improve the efficiency of the processing and/or the quality of the output audio signals.

2. Multi-Channel Audio Encoder According to FIG. 2

Figure 2:
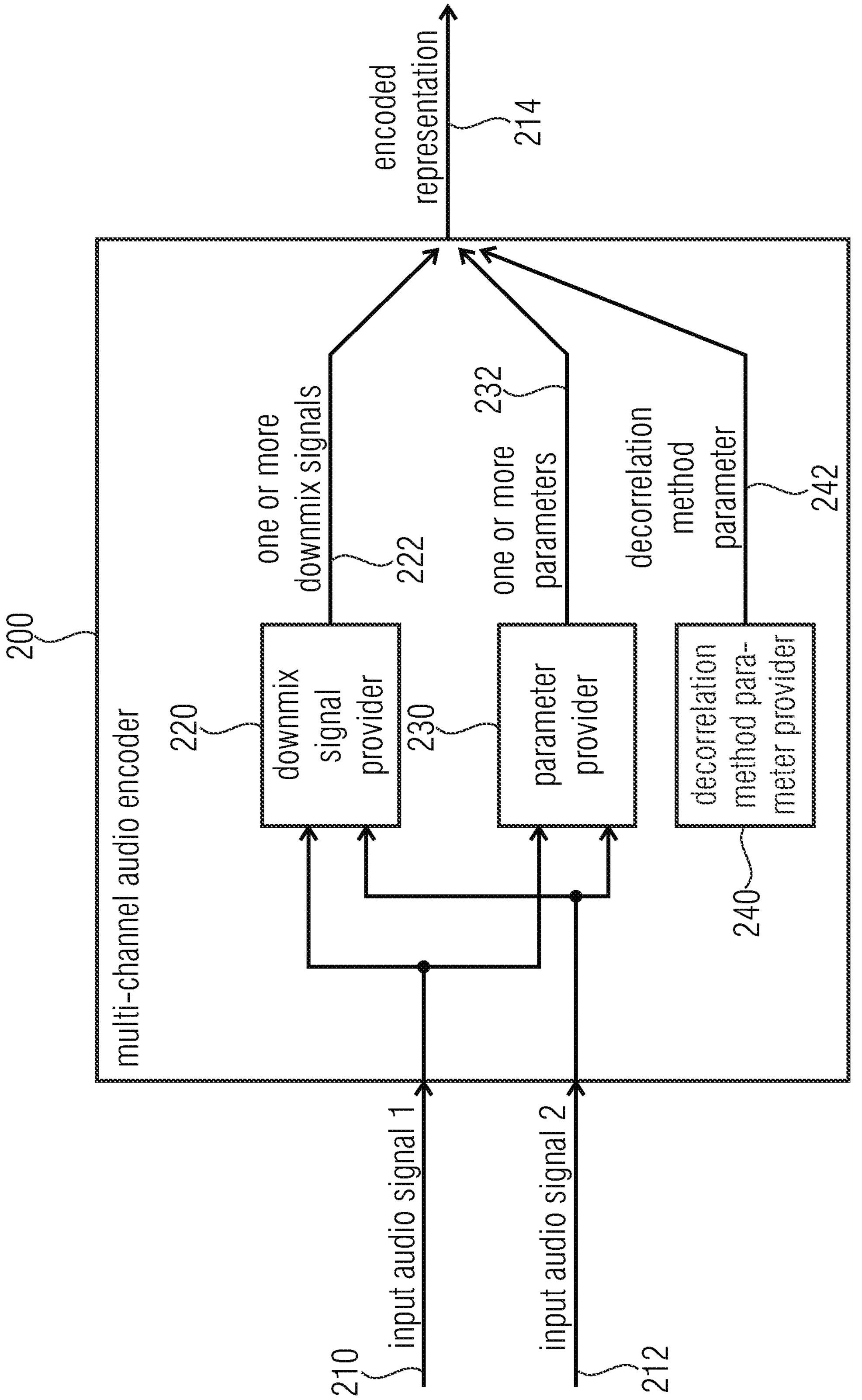
FIG. 2 shows a block schematic diagram of a multi-channel audio encoder, according to an embodiment of the present invention.

FIG. 2 shows a block schematic diagram of a multi-channel audio encoder 200, according to an embodiment of the present invention. The multi-channel audio encoder 200 is configured to receive two or more input audio signals 210, 212, and to provide, on the basis thereof, an encoded representation 214. The multi-channel audio encoder comprises a downmix signal provider 220, which is configured to provide one or more downmix signals 222 on the basis of the at least two input audio signals 210, 212. Moreover, the multi-channel audio encoder 200 comprises a parameter provider 230, which is configured to provide one or more parameters 232 describing a relationship (for example, a cross-correlation, a cross-covariance, a level difference or the like) between the at least two input audio signals 210, 212.

Moreover, the multi-channel audio encoder 200 also comprises a decorrelation method parameter provider 240, which is configured to provide a decorrelation method parameter 242 describing which decorrelation mode out of a plurality of decorrelation modes should be used at the side of an audio decoder. The one or more downmix signals 222, the one or more parameters 232 and the decorrelation method parameter 242 are included, for example, in an encoded form, into the encoded representation 214.

However, it should be noted that the hardware structure of the multi-channel audio encoder 200 may be different, as long as the functionalities as described above are fulfilled. In other words, the distribution of the functionalities of the multi-channel audio encoder 200 to individual blocks (for example, to the downmix signal provider 220, to the parameter provider 230 and to the decorrelation method parameter provider 240) should only be considered as an example.

Regarding the functionality of the multi-channel audio encoder 200, it should be noted that the one or more downmix signals 222 and the one or more parameters 232 are provided in a conventional way, for example like in an SAOC multi-channel audio encoder or in a USAC multi-channel audio encoder. However, the decorrelation method parameter 242, which is also provided by the multi-channel audio encoder 200 and included into the encoded representation 214, can be used to adapt a decorrelation mode to the input audio signals 210, 212 or to a desired playback quality. Accordingly, the decorrelation mode can be adapted to different types of audio content. For example, different decorrelation modes can be chosen for types of audio contents in which the input audio signals 210, 212 are strongly correlated and for types of audio content in which the input audio signals 210, 212 are independent. Moreover, different decorrelation modes can, for example, be signaled by the decorrelation mode parameter 242 for types of audio contents in which a spatial perception is particularly important and for types of audio content in which a spatial impression is less important or even of subordinate importance (for example, when compared to a reproduction of individual channels). Accordingly, a multi-channel audio decoder, which receives the encoded representation 214, can be controlled by the multi-channel audio encoder 200, and may be set to a decoding mode which brings along a best possible compromise between decoding complexity and reproduction quality.

Moreover, it should be noted that the multi-channel audio encoder 200 may be supplemented by any of the features and functionalities described herein. It should be noted that the possible additional features and improvements described herein may be added to the multi-channel audio encoder 200 individually or in combination, to thereby improve (or enhance) the multi-channel audio encoder 200.

3. Method for Providing at Least Two Output Audio Signals According to FIG. 3

Figure 3:
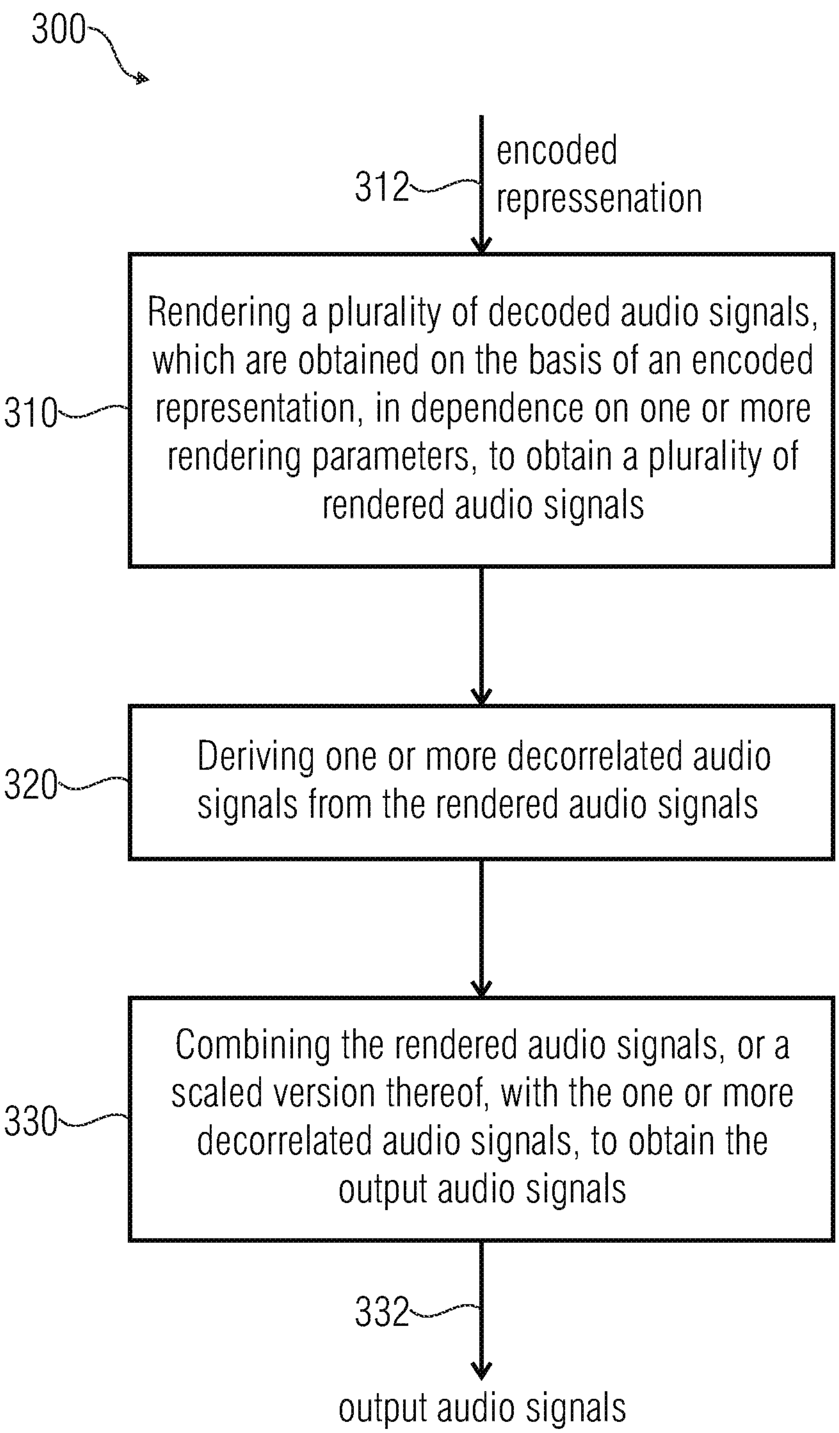
FIG. 3 shows a flowchart of a method for providing at least two output audio signals on the basis of an encoded representation, according to an embodiment of the invention.

FIG. 3 shows a flowchart of a method 300 for providing at least two output audio signals on the basis of an encoded representation. The method comprises rendering 310 a plurality of decoded audio signals, which are obtained on the basis of an encoded representation 312, in dependence on one or more rendering parameters, to obtain a plurality of rendered audio signals. The method 300 also comprises deriving 320 one or more decorrelated audio signals from the rendered audio signals. The method 300 also comprises combining 330 the rendered audio signals, or a scaled version thereof, with the one or more decorrelated audio signals, to obtain the output audio signals 332.

It should be noted that the method 300 is based on the same considerations as the multi-channel audio decoder 100 according to FIG. 1. Moreover, it should be noted that the method 300 may be supplemented by any of the features and functionalities described herein (either individually or in combination). For example, the method 300 may be supplemented by any of the features and functionalities described with respect to the multi-channel audio decoders described herein.

4. Method for Providing an Encoded Representation According to FIG. 4

Figure 4:
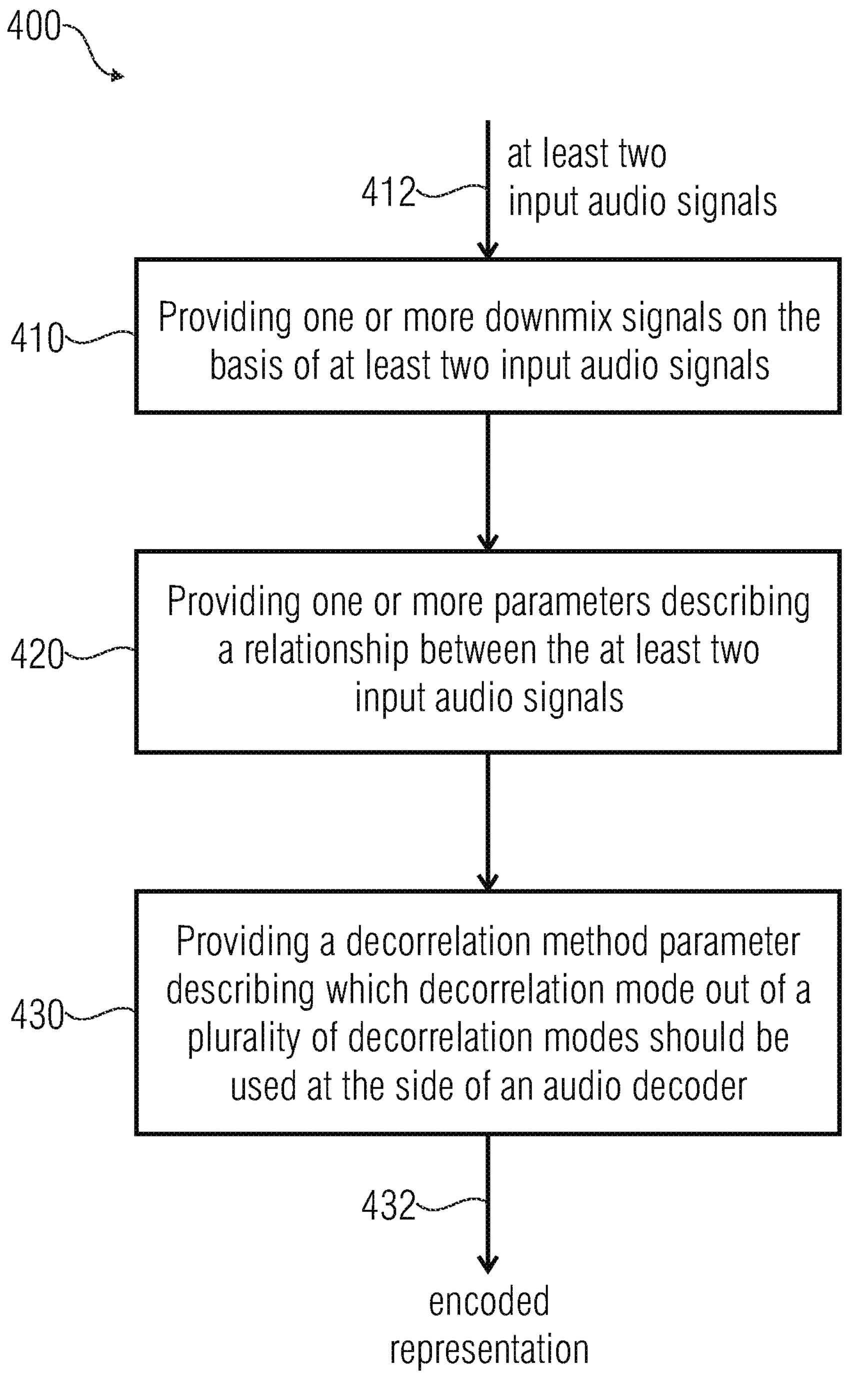
FIG. 4 shows a flowchart of a method for providing an encoded representation on the basis of at least two input audio signals, according to an embodiment of the present invention.

FIG. 4 shows a flowchart of a method 400 for providing an encoded representation on the basis of at least two input audio signals. The method 400 comprises providing 410 one or more downmix signals on the basis of at least two input audio signals 412. The method 400 further comprises providing 420 one or more parameters describing a relationship between the at least two input audio signals 412 and providing 430 a decorrelation method parameter describing which decorrelation mode out of a plurality of decorrelation modes should be used at the side of an audio decoder. Accordingly, an encoded representation 432 is provided, which may include an encoded representation of the one or more downmix signals, one or more parameters describing a relationship between the at least two input audio signals, and the decorrelation method parameter.

It should be noted that the method 400 is based on the same considerations as the multi-channel audio encoder 200 according to FIG. 2, such that the above explanations also apply. Moreover, it should be noted that the order of the steps 410, 420, 430 can be varied flexibly, and that the steps 410, 420, 430 may also be performed in parallel as far as this is possible in an execution environment for the method 400. Moreover, it should be noted that the method 400 can be supplemented by any of the features and functionalities described herein, either individually or in combination. For example, the method 400 may be supplemented by any of the features and functionalities described herein with respect to the multi-channel audio encoders. However, it is also possible to introduce features and functionalities which correspond to the features and functionalities of the multi-channel audio decoders described herein, which receive the encoded representation 432.

5. Encoded Audio Representation According to FIG. 5

Figure 5:
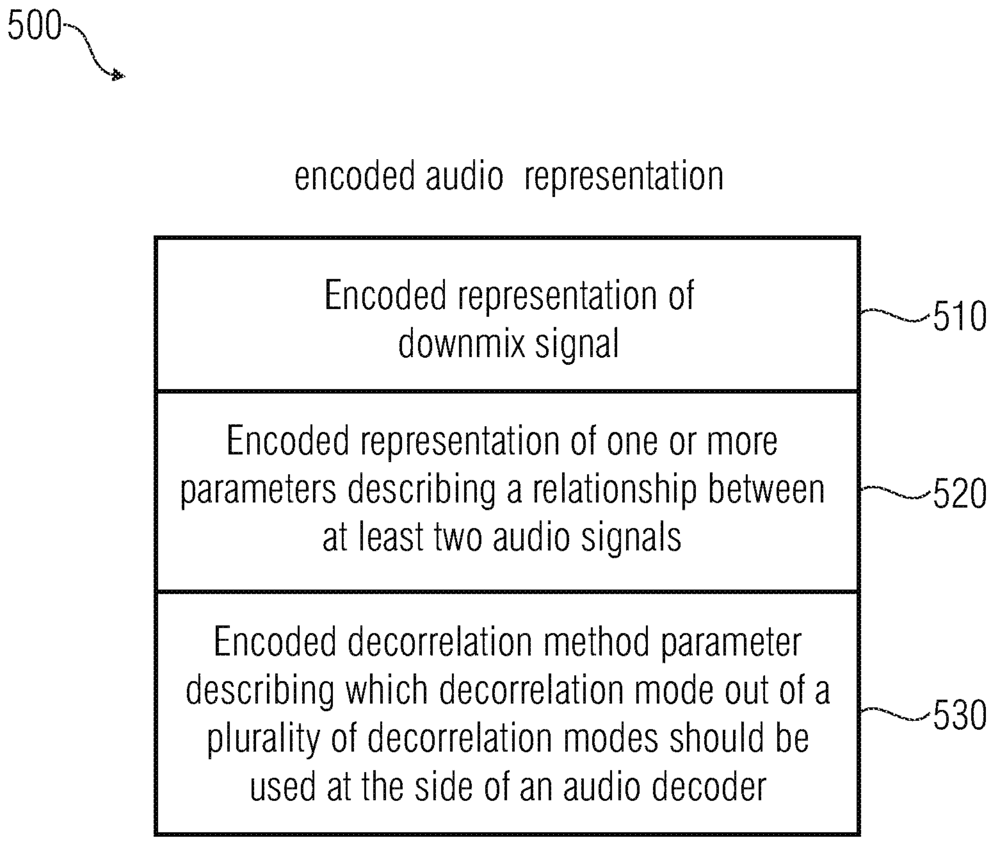
FIG. 5 shows a schematic representation of an encoded audio representation, according to an embodiment of the present invention.

FIG. 5 shows a schematic representation of an encoded audio representation 500 according to an embodiment of the present invention.

The encoded audio representation 500 comprises an encoded representation 510 of a downmix signal, an encoded representation 520 of one or more parameters describing a relationship between at least two audio signals. Moreover, the encoded audio representation 500 also comprises an encoded decorrelation method parameter 530 describing which decorrelation mode out of a plurality of decorrelation modes should be used at the side of an audio decoder. Accordingly, the encoded audio representation allows to signal a decorrelation mode from an audio encoder to an audio decoder. Accordingly, it is possible to obtain a decorrelation mode which is well-adapted to the characteristics of the audio content (which is described, for example, by the encoded representation 510 of one or more downmix signals and by the encoded representation 520 of one or more parameters describing a relationship between at least two audio signals (for example, the at least two audio signals which have been downmixed into the encoded representation 510 of one or more downmix signals)). Thus, the encoded audio representation 500 allows for a rendering of an audio content represented by the encoded audio representation 500 with a particularly good auditory spatial impression and/or a particularly good tradeoff between auditory spatial impression and decoding complexity.

Moreover, it should be noted that the encoded representation 500 may be supplemented by any of the features and functionalities described with respect to the multi-channel audio encoders and the multi-channel audio decoders, either individually or in combination.

6. Multi-Channel Decorrelator According to FIG. 6

Figure 6:
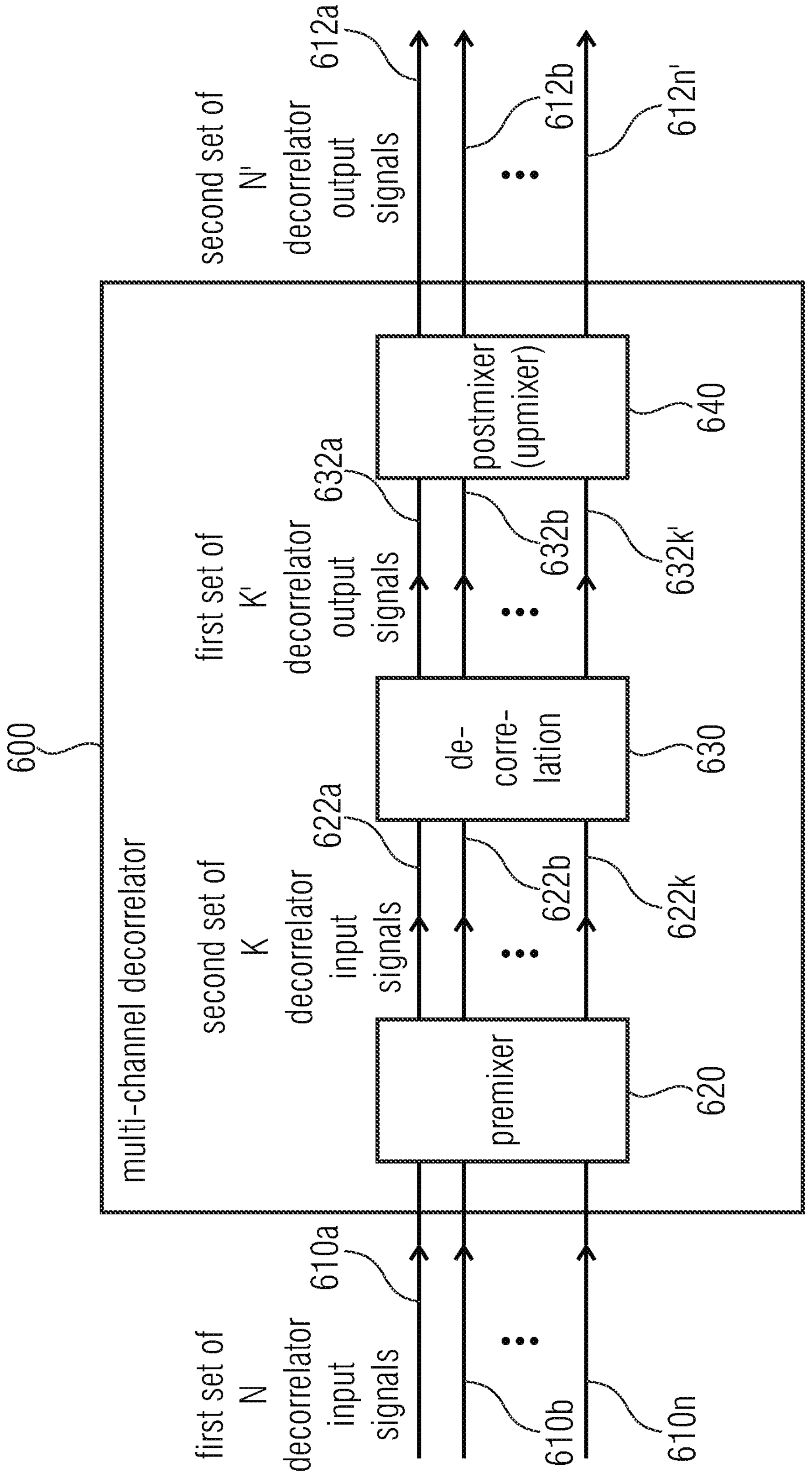
FIG. 6 shows a block schematic diagram of a multi-channel decorrelator, according to an embodiment of the present invention.

FIG. 6 shows a block schematic diagram of a multi-channel decorrelator 600, according to an embodiment of the present invention.

The multi-channel decorrelator 600 is configured to receive a first set of N decorrelator input signals 610*a* to 610*n* and provide, on the basis thereof, a second set of N' decorrelator output signals 612*a* to 612*n*'. In other words, the multi-channel decorrelator 600 is configured for providing a plurality of (at least approximately) decorrelated signals 612*a* to 612*n*' on the basis of the decorrelator input signals 610*a* to 610*n*.

The multi-channel decorrelator 600 comprises a premixer 620, which is configured to premix the first set of N decorrelator input signals 610*a* to 610*n* into a second set of K decorrelator input signals 622*a* to 622*k*, wherein K is smaller than N (with K and N being integers). The multi-channel decorrelator 600 also comprises a decorrelation (or decorrelator core) 630, which is configured to provide a first set of K' decorrelator output signals 632*a* to 632*k*' on the basis of the second set of K decorrelator input signals 622*a* to 622*k*. Moreover, the multi-channel decorrelator comprises an postmixer 640, which is configured to upmix the first set of K' decorrelator output signals 632*a* to 632*k*' into a second set of N' decorrelator output signals 612*a* to 612*n*', wherein N' is larger than K' (with N' and K' being integers).

However, it should be noted that the given structure of the multi-channel decorrelator 600 should be considered as an example only, and that it is not necessary to subdivide the multi-channel decorrelator 600 into functional blocks (for example, into the premixer 620, the decorrelation or decorrelator core 630 and the postmixer 640) as long as the functionality described herein is provided.

Regarding the functionality of the multi-channel decorrelator 600, it should also be noted that the concept of performing a premixing, to derive the second set of K decorrelator input signals from the first set of N decorrelator input signals, and of performing the decorrelation on the basis of the (premixed or "downmixed") second set of K decorrelator input signals brings along a reduction of a complexity when compared to a concept in which the actual decorrelation is applied, for example, directly to N decorrelator input signals. Moreover, the second (upmixed) set of N' decorrelator output signals is obtained on the basis of the first (original) set of decorrelator output signals, which are the result of the actual decorrelation, on the basis of an postmixing, which may be performed by the upmixer 640. Thus, the multi-channel decorrelator 600 effectively (when seen from the outside) receives N decorrelator input signals and provides, on the basis thereof, N' decorrelator output signals, while the actual decorrelator core 630 only operates on a smaller number of signals (namely K downmixed decorrelator input signals 622*a* to 622*k* of the second set of K decorrelator input signals). Thus, the complexity of the multi-channel decorrelator 600 can be substantially reduced, when compared to conventional decorrelators, by performing a downmixing or "premixing" (which may advantageously be a linear premixing without any decorrelation functionality) at an input side of the decorrelation (or decorrelator core) 630 and by performing the upmixing or "postmixing" (for example, a linear upmixing without any additional decorrelation functionality) on the basis of the (original) output signals 632*a* to 632*k*' of the decorrelation (decorrelator core) 630.

Moreover, it should be noted that the multi-channel decorrelator 600 can be supplemented by any of the features and functionalities described herein with respect to the multi-channel decorrelation and also with respect to the multi-channel audio decoders. It should be noted that the features described herein can be added to the multi-channel decorrelator 600 either individually or in combination, to thereby improve or enhance the multi-channel decorrelator 600.

It should be noted that a multi-channel decorrelator without complexity reduction can be derived from the above described multichannel decorrelator for K=N (and possibly K'=N' or even K=N=K'=N').

7. Multi-channel Audio Decoder According to FIG. 7

Figure 7:
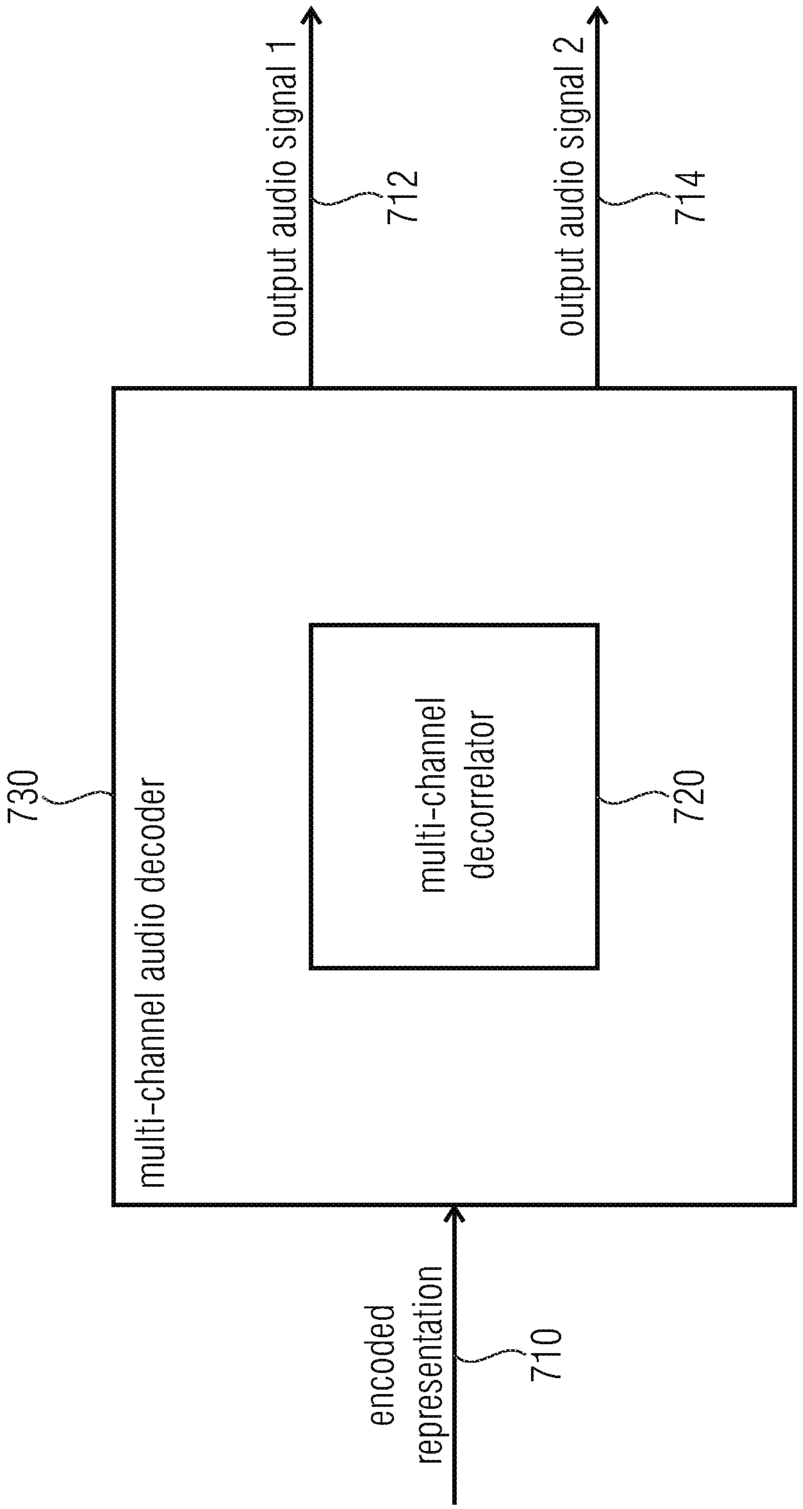
FIG. 7 shows a block schematic diagram of a multi-channel audio decoder, according to an embodiment of the present invention.

FIG. 7 shows a block schematic diagram of a multi-channel audio decoder 700, according to an embodiment of the invention.

The multi-channel audio decoder 700 is configured to receive an encoded representation 710 and to provide, on the basis of thereof, at least two output signals 712, 714. The multi-channel audio decoder 700 comprises a multi-channel decorrelator 720, which may be substantially identical to the multi-channel decorrelator 600 according to FIG. 6. Moreover, the multi-channel audio decoder 700 may comprise any of the features and functionalities of a multi-channel audio decoder which are known to the man skilled in the art or which are described herein with respect to other multi-channel audio decoders.

Moreover, it should be noted that the multi-channel audio decoder 700 comprises a particularly high efficiency when compared to conventional multi-channel audio decoders, since the multi-channel audio decoder 700 uses the high-efficiency multi-channel decorrelator 720.

8. Multi-Channel Audio Encoder According to FIG. 8

Figure 8:
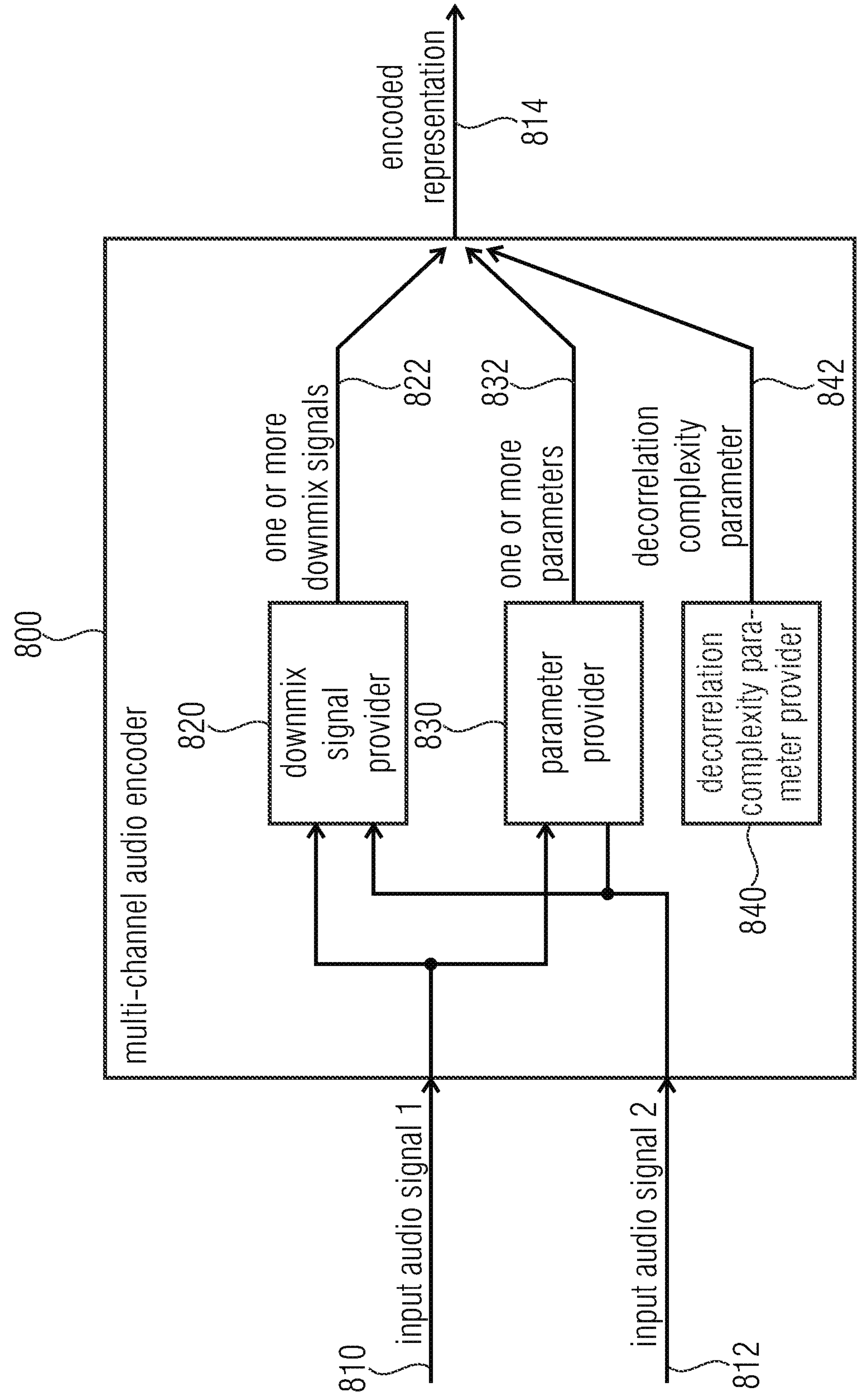
FIG. 8 shows a block schematic diagram of a multi-channel audio encoder, according to an embodiment of the present invention.

FIG. 8 shows a block schematic diagram of a multi-channel audio encoder 800 according to an embodiment of the present invention. The multi-channel audio encoder 800 is configured to receive at least two input audio signals 810, 812 and to provide, on the basis thereof, an encoded representation 814 of an audio content represented by the input audio signals 810, 812.

The multi-channel audio encoder 800 comprises a downmix signal provider 820, which is configured to provide one or more downmix signals 822 on the basis of the at least two input audio signals 810, 812. The multi-channel audio encoder 800 also comprises a parameter provider 830 which is configured to provide one or more parameters 832 (for example, cross-correlation parameters or cross-covariance parameters, or inter-object-correlation parameters and/or object level difference parameters) on the basis of the input audio signals 810,812. Moreover, the multi-channel audio encoder 800 comprises a decorrelation complexity parameter provider 840 which is configured to provide a decorrelation complexity parameter 842 describing a complexity of a decorrelation to be used at the side of an audio decoder (which receives the encoded representation 814). The one or more downmix signals 822, the one or more parameters 832 and the decorrelation complexity parameter 842 are included into the encoded representation 814, advantageously in an encoded form.

However, it should be noted that the internal structure of the multi-channel audio encoder 800 (for example, the presence of the downmix signal provider 820, of the parameter provider 830 and of the decorrelation complexity parameter provider 840) should be considered as an example only. Different structures are possible as long as the functionality described herein is achieved.

Regarding the functionality of the multi-channel audio encoder 800, it should be noted that the multi-channel encoder provides an encoded representation 814, wherein the one or more downmix signals 822 and the one or more parameters 832 may be similar to, or equal to, downmix signals and parameters provided by conventional audio encoders (like, for example, conventional SAOC audio encoders or USAC audio encoders). However, the multi-channel audio encoder 800 is also configured to provide the decorrelation complexity parameter 842, which allows to determine a decorrelation complexity which is applied at the side of an audio decoder. Accordingly, the decorrelation complexity can be adapted to the audio content which is currently encoded. For example, it is possible to signal a desired decorrelation complexity, which corresponds to an achievable audio quality, in dependence on an encoder-sided knowledge about the characteristics of the input audio signals. For example, if it is found that spatial characteristics are important for an audio signal, a higher decorrelation complexity can be signaled, using the decorrelation complexity parameter 842, when compared to a case in which spatial characteristics are not so important.

Alternatively, the usage of a high decorrelation complexity can be signaled using the decorrelation complexity parameter 842, if it is found that a passage of the audio content or the entire audio content is such that a high complexity decorrelation is necessitated at a side of an audio decoder for other reasons.

To summarize, the multi-channel audio encoder 800 provides for the possibility to control a multi-channel audio decoder, to use a decorrelation complexity which is adapted to signal characteristics or desired playback characteristics which can be set by the multi-channel audio encoder 800.

Moreover, it should be noted that the multi-channel audio encoder 800 may be supplemented by any of the features and functionalities described herein regarding a multi-channel audio encoder, either individually or in combination. For example, some or all of the features described herein with respect to multi-channel audio encoders can be added to the multi-channel audio encoder 800. Moreover, the multi-channel audio encoder 800 may be adapted for cooperation with the multi-channel audio decoders described herein.

9. Method for Providing a Plurality of Decorrelated Signals on the Basis of a Plurality of Decorrelator Input Signals, According to FIG. 9

Figure 9:
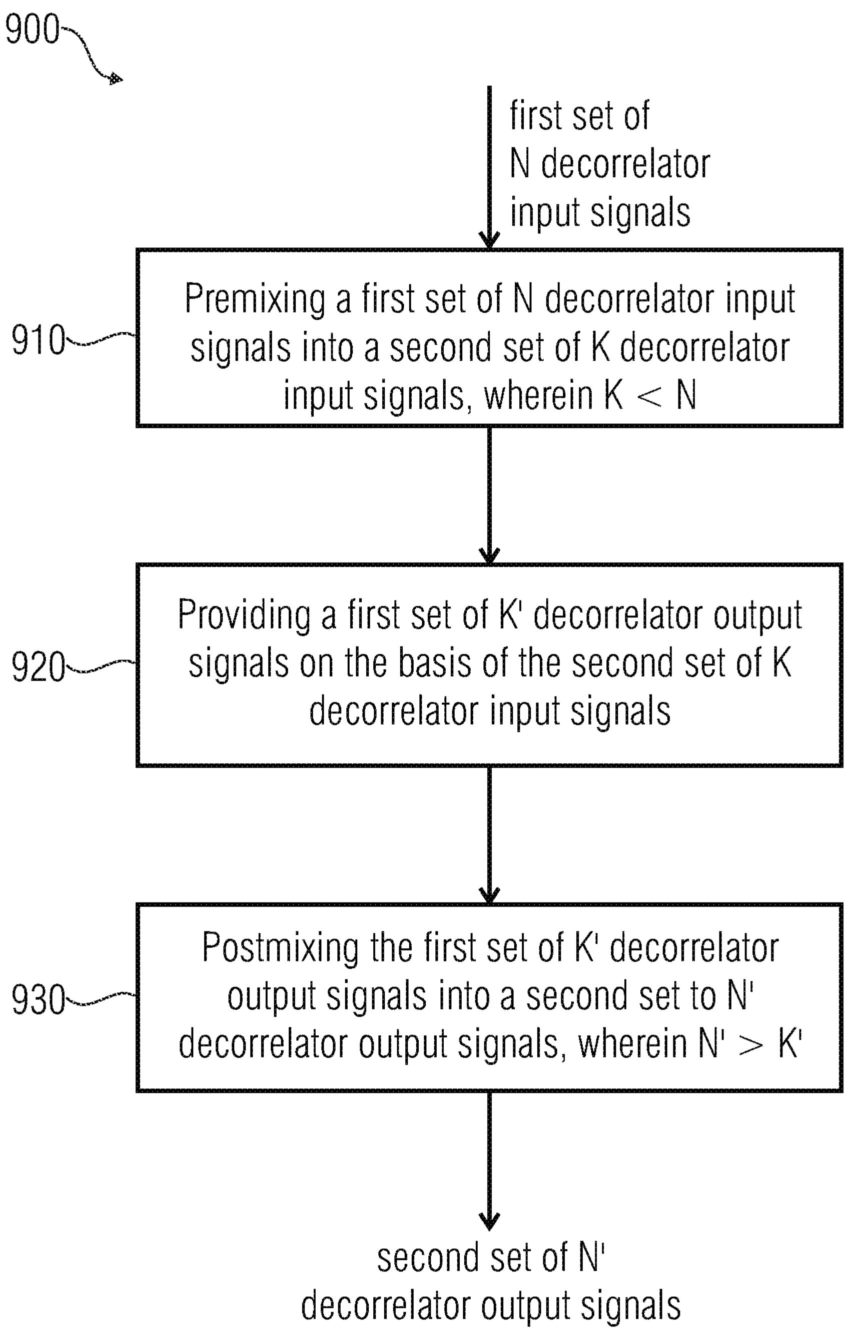
FIG. 9 shows a flowchart of a method for providing plurality of decorrelated signals on the basis of a plurality of decorrelator input signals, according to an embodiment of the present invention.

FIG. 9 shows a flowchart of a method 900 for providing a plurality of decorrelated signals on the basis of a plurality of decorrelator input signals.

The method 900 comprises premixing 910 a first set of N decorrelator input signals into a second set of K decorrelator input signals, wherein K is smaller than N. The method 900 also comprises providing 920 a first set of K' decorrelator output signals on the basis of the second set of K decorrelator input signals. For example, the first set of K' decorrelator output signals may be provided on the basis of the second set of K decorrelator input signals using a decorrelation, which may be performed, for example, using a decorrelator core or using a decorrelation algorithm. The method 900 further comprises postmixing 930 the first set of K' decorrelator output signals into a second set to N' decorrelator output signals, wherein N' is larger than K' (with N' and K' being integer numbers). Accordingly, the second set of N' decorrelator output signals, which are the output of the method 900, may be provided on the basis of the first set of N decorrelator input signals, which are the input to the method 900.

It should be noted that the method 900 is based on the same considerations as the multi-channel decorrelator described above. Moreover, it should be noted that the method 900 may be supplemented by any of the features and functionalities described herein with respect to the multi-channel decorrelator (and also with respect to the multi-channel audio encoder, if applicable), either individually or taken in combination.

10. Method for Providing at Least Two Output Audio Signals on the Basis of an Encoded Representation, According to FIG. 10

Figure 10:
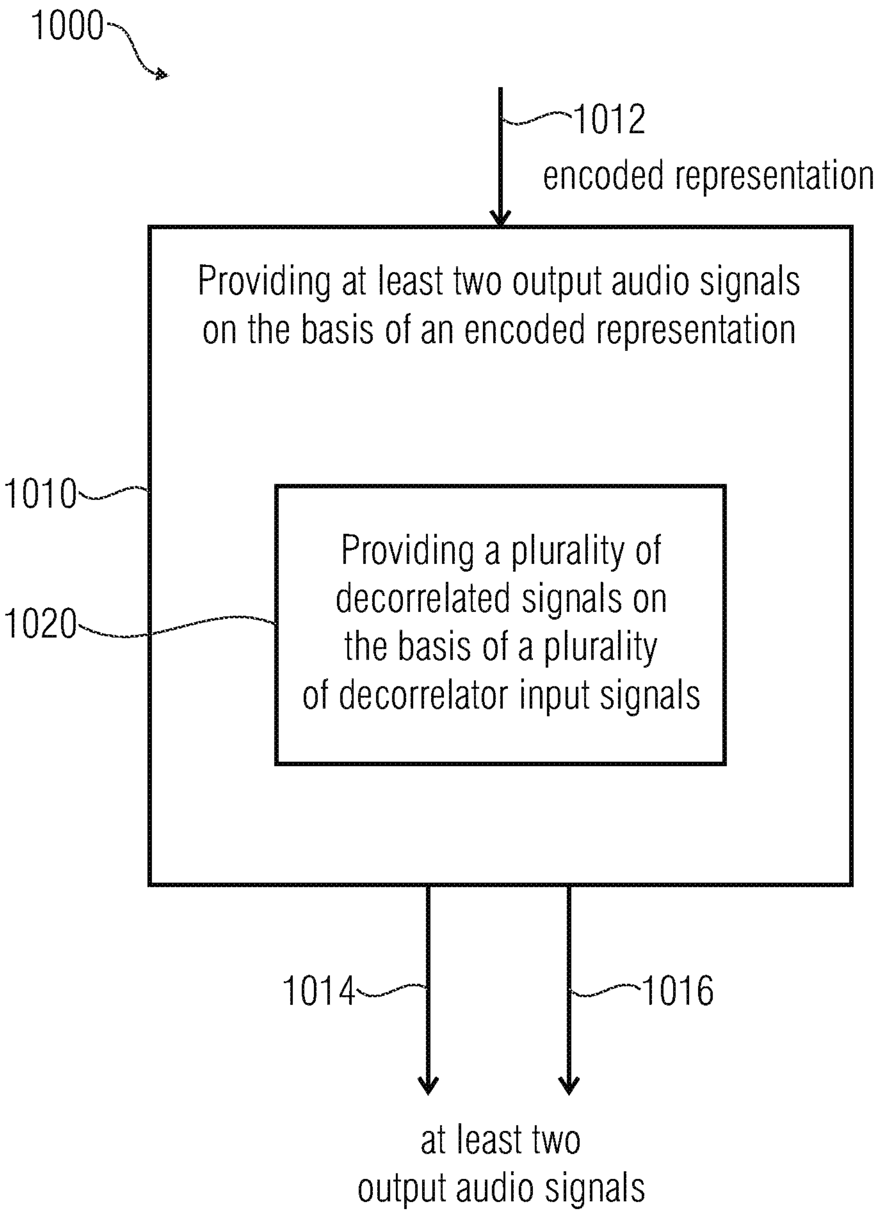
FIG. 10 shows a flowchart of a method for providing at least two output audio signals on the basis of an encoded representation, according to an embodiment of the present invention.

FIG. 10 shows a flowchart of a method 1000 for providing at least two output audio signals on the basis of an encoded representation.

The method 1000 comprises providing 1010 at least two output audio signals 1014, 1016 on the basis of an encoded representation 1012. The method 1000 comprises providing 1020 a plurality of decorrelated signals on the basis of a plurality of decorrelator input signals in accordance with the method 900 according to FIG. 9.

It should be noted that the method 1000 is based on the same considerations as the multi-channel audio decoder 700 according to FIG. 7.

Also, it should be noted that the method 1000 can be supplemented by any of the features and functionalities described herein with respect to the multi-channel decoders, either individually or in combination.

11. Method for Providing an Encoded Representation on the Basis of at Least Two Input Audio Signals, According to FIG. 11

Figure 11:
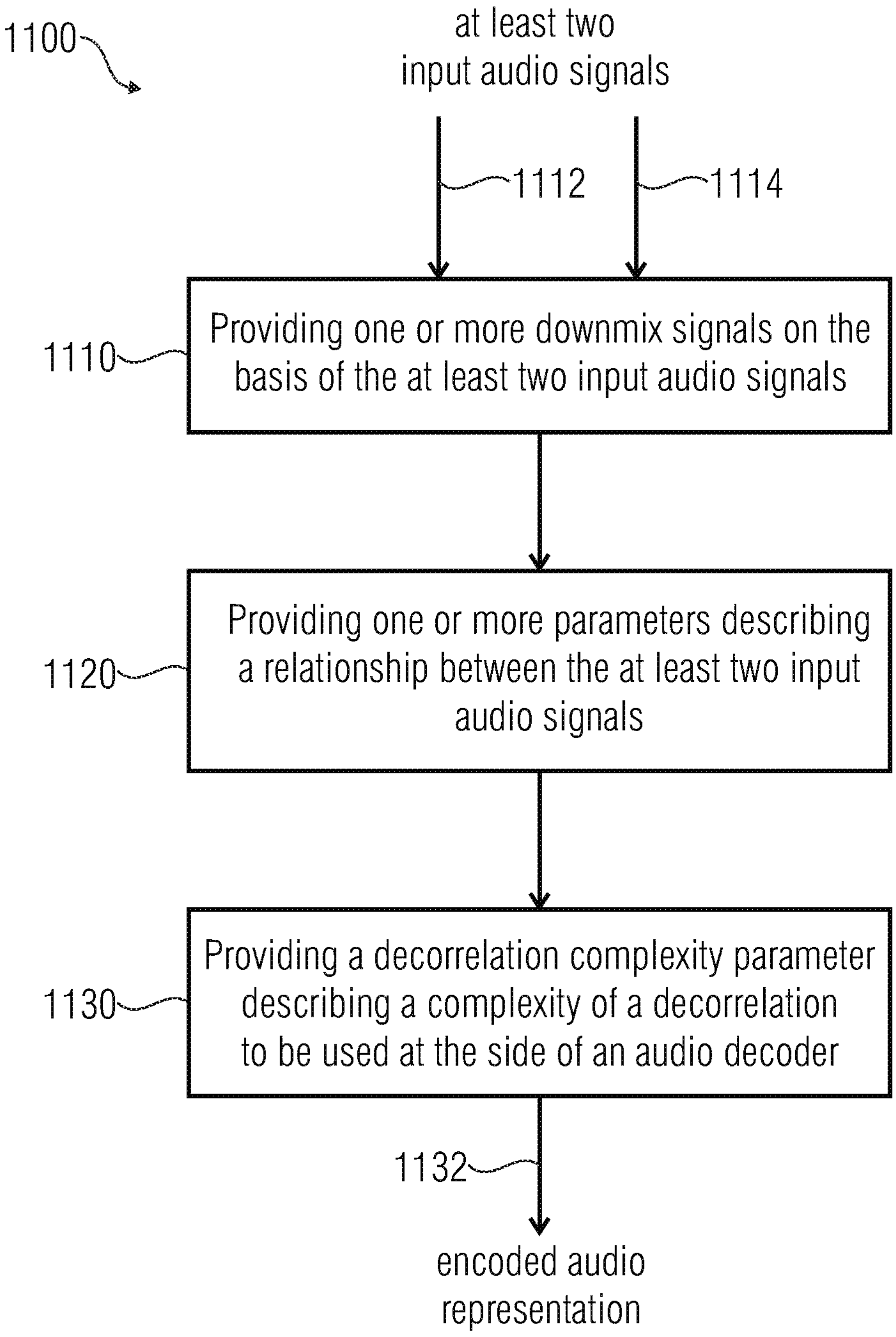
FIG. 11 shows a flowchart of a method for providing an encoded representation on the basis of at least two input audio signals, according to an embodiment of the present invention.

FIG. 11 shows a flowchart of a method 1100 for providing an encoded representation on the basis of at least two input audio signals.

The method 1100 comprises providing 1110 one or more downmix signals on the basis of the at least two input audio signals 1112, 1114. The method 1100 also comprises providing 1120 one or more parameters describing a relationship between the at least two input audio signals 1112, 1114. Furthermore, the method 1100 comprises providing 1130 a decorrelation complexity parameter describing a complexity of a decorrelation to be used at the side of an audio decoder. Accordingly, an encoded representation 1132 is provided on the basis of the at least two input audio signals 1112, 1114, wherein the encoded representation typically comprises the one or more downmix signals, the one or more parameters describing a relationship between the at least two input audio signals and the decorrelation complexity parameter in an encoded form.

It should be noted that the steps 1110, 1120, 1130 may be performed in parallel or in a different order in some embodiments according to the invention. Moreover, it should be noted that the method 1100 is based on the same considerations as the multi-channel audio encoder 800 according to FIG. 8, and that the method 1100 can be supplemented by any of the features and functionalities described herein with respect to the multi-channel audio encoder, either in combination or individually. Moreover, it should be noted that the method 1100 can be adapted to match the multi-channel audio decoder and the method for providing at least two output audio signals described herein.

12. Encoded Audio Representation According to FIG. 12

Figure 12:
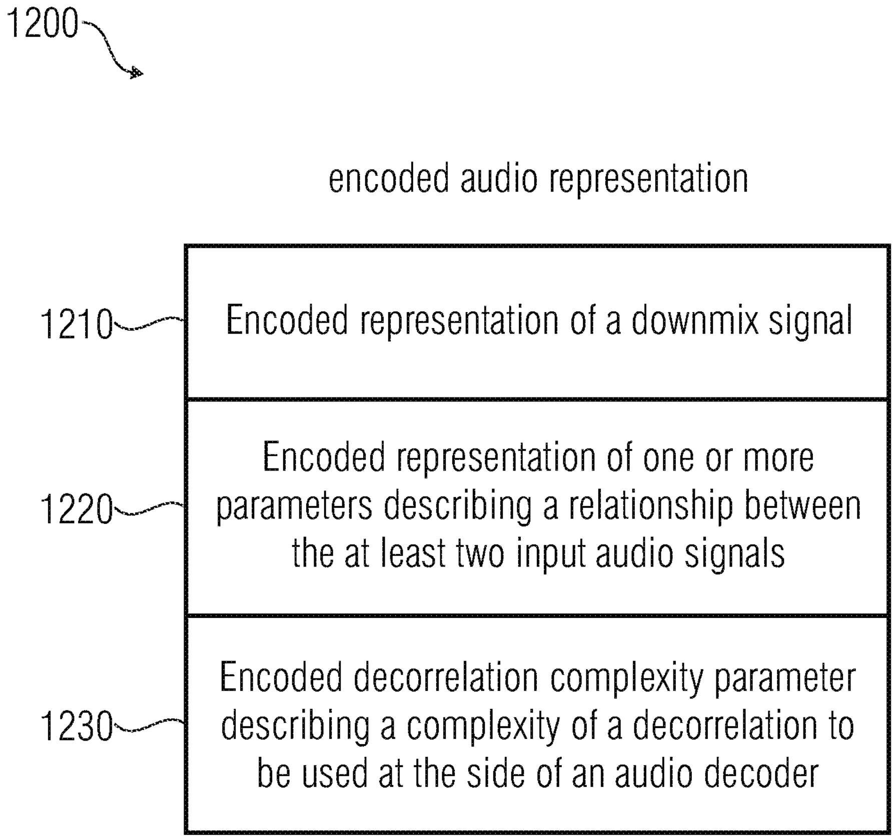
FIG. 12 shows a schematic representation of an encoded representation, according to an embodiment of the present invention.

FIG. 12 shows a schematic representation of an encoded audio representation, according to an embodiment of the present invention. The encoded audio representation 1200 comprises an encoded representation 1210 of a downmix signal, an encoded representation 1220 of one or more parameters describing a relationship between the at least two input audio signals, and an encoded decorrelation complexity parameter 1230 describing a complexity of a decorrelation to be used at the side of an audio decoder.

Accordingly, the encoded audio representation 1200 allows to adjust the decorrelation complexity used by a multi-channel audio decoder, which brings along an improved decoding efficiency, and possible an improved audio quality, or an improved tradeoff between coding efficiency and audio quality. Moreover, it should be noted that the encoded audio representation 1200 may be provided by the multi-channel audio encoder as described herein, and may be used by the multi-channel audio decoder as described herein.

Accordingly, the encoded audio representation 1200 can be supplemented by any of the features described with respect to the multi-channel audio encoders and with respect to the multi-channel audio decoders.

13. Notation and Underlying Considerations

Recently, parametric techniques for the bitrate efficient transmission/storage of audio scenes containing multiple audio objects have been proposed in the field of audio coding (see, for example, references [BCC], [JSC], [SAOC], [SAOC1], [SAOC2]) and informed source separation (see, for example, references [ISS1], [ISS2], [ISS3], [ISS4], [ISS5], [ISS6]). These techniques aim at reconstructing a desired output audio scene or audio source object based on additional side information describing the transmitted/stored audio scene and/or source objects in the audio scene. This reconstruction takes place in the decoder using a parametric informed source separation scheme. Moreover, reference is also made to the so-called "MPEG Surround" concept, which is described, for example, in the international standard ISO/IEC 23003-1:2007. Moreover, reference is also made to the so-called "Spatial Audio Object Coding" which is described in the international standard ISO/IEC 23003-2:2010. Furthermore, reference is made to the so-called "Unified Speech and Audio Coding" concept, which is described in the international standard ISO/IEC 23003-3:2012. Concepts from these standards can be used in embodiments according to the invention, for example, in the multi-channel audio encoders mentioned herein and the multi-channel audio decoders mentioned herein, wherein some adaptations may be necessitated.

In the following, some background information will be described. In particular, an overview on parametric separation schemes will be provided, using the example of MPEG spatial audio object coding (SAOC) technology (see, for example, the reference [SAOC]). The mathematical properties of this method are considered.

13.1. Notation and Definitions

The following mathematical notation is applied in the current document:

$N_{Objects}$ number of audio object signals
$N_{DmxCh}$ number of downmix (processed) channels
$N_{UpmixCh}$ number of upmix (output) channels
$N_{Samples}$ number of processed data samples
D downmix matrix, size $N_{DmxCh} \times N_{Objects}$
X input audio object signal, size $N_{Objects} \times N_{Samples}$
$E_X$ object covariance matrix, size $N_{Objects} \times N_{Objects}$ defined as $E_X = XX^H$
Y downmix audio signal, size $N_{DmxCh} \times N_{Samples}$ defined as $Y = DX$
$E_Y$ covariance matrix of the downmix signals, size $N_{DmxCh} \times N_{DmxCh}$ defined as $E_Y = YY^H$
G parametric source estimation matrix, size $N_{Objects} \times N_{DmxCh}$ which approximates $E_X D^H (D E_X D^H)^{-1}$
$\hat{X}$ parametrically reconstructed object signal, size $N_{Objects} \times N_{Samples}$ which approximates x and defined as $\hat{X} = GY$
R rendering matrix (specified at the decoder side), size $N_{UpmixCh} \times N_{Objects}$
Z ideal rendered output scene signal, size $N_{UpmixCh} \times N_{Samples}$ defined as $Z = RX$
$\hat{Z}$ rendered parametric output, size $N_{UpmixCh} \times N_{Samples}$ defined as $\hat{Z} = R\hat{X}$
C covariance matrix of the ideal output, size $N_{UpmixCh} \times N_{UpmixCh}$ defined as $C = R E_X R^H$
W decorrelator outputs, size $N_{UpmixCh} \times N_{Samples}$
S combined signal $$S = \begin{bmatrix} \hat{Z} \\ W \end{bmatrix},$$

size $2N_{UpmixCh} \times N_{Samples}$
$E_S$ combined signal covariance matrix, size $2N_{UpmixCh} \times 2N_{UpmixCh}$ defined as $E_S = SS^H$
$\tilde{Z}$ final output, size $N_{UpmixCh} \times N_{Samples}$
$(\cdot)^H$ self-adjoint (Hermitian) operator which represents the complex conjugate transpose of $(\cdot)$. The notation $(\cdot)^*$ can be also used.
$F_{decorr}(\cdot)$ decorrelator function
ε is an additive constant to avoid division by zero
H=matdiag(M) is a matrix containing the elements from the main diagonal of matrix M on the main diagonal and zero values on the off-diagonal positions.

Without loss of generality, in order to improve readability of equations, for all introduced variables the indices denoting time and frequency dependency are omitted in this document.

13.2. Parametric Separation Systems

General parametric separation systems aim to estimate a number of audio sources from a signal mixture (downmix) using auxiliary parameter information (like, for example, inter-channel correlation values, inter-channel level difference values, inter-object correlation values and/or object level difference information). A typical solution of this task is based on application of the minimum mean squared error (MMSE) estimation algorithms. The SAOC technology is one example of such parametric audio encoding/decoding systems.

Figure 13:
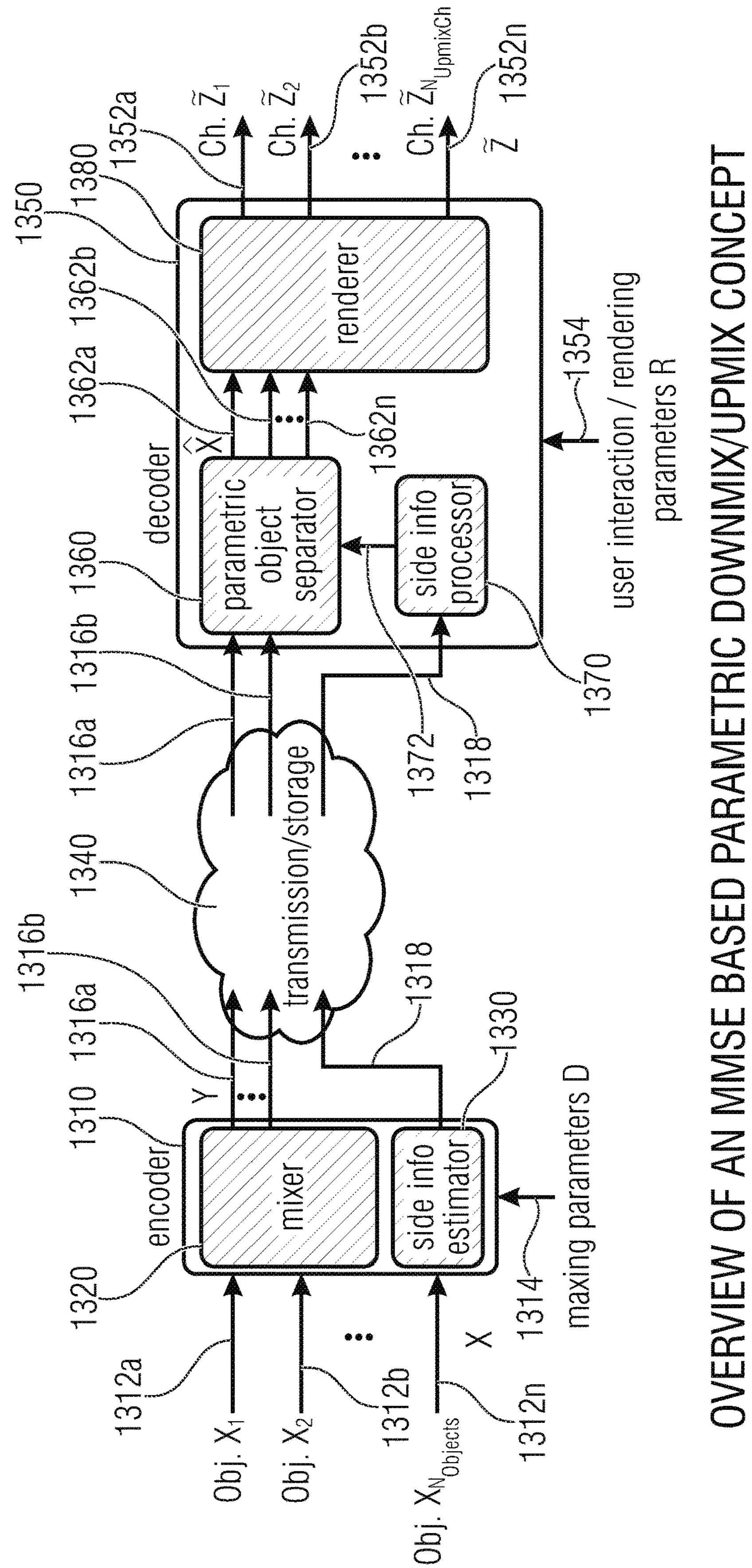
FIG. 13 shows schematic representation which provides an overview of an MMSE based parametric downmix/upmix concept.

FIG. 13 shows the general principle of the SAOC encoder/decoder architecture. In other words, FIG. 13 shows, in the form of a block schematic diagram, an overview of the MMSE based parametric downmix/upmix concept.

An encoder 1310 receives a plurality of object signals 1312*a*, 1312*b* to 1312*n*. Moreover, the encoder 1310 also receives mixing parameters D, 1314, which may, for example, be downmix parameters. The encoder 1310 provides, on the basis thereof, one or more downmix signals 1316*a*, 1316*b*, and so on. Moreover, the encoder provides a side information 1318 The one or more downmix signals and the side information may, for example, be provided in an encoded form.

The encoder 1310 comprises a mixer 1320, which is typically configured to receive the object signals 1312*a* to 1312*n* and to combine (for example downmix) the object signals 1312*a* to 1312*n* into the one or more downmix signals 1316*a*, 1316*b* in dependence on the mixing parameters 1314. Moreover, the encoder comprises a side information estimator 1330, which is configured to derive the side information 1318 from the object signals 1312*a* to 1312*n*. For example, the side information estimator 1330 may be configured to derive the side information 1318 such that the side information describes a relationship between object signals, for example, a cross-correlation between object signals (which may be designated as "inter-object-correlation" OC) and/or an information describing level differences between object signals (which may be designated as a "object level difference information" OLD).

The one or more downmix signals 1316*a*, 1316*b* and the side information 1318 may be stored and/or transmitted to a decoder 1350, which is indicated at reference numeral 1340.

The decoder 1350 receives the one or more downmix signals 1316*a*, 1316*b* and the side information 1318 (for example, in an encoded form) and provides, on the basis thereof, a plurality of output audio signals 1352*a* to 1352*n*. The decoder 1350 may also receive a user interaction information 1354, which may comprise one or more rendering parameters R (which may define a rendering matrix). The decoder 1350 comprises a parametric object separator 1360, a side information processor 1370 and a renderer 1380. The side information processor 1370 receives the side information 1318 and provides, on the basis thereof, a control information 1372 for the parametric object separator 1360. The parametric object separator 1360 provides a plurality of object signals 1362*a* to 1362*n* on the basis of the downmix signals 1360*a*, 1360*b* and the control information 1372, which is derived from the side information 1318 by the side information processor 1370. For example, the object separator may perform a decoding of the encoded downmix signals and an object separation. The renderer 1380 renders the reconstructed object signals 1362*a* to 1362*n*, to thereby obtain the output audio signals 1352*a* to 1352*n*.

In the following, the functionality of the MMSE based parameter downmix/upmix concept will be discussed.

The general parametric downmix/upmix processing is carried out in a time/frequency selective way and can be described as a sequence of the following steps:

The "encoder" 1310 is provided with input "audio objects" X and "mixing parameters" D. The "mixer" 1320 downmixes the "audio objects" X into a number of "downmix signals" Y using "mixing parameters" D (e.g., downmix gains). The "side info estimator" extracts the side information 1318 describing characteristics of the input "audio objects" X (e.g., covariance properties).

The "downmix signals" Y and side information are transmitted or stored. These downmix audio signals can be further compressed using audio coders (such as MPEG-1/2 Layer II or III, MPEG-2/4 Advanced Audio Coding (AAC), MPEG Unified Speech and Audio Coding (USAC), etc.). The side information can be also represented and encoded efficiently (e.g., as loss-less coded relations of the object powers and object correlation coefficients).

The "decoder" 1350 restores the original "audio objects" from the decoded "downmix signals" using the transmitted side information 1318. The "side info processor" 1370 estimates the un-mixing coefficients 1372 to be applied on the "downmix signals" within "parametric object separator" 1360 to obtain the parametric object reconstruction of X. The reconstructed "audio objects" 1362*a* to 1362*n* are rendered to a (multi-channel) target scene, represented by the output channels $\hat{Z}$, by applying "rendering parameters" R, 1354.

Moreover, it should be noted that the functionalities described with respect to the encoder 1310 and the decoder 1350 may be used in the other audio encoders and audio decoders described herein as well.

13.3. Orthogonality Principle of Minimum Mean Squared Error Estimation

Orthogonality principle is one major property of MMSE estimators. Consider two Hilbert spaces W and V, with V spanned by a set of vectors $y_i$, and a vector $x \in W$. If one wishes to find an estimate $\hat{x} \in V$ which will approximate x as a linear combination of the vectors $y_i \in V$, while minimizing the mean square error, then the error vector will be orthogonal on the space spanned by the vectors $y_i$:

$$(x-\hat{x})y^H = 0,$$

As a consequence, the estimation error and the estimate itself are orthogonal:

$$(x-\hat{x})\hat{x}^H = 0.$$

Figure 14:
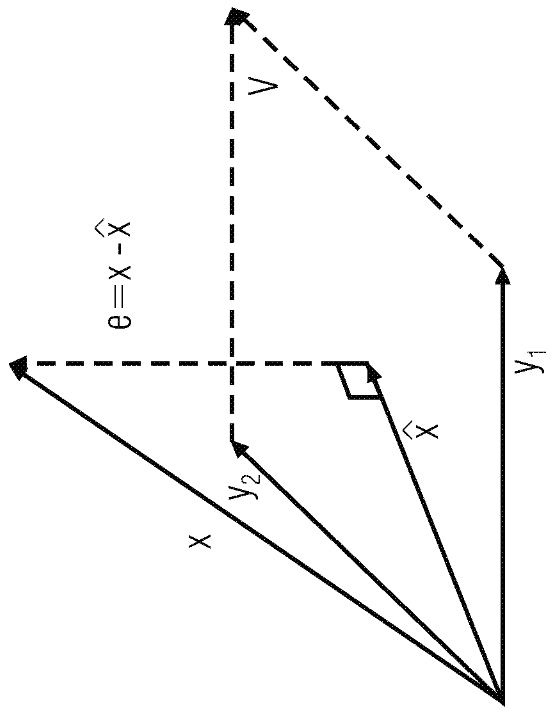
FIG. 14 shows a geometric representation for an orthogonality principle in 3-dimensional space.

Geometrically one could visualize this by the examples shown in FIG. 14.

FIG. 14 shows a geometric representation for orthogonality principle in 3-dimensional space. As can be seen, a vector space is spanned by vectors $y_1$, $y_2$. A. A vector x is equal to a sum of a vector $\hat{x}$ and a difference vector (or error vector) e. As can be seen, the error vector e is orthogonal to the vector space (or plane) V spanned by vectors $y_1$ and $y_2$. Accordingly, vector $\hat{x}$ can be considered as a best approximation of x within the vector space V.

13.4. Parametric Reconstruction Error

Defining a matrix comprising N signals: X and denoting the estimation error with $X_{Error}$, the following identities can be formulated. The original signal can be represented as a sum of the parametric reconstruction $\hat{X}$ and the reconstruction error $X_{Error}$ as $$X = \hat{X} + X_{Error}.$$

Because of the orthogonality principle, the covariance matrix of the original signals $E_X = XX^H$ can be formulated as a sum of the covariance matrix of the reconstructed signals $\hat{X}\hat{X}^H$ and the covariance matrix of the estimation errors $$X_{Error}X_{Error}^H$$

as $$E_X = XX^H = (\hat{X} + X_{Error})(\hat{X} + X_{Error})^H = \hat{X}\hat{X}^H + X_{Error}X_{Error}^H + \hat{X}X_{Error}^H + X_{Error}\hat{X}^H = \hat{X}\hat{X}^H + X_{Error}X_{Error}^H.$$

When the input objects X are not in the space spanned by the downmix channels (e.g. the number of downmix channels is less than the number of input signals) and the input objects cannot be represented as linear combinations of the downmix channels, the MMSE-based algorithms introduce reconstruction inaccuracy $$X_{Error}X_{Error}^H.$$

13.5. Inter Object Correlation

In the auditory system, the cross-covariance (coherence/correlation) is closely related to the perception of envelopment, of being surrounded by the sound, and to the perceived width of a sound source. For example in SAOC based systems the Inter-Object Correlation (IOC) parameters are used for characterization of this property:

$$IOC(i, j) = \frac{E_X(i, j)}{\sqrt{E_X(i, i)E_X(j, j)}}.$$

Let us consider an example of reproducing a sound source using two audio signals. If the IOC value is close to one, the sound is perceived as a well-localized point source. If the IOC value is close to zero, the perceived width of the sound source increases and for extreme cases it can even be perceived as two distinct sources [Blauert, Chapter 3].

13.6. Compensation for Reconstruction Inaccuracy

In the case of imperfect parametric reconstruction, the output signal may exhibit a lower energy compared to the original objects. The error in the diagonal elements of the covariance matrix may result in audible level differences and error in the off-diagonal elements in a distorted spatial sound image (compared with the ideal reference output). The proposed method has the purpose to solve this problem.

In the MPEG Surround (MPS), for example, this issue is treated only for some specific channel-based processing scenarios, namely, for mono/stereo downmix and limited static output configurations (e.g., mono, stereo, 5.1, 7.1, etc). In object-oriented technologies, like SAOC, which also uses mono/stereo downmix this problem is treated by applying the MPS post-processing rendering for 5.1 output configuration only.

The existing solutions are limited to standard output configurations and fixed number of input/output channels. Namely, they are realized as consequent application of several blocks implementing just "mono-to-stereo" (or "stereo-to-three") channel decorrelation methods.

Therefore, a general solution (e.g., energy level and correlation properties correction method) for parametric reconstruction inaccuracy compensation is desired, which can be applied for a flexible number of downmix/output channels and arbitrary output configuration setups.

13.7. Conclusions

To conclude, an overview over the notation has been provided. Moreover, a parametric separation system has been described on which embodiments according to the invention are based. Moreover, it has been outlined that the orthogonality principle applies to minimum mean squared error estimation. Moreover, an equation for the computation of a covariance matrix $E_X$ has been provided which applies in the presence of a reconstruction error $X_{Error}$. Also, the relationship between the so-called inter-object correlation values and the elements of a covariance matrix $E_X$ has been provided, which may be applied, for example, in embodiments according to the invention to derive desired covariance characteristics (or correlation characteristics) from the inter-object correlation values (which may be included in the parametric side information), and possibly form the object level differences. Moreover, it has been outlined that the characteristics of reconstructed object signals may differ from desired characteristics because of an imperfect reconstruction. Moreover, it has been outlined that existing solutions to deal with the problem are limited to some specific output configurations and rely on a specific combination of standard blocks, which makes the conventional solutions inflexible.

14. Embodiment According to FIG. 15

14.1. Concept Overview

Embodiments according to the invention extend the MMSE parametric reconstruction methods used in parametric audio separation schemes with a decorrelation solution for an arbitrary number of downmix/upmix channels. Embodiments according to the invention, like, for example, the inventive apparatus and the inventive method, may compensate for the energy loss during a parametric reconstruction and restore the correlation properties of estimated objects.

Figure 15:
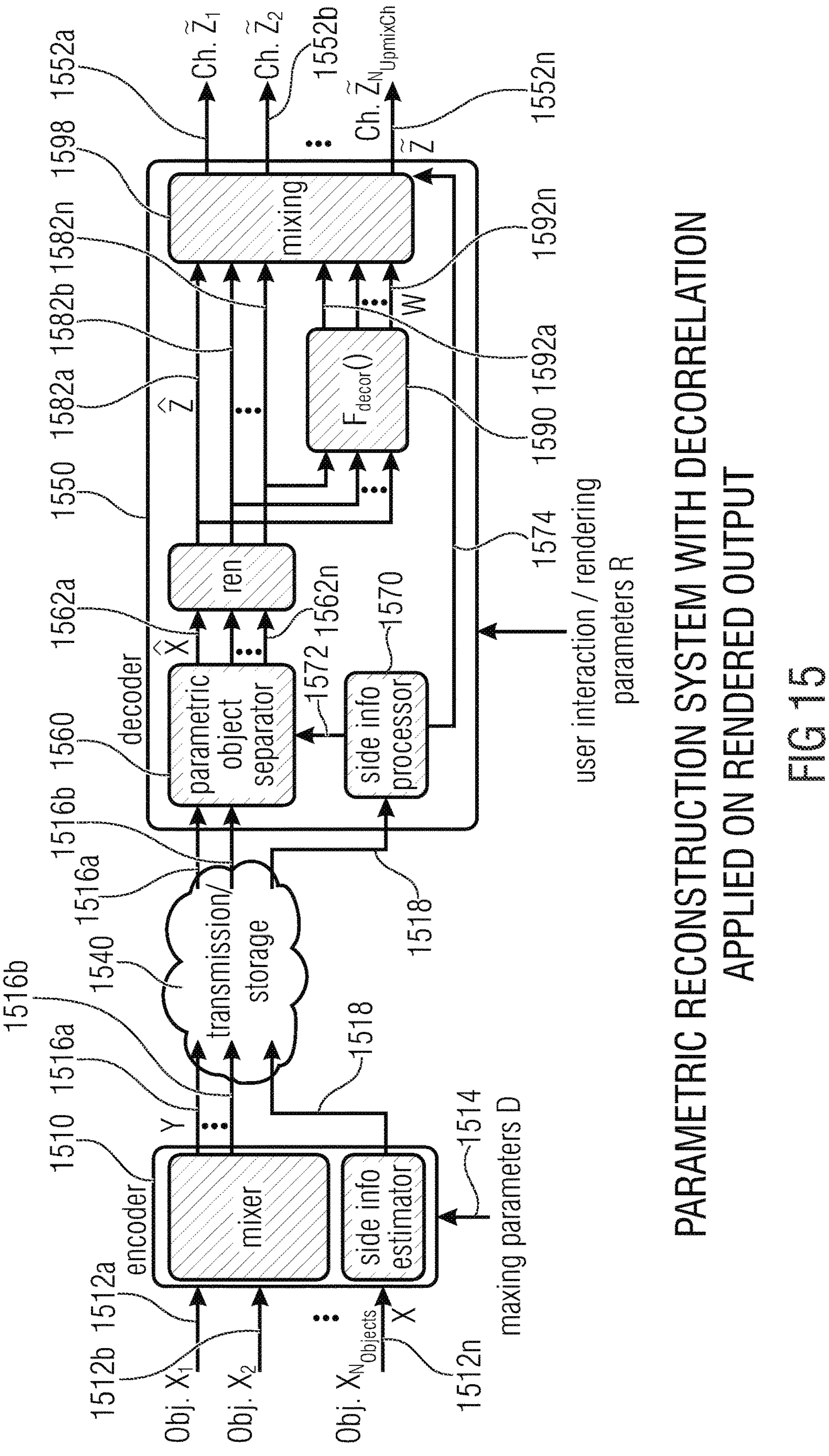
FIG. 15 shows a block schematic diagram of a parametric reconstruction system with decorrelation applied on rendered output, according to an embodiment of the present invention.

FIG. 15 provides an overview of the parametric downmix/upmix concept with an integrated decorrelation path. In other words, FIG. 15 shows, in the form of a block schematic diagram, a parametric reconstruction system with decorrelation applied on rendered output.

The system according to FIG. 15 comprises an encoder 1510, which is substantially identical to the encoder 1310 according to FIG. 13. The encoder 1510 receives a plurality of object signals 1512*a* to 1512*n*, and provides on the basis thereof, one or more downmix signals 1516*a*, 1516*b*, as well as a side information 1518. Downmix signals 1516*a*, 1515*b* may be substantially identical to the downmix signals 1316*a*, 1316*b* and may designated with Y. The side information 1518 may be substantially identical to the side information 1318. However, the side information may, for example, comprise a decorrelation mode parameter or a decorrelation method parameter, or a decorrelation complexity parameter. Moreover, the encoder 1510 may receive mixing parameters 1514.

The parametric reconstruction system also comprises a transmission and/or storage of the one or more downmix signals 1516*a*, 1516*b* and of the side information 1518, wherein the transmission and/or storage is designated with 1540, and wherein the one or more downmix signals 1516*a*, 1516*b* and the side information 1518 (which may include parametric side information) may be encoded.

Moreover, the parametric reconstruction system according to FIG. 15 comprises a decoder 1550, which is configured to receive the transmitted or stored one or more (possibly encoded) downmix signals 1516*a*, 1516*b* and the transmitted or stored (possibly encoded) side information 1518 and to provide, on the basis thereof, output audio signals 1552*a* to 1552*n*. The decoder 1550 (which may be considered as a multi-channel audio decoder) comprises a parametric object separator 1560 and a side information processor 1570. Moreover, the decoder 1550 comprises a renderer 1580, a decorrelator 1590 and a mixer 1598.

The parametric object separator 1560 is configured to receive the one or more downmix signals 1516*a*, 1516*b* and a control information 1572, which is provided by the side information processor 1570 on the basis of the side information 1518, and to provide, on the basis thereof, object signals 1562*a* to 1562*n*, which are also designated with $\hat{X}$, and which may be considered as decoded audio signals. The control information 1572 may, for example, comprise unmixing coefficients to be applied to downmix signals (for example, to decoded downmix signals derived from the encoded downmix signals 1516*a*, 1516*b*) within the parametric object separator to obtain reconstructed object signals (for example, the decoded audio signals 1562*a* to 1562*n*). The renderer 1580 renders the decoded audio signals 1562*a* to 1562*n* (which may be reconstructed object signals, and which may, for example, correspond to the input object signals 1512*a* to 1512*n*), to thereby obtain a plurality of rendered audio signals 1582*a* to 1582*n*. For example, the renderer 1580 may consider rendering parameters R, which may for example be provided by user interaction and which may, for example, define a rendering matrix. However, alternatively, the rendering parameters may be taken from the encoded representation (which may include the encoded downmix signals 1516*a*, 1516*b* and the encoded side information 1518).

The decorrelator 1590 is configured to receive the rendered audio signals 1582*a* to 1582*n* and to provide, on the basis thereof, decorrelated audio signals 1592*a* to 1592*n*, which are also designated with W. The mixer 1598 receives the rendered audio signals 1582*a* to 1582*n* and the decorrelated audio signals 1592*a* to 1592*n*, and combines the rendered audio signals 1582*a* to 1582*n* and the decorrelated audio signals 1592*a* to 1592*n*, to thereby obtain the output audio signals 1552*a* to 1552*n*. The mixer 1598 may also use control information 1574 which is derived by the side information processor 1570 from the encoded side information 1518, as will be described below.

14.2. Decorrelator Function

In the following, some details regarding the decorrelator 1590 will be described. However, it should be noted that different decorrelator concepts may be used, some of which will be described below.

In an embodiment, the decorrelator function $w=F_{decorr}(\hat{z})$ provides an output signal w that is orthogonal to the input signal $\hat{z}$ ($E\{w\hat{z}^H\}=0$). The output signal w has equal (to the input signal $\hat{z}$) spectral and temporal envelope properties (or at least similar properties). Moreover, signal w is perceived similarly and has the same (or similar) subjective quality as the input signal $\hat{z}$ (see, for example, [SAOC2]).

In case of multiple input signals, it is beneficial if the decorrelation function produces multiple outputs that are mutually orthogonal (i.e., $W_i=F_{decorr}(\hat{Z}_i)$, such that $$W_i\hat{Z}_j^H = 0$$

for all i and j, and $$W_iW_j^H = 0 \text{ for } i \neq j).$$

The exact specification for decorrelator function implementation is out of scope of this description. For example, the bank of several Infinite Impulse Response (IIR) filter based decorrelators specified in the MPEG Surround Standard can be utilized for decorrelation purposes [MPS].

The generic decorrelators described in this description are assumed to be ideal. This implies that (in addition to the perceptual requirements) the output of each decorrelator is orthogonal on its input and on the output of all other decorrelators. Therefore, for the given input $\hat{Z}$ with covariance $E_{\hat{Z}}=\hat{Z}\hat{Z}^H$ and output $W=F_{decorr}(\hat{Z})$ the following properties of covariance matrices holds:

$$E_W(i,i) = E_{\hat{Z}}(i,i),\ E_W(i,j) = 0, \text{ for } i \neq j,\ \hat{Z}W^H = W\hat{Z}^H = 0.$$

From these relationships, it follows that $$(\hat{Z}+W)(\hat{Z}+W)^H = E_{\hat{Z}} + \hat{Z}W^H + W\hat{Z}^H + E_W = E_{\hat{Z}} + E_W.$$

The decorrelator output W can be used to compensate for prediction inaccuracy in an MMSE estimator (remembering that the prediction error is orthogonal to the predicted signals) by using the predicted signals as the inputs.

One should still note that the prediction errors are not in a general case orthogonal among themselves. Thus, one aim of the inventive concept (e.g. method) is to create a mixture of the "dry" (i.e., decorrelator input) signal (e.g., rendered audio signals 1582*a* to 1582*n*) and "wet" (i.e., decorrelator output) signal (e.g., decorrelated audio signals 1592*a* to 1592*n*), such that the covariance matrix of the resulting mixture (e.g. output audio signals 1552*a* to 1552*n*) becomes similar to the covariance matrix of the desired output.

Moreover, it should be noted that a complexity reduction for the decorrelation unit may be used, which will be described in detail below, and which may bring along some imperfections of the decorrelated signal, which may, however, be acceptable.

14.3. Output Covariance Correction Using Decorrelated Signals

In the following, a concept will be described to adjust covariance characteristics of the output audio signals 1552*a* to 1552*n* to obtain a reasonably good hearing impression.

The proposed method for the output covariance error correction composes the output signal $\tilde{Z}$ (e.g. the output audio signals 1552*a* to 1552*n*) as a weighted sum of parametrically reconstructed signal $\hat{Z}$ (e.g., the rendered audio signals 1582*a* to 1582*n*) and its decorrelated part W. This sum can be represented as follows $$\tilde{Z} = P\hat{Z} + \text{MW}.$$

The mixing matrices P applied to the direct signal $\hat{Z}$ and M applied to decorrelated signal W have the following structure (with $N=N_{UpmixCh}$, wherein $N_{UpmixCh}$ designates a number of rendered audio signals, which may be equal to a number of output audio signals):

$$P = \begin{bmatrix} p_{1,1} & p_{1,2} & \cdots & p_{1,N} \\ p_{2,2} & p_{2,2} & \cdots & p_{2,N} \\ \vdots & \vdots & \ddots & \vdots \\ p_{N,1} & p_{N,2} & \cdots & p_{N,N} \end{bmatrix},$$

$$M = \begin{bmatrix} m_{1,1} & m_{1,2} & \cdots & m_{1,N} \\ m_{2,2} & m_{2,2} & \cdots & m_{2,N} \\ \vdots & \vdots & \ddots & \vdots \\ m_{N,1} & m_{N,2} & \cdots & m_{N,N} \end{bmatrix}.$$

Appling notation for the combined matrix F=[P M] and signal $$S = \begin{bmatrix} \hat{Z} \\ W \end{bmatrix}$$

it yields:

$$\tilde{Z} + FS.$$

Using this representation, the covariance matrix $E_{\tilde{Z}}$ of the output signal $\tilde{Z}$ is defined as $$E_{\tilde{Z}} = FE_S F^H.$$

The target covariance C of the ideally created rendered output scene is defined as $$C = RE_X R^H.$$

The mixing matrix F is computed such that the covariance matrix $E_{\tilde{Z}}$ of the final output approximates, or equals, the target covariance C as $$E_{\tilde{Z}} \approx C.$$

The mixing matrix F is computed, for example, as a function of known quantities $F=F(E_S, E_X, R)$ as $$F = \left(U\sqrt{T}\,U^H\right)H\left(V\sqrt{Q^{-1}}\,V^H\right),$$

where the matrices U, T and V, Q can be determined, for example, using Singular Value Decomposition (SVD) of the covariance matrices $E_S$ and C yielding $$C = UTU^H,\ E_s = VQV^H.$$

The prototype matrix H can be chosen according to the desired weightings for the direct and decorrelated signal paths.

For example, a possible prototype matrix H can be determined as $$H = \begin{bmatrix} a_{1,1} & 0 & \ldots & 0 & b_{1,1} & 0 & \ldots & 0 \\ 0 & a_{2,2} & \ldots & 0 & 0 & b_{2,2} & \ldots & 0 \\ \vdots & \vdots & \ddots & \vdots & \vdots & \vdots & \ddots & \vdots \\ 0 & 0 & \ldots & a_{N,N} & 0 & 0 & \ldots & b_{N,N} \end{bmatrix},$$

where $$a_{i,i}^2 + b_{i,i}^2 = 1.$$

In the following, some mathematical derivations for the general matrix F structure will be provided.

In other words, the derivation of the mixing matrix F for a general solution will be described in the following.

The covariance matrices $E_S$ and C can be expressed using, e.g., Singular Value Decomposition (SVD) as $$E_s = VQV^H,\ C = UTU^H.$$

with T and Q being diagonal matrices with the singular values of C and $E_S$ respectively, and U and V being unitary matrices containing the corresponding singular vectors.

Note, that application of the Schur triangulation or Eigenvalue decomposition (instead of SVD) leads to similar results (or even identical results if the diagonal matrices Q and T are restricted to positive values).

Applying this decomposition to the requirement $E_{\tilde{Z}} \approx C$, it yields (at least approximately)

$$C = FE_S F^H,$$

$$UTU^H = FVQV^H F^H,$$

$$\left(U\sqrt{T}\,U^H\right)\left(U\sqrt{T}\,UH\right) = F\left(V\sqrt{Q}\,V^H\right)\left(V\sqrt{Q}\,V^H\right)F^H,$$

$$\left(U\sqrt{T}\,U^H\right)\left(U\sqrt{T}\,U^H\right) = \left(FV\sqrt{Q}\,V^H\right)\left(V\sqrt{Q}\,V^H F^H\right),$$

$$\left(U\sqrt{T}\,U^H\right)\left(U\sqrt{T}\,U^H\right)^H = \left(FV\sqrt{Q}\,V^H\right)\left(FV\sqrt{Q}\,V^H\right)^H.$$

In order to take care about the dimensionality of the covariance matrices, regularization is needed in some cases. For example, a prototype matrix H of size $N_{UpmixCh} \times 2N_{UpmixCh}$, with the property that $HH^H = I_{N_{UpmixCh}}$ can be applied $$(U\sqrt{T}U^H)HH^H(U\sqrt{T}U^H) = F(V\sqrt{Q}V^H)(V\sqrt{Q}V^H)F^H,$$

$$(U\sqrt{T}U^H)H = F(V\sqrt{Q}V^H).$$

It follows that mixing matrix F can be determined as $$F = (U\sqrt{T}U^H)H\left(V\sqrt{Q^{-1}}V^H\right).$$

The prototype matrix H is chosen according to the desired weightings for the direct and decorrelated signal paths. For example, a possible prototype matrix H can be determined as $$H = \begin{bmatrix} a_{1,1} & 0 & \dots & 0 & b_{1,1} & 0 & \dots & 0 \\ 0 & a_{2,2} & \dots & 0 & 0 & b_{2,2} & \dots & 0 \\ \vdots & \vdots & \ddots & \vdots & \vdots & \vdots & \ddots & \vdots \\ 0 & 0 & \dots & a_{N,N} & 0 & 0 & \dots & b_{N,N} \end{bmatrix},$$

where $$a_{i,i}^2 + b_{i,i}^2 = 1.$$

Depending on the condition of the covariance matrix $E_S$ of the combined signals, the last equation may need to include some regularization, but otherwise it should be numerically stable.

To conclude, a concept has been described to derive the output audio signals (represented by matrix $\tilde{Z}$, or equivalently, by vector $\tilde{z}$) on the basis of the rendered audio signals (represented by matrix $\hat{Z}$, or equivalently, vector $\hat{z}$) and the decorrelated audio signals (represented by matrix W, or equivalently, vector w). As can be seen, two mixing matrices P and M of general matrix structure are commonly determined. For example, a combined matrix F, as defined above, may be determined, such that a covariance matrix $E_{\tilde{Z}}$ of the output audio signals 1552*a* to 1562*n* approximates, or equals, a desired covariance (also designated as target covariance) C. The desired covariance matrix C may, for example, be derived on the basis of the knowledge of the rendering matrix R (which may be provided by user interaction, for example) and on the basis of a knowledge of the object covariance matrix $E_X$, which may for example be derived on the basis of the encoded side information 1518. For example, the object covariance matrix $E_X$ may be derived using the inter-object correlation values IOC, which are described above, and which may be included in the encoded side information 1518. Thus, the target covariance matrix C may, for example, be provided by the side information processor 1570 as the information 1574, or as part of the information 1574.

However, alternatively, the side information processor 1570 may also directly provide the mixing matrix F as the information 1574 to the mixer 1598.

Moreover, a computation rule for the mixing matrix F has been described, which uses a singular value decomposition. However, it should be noted that there are some degrees of freedom, since the entries $a_{i,i}$ and $b_{i,i}$ of the prototype matrix H may be chosen. Advantageously, the entries of the prototype matrix H are chosen to be somewhere between 0 and 1. If values $a_{i,i}$ are chosen to be closer to one, there will be a significant mixing of rendered output audio signals, while the impact of the decorrelated audio signals is comparatively small, which may be desirable in some situations. However, in some other situations it may be more desirable to have a comparatively large impact of the decorrelated audio signals, while there is only a weak mixing between rendered audio signals. In this case, values $b_{i,i}$ are typically chosen to be larger than $a_{i,i}$. Thus, the decoder 1550 can be adapted to the requirements by appropriately choosing the entries of the prototype matrix H.

14.4. Simplified Methods for Output Covariance Correction

In this section, two alternative structures for the mixing matrix F mentioned above are described along with exemplary algorithms for determining its values. The two alternatives are designed to for different input content (e.g. audio content):

Covariance adjustment method for highly correlated content (e.g., channel based input with high correlation between different channel pairs).

Energy compensation method for independent input signals (e.g., object based input, assumed usually independent).

14.4.1. Covariance Adjustment Method (A)

Taking in account that the signal $\hat{Z}$ (e.g., the rendered audio signals 1582*a* to 1582*n*) are already optimal in the MMSE-sense, it is usually not advisable to modify the parametric reconstructions $\hat{Z}$ (e.g., the output audio signals 1552*a* to 1552*n*) in order to improve the covariance properties of the output $\tilde{Z}$ because this may affect the separation quality.

If only the mixture of the decorrelated signals W is manipulated, the mixing matrix P can be reduced to an identity matrix (or a multiple thereof). Thus, this simplified method can be described by setting $$P = \begin{bmatrix} 1 & 0 & \dots & 0 \\ 0 & 1 & \dots & 0 \\ \vdots & \vdots & \ddots & \vdots \\ 0 & 0 & \dots & 1 \end{bmatrix},$$

$$M = \begin{bmatrix} m_{1,1} & m_{1,2} & \dots & m_{1,N} \\ m_{2,2} & m_{2,2} & \dots & m_{2,N} \\ \vdots & \vdots & \ddots & \vdots \\ m_{N,1} & m_{N,2} & \dots & m_{N,N} \end{bmatrix}.$$

The final output of the system can be represented as $$\tilde{Z} = \hat{Z} + \text{MW}.$$

Consequently the final output covariance of the system can be represented as:

$$E_{\tilde{Z}} = E_{\hat{Z}} + ME_W M^H$$

The difference $\Delta_E$ between the ideal (or desired) output covariance matrix C and the covariance matrix $E_{\hat{Z}}$ of the rendered parametric reconstruction (e.g., of the rendered audio signals) is given by $$\Delta_E = C - E_{\hat{Z}}.$$

Therefore, mixing matrix M is determined such that $$\Delta_E \approx M E_W M^H.$$

The mixing matrix M is computed such that the covariance matrix of the mixed decorrelated signals MW equals or approximates the covariance difference between the desired covariance and the covariance of the dry signals (e.g., of the rendered audio signals). Consequently the covariance of the final output will approximate the target covariance $E_Z \approx C$:

$$M = \left(U\sqrt{T}U^H\right)\left(V\sqrt{Q^{-1}}V^H\right),$$

where the matrices U, T and V, Q can be determined, for example, using Singular Value Decomposition (SVD) of the covariance matrices $\Delta_E$ and $E_W$ yielding $$\Delta_E = UTU^H,\ E_W = VQV^H.$$

This approach ensures good cross-correlation reconstruction maximizing use of the dry output (e.g., of the rendered audio signals 1582*a* to 1582*n*) and utilizes freedom of mixing of decorrelated signals only. In other words, there is no mixing between different rendered audio signals allowed when combining the rendered audio signals (or a scaled version thereof) with the one or more decorrelated audio signals. However, it is allowed that a given decorrelated signal is combined, with a same or different scaling, with a plurality of rendered audio signals, or a scaled version thereof, in order to adjust cross-correlation characteristics or cross-covariance characteristics of the output audio signals. The combination is defined, for example, by the matrix M as defined here.

In the following, some mathematical derivations for the restricted matrix F structure will be provided.

In other words, the derivation of the mixing matrix M for the simplified method "A" will be explained.

The covariance matrices $\Delta_E$ and $E_W$ can be expressed using, e.g., Singular Value Decomposition (SVD) as $$\Delta_E = UTU^H,\ E_W = VQV^H.$$

with T and Q being diagonal matrices with the singular values of $\Delta_E$ and $E_W$ respectively, and U and V being unitary matrices containing the corresponding singular vectors.

Note, that application of the Schur triangulation or Eigenvalue decomposition (instead of SVD) leads to similar results (or even identical results if the diagonal matrices Q and T are restricted to positive values).

Applying this decomposition to the requirement $E_Z \approx C$, it yields (at least approximately)

$$\begin{aligned}
\Delta_E &= M E_W M^H, \\
UTU^H &= MVQV^H M^H, \\
\left(U\sqrt{T}U^H\right)\left(U\sqrt{T}U^H\right) &= M\left(V\sqrt{Q}V^H\right)\left(V\sqrt{Q}V^H\right)M^H, \\
\left(U\sqrt{T}U^H\right)\left(U\sqrt{T}U^H\right) &= \left(MV\sqrt{Q}V^H\right)\left(V\sqrt{Q}V^H M^H\right), \\
\left(U\sqrt{T}U^H\right)\left(U\sqrt{T}U^H\right)^H &= MV\sqrt{Q}V^H\right)\left(MV\sqrt{Q}V^H\right)^H, \\
\left(U\sqrt{T}U^H\right) &= M\left(V\sqrt{Q}V^H\right).
\end{aligned}$$

Noting that both sides of the equation represent a square of a matrix, we drop the squaring, and solve for the full matrix M.

It follows that mixing matrix M can be determined as $$M = \left(U\sqrt{T}U^H\right)\left(V\sqrt{Q^{-1}}V^H\right).$$

This method can be derived from the general method by setting the prototype matrix H as follows $$H = \begin{bmatrix} 1 & 0 & \dots & 0 & 1 & 0 & \dots & 0 \\ 0 & 1 & \dots & 0 & 0 & 1 & \dots & 0 \\ \vdots & \vdots & \ddots & \vdots & \vdots & \vdots & \ddots & \vdots \\ 0 & 0 & \dots & 1 & 0 & 0 & \dots & 1 \end{bmatrix}.$$

Depending on the condition of the covariance matrix $E_W$ of the wet signals, the last equation may need to include some regularization, but otherwise it should be numerically stable.

14.4.2. Energy Compensation Method (B)

Sometimes (depending on the application scenario) is not desired to allow mixing of the parametric reconstructions (e.g., of the rendered audio signals) or the decorrelated signals, but to individually mix each parametrically reconstructed signal (e.g., rendered audio signal) with its own decorrelated signal only.

In order to achieve this requirement, an additional constraint should be introduced to the simplified method "A". Now, the mixing matrix M of the wet signals (decorrelated signals) is necessitated to have a diagonal form:

$$P = \begin{bmatrix} 1 & 0 & \dots & 0 \\ 0 & 1 & \dots & 0 \\ \vdots & \vdots & \ddots & \vdots \\ 0 & 0 & \dots & 1 \end{bmatrix},$$

$$M = \begin{bmatrix} m_{1,1} & 0 & \dots & 0 \\ 0 & m_{2,2} & \dots & 0 \\ \vdots & \vdots & \ddots & \vdots \\ 0 & 0 & \dots & m_{N,N} \end{bmatrix}.$$

The main goal of this approach is to use decorrelated signals to compensate for the loss of energy in the parametric reconstruction (e.g., rendered audio signal), while the off-diagonal modification of the covariance matrix of the output signal is ignored, i.e., there is no direct handling of the cross-correlations. Therefore, no cross-leakage between the output objects/channels (e.g., between the rendered audio signals) is introduced in the application of the decorrelated signals.

As a result, only the main diagonal of the target covariance matrix (or desired covariance matrix) can be reached, and the off-diagonals are on the mercy of the accuracy of the parametric reconstruction and the added decorrelated signals. This method is most suitable for object-only based applications, in which the signals can be considered as uncorrelated.

The final output of the method (e.g. the output audio signals) is given by $\tilde{Z}=\hat{Z}+MW$ with a diagonal matrix M computed such that the covariance matrix entries corresponding to the energies of the reconstructed signals $E_{\tilde{Z}}(i,i)$ are equal with the desired energies $$E_{\tilde{Z}}(i, i) = C(i, i).$$

C may be determined as explained above for the general case.

For example, the mixing matrix M can be directly derived by dividing the desired energies of the compensation signals (differences between the desired energies (which may be described by diagonal elements of the cross-covariance matrix C) and the energies of the parametric reconstructions (which may be determined by the audio decoder)) with the energies of the decorrelated signals (which may be determined by the audio decoder):

$$M(i, j) = \begin{cases} \sqrt{\min\left(\lambda_{Dec}, \max\left(0, \frac{C(i, i) - E_{\hat{Z}}(i, i)}{\max(E_W(i, i), \varepsilon)}\right)\right)} & i = j, \\ 0 & i \neq j \end{cases}.$$

wherein $\lambda_{Dec}$ is a non-negative threshold used to limit the amount of decorrelated component added to the output signals (e.g., $\lambda_{Dec}=4$).

It should be noted that the energies can be reconstructed parametrically (for example, using OLDs, IOCs and rendering coefficients) or may be actually computed by the decoder (which is typically more computationally expensive).

This method can be derived from the general method by setting the prototype matrix H as follows:

$$H = \begin{bmatrix} 1 & 0 & \dots & 0 & 1 & 0 & \dots & 0 \\ 0 & 1 & \dots & 0 & 0 & 1 & \dots & 0 \\ \vdots & \vdots & \ddots & \vdots & \vdots & \vdots & \ddots & \vdots \\ 0 & 0 & \dots & 1 & 0 & 0 & \dots & 1 \end{bmatrix}.$$

This method maximizes the use of the dry rendered outputs explicitly. The method is equivalent with the simplification "A" when the covariance matrices have no off-diagonal entries.

This method has a reduced computational complexity.

However, it should be noted that the energy compensation method, doesn't necessarily imply that the cross-correlation terms are not modified. This holds only if we use ideal decorrelators and no complexity reduction for the decorrelation unit. The idea of the method is to recover the energy and ignore the modifications in the cross terms (the changes in the cross-terms will not modify substantially the correlation properties and will not affect the overall spatial impression).

14.5. Requirements for the Mixing Matrix F

In the following, it will be explained that the mixing matrix F, a derivation of which has been described in sections 14.3 and 14.4, fulfills requirements to avoid degradations.

In order to avoid degradations in the output, any method for compensating for the parametric reconstruction errors should produce a result with the following property: if the rendering matrix equals the downmix matrix then the output channels should equal (or at least approximate) the downmix channels. The proposed model fulfills this property. If the rendering matrix is equal with the downmix matrix R=D, the parametric reconstruction is given by $$\hat{Z} = R\hat{X} = D\hat{X} = DGY = DED^H\left(DED^H\right)^{-1}Y \approx Y,$$

and the desired covariance matrix will be $$C = RE_XR^H = DE_XD^H = E_Y.$$

Therefore the equation to be solved for obtaining the mixing matrix F is $$E_Y = F\begin{bmatrix} E_Y & 0_{N_{UpmixCh}} \\ 0_{N_{UpmixCh}} & E_W \end{bmatrix}F^H,$$

where $0_{N_{UpmixCh}}$ is a square matrix of size $N_{UpmixCh} \times N_{UpmixCh}$ of zeros. Solving previous equation for F, one can obtain:

$$F = \begin{bmatrix} 1 & 0 & \dots & 0 & 0 & 0 & \dots & 0 \\ 0 & 1 & \dots & 0 & 0 & 0 & \dots & 0 \\ \vdots & \vdots & \ddots & \vdots & \vdots & \vdots & \ddots & \vdots \\ 0 & 0 & \dots & 1 & 0 & 0 & \dots & 0 \end{bmatrix}.$$

This means that the decorrelated signals will have zero-weight in the summing, and the final output will be given by the dry signals, which are identical with the downmix signals $$\tilde{Z} = P\hat{Z} + \mathrm{MW} = \hat{Z} \approx Y.$$

As a result, the given requirement for the system output to equal the downmix signal in this rendering scenario is fulfilled.

14.6. Estimation of Signal Covariance Matrix $E_S$

To obtain the mixing matrix F the knowledge of the covariance matrix $E_S$ of the combined signals S is necessitated or at least desirable.

In principle, it is possible to estimate the covariance matrix $E_S$ directly from the available signals (namely, from parametric reconstruction $\hat{Z}$ and the decorrelator output W).

Although this approach may lead to more accurate results, it is may not be practical because of the associated computational complexity. The proposed methods use parametric approximations of the covariance matrix $E_S$.

The general structure of the covariance matrix $E_S$ can be represented as $$E_S = \begin{bmatrix} E_{\hat{Z}} & E_{\hat{Z}W}^H \\ E_{\hat{Z}W} & E_W \end{bmatrix},$$

where the matrix $E_{\hat{Z}W}$ is cross-covariance between the direct $\hat{Z}$ and decorrelated W signals.

Assuming that the decorrelators are ideal (i.e., energy-preserving, the outputs being orthogonal to the inputs, and all outputs being mutually orthogonal), the covariance matrix $E_S$ can be expressed using the simplified form as $$E_S = \begin{bmatrix} E_{\hat{Z}} & 0 \\ 0 & E_W \end{bmatrix}.$$

The covariance matrix $E_{\hat{Z}}$ of the parametrically reconstructed signal $\hat{Z}$ can be determined parametrically as $$E_{\hat{Z}} = RE_{\hat{X}}R^H = RGDE_XD^HG^HR^H.$$

The covariance matrix $E_W$ of the decorrelated signal W is assumed to fulfill the mutual orthogonality property and to contain only the diagonal elements of $E_{\hat{Z}}$ as follows $$E_W(i, j) = \begin{cases} E_{\hat{Z}}(i, i) & \text{for } i = j, \\ 0 & \text{for } i \neq j \end{cases}.$$

If the assumption of mutual orthogonality and/or energy-preservation is violated (e.g., in the case when the number of decorrelators available is smaller than the number of signals to be decorrelated), then the covariance matrix $E_W$ can be estimated as $$E_W = M_{post}\left[matdiag\left(M_{pre}E_{\hat{Z}}M_{pre}^H\right)\right]M_{post}^H.$$

15. Complexity Reduction for Decorrelation Unit

In the following, it will be described how the complexity of the decorrelators used in embodiments according to the present invention can be reduced.

It should be noted that decorrelator function implementation is often computationally complex. In some applications (e.g., portable decoder solutions) limitations on the number of decorrelators may need to be introduced due to the restricted computational resources.

This section provides a description of means for reduction of decorrelator unit complexity by controlling the number of applied decorrelators (or decorrelations). The decorrelation unit interface is depicted in FIGS. 16 and 17.

Figure 16:
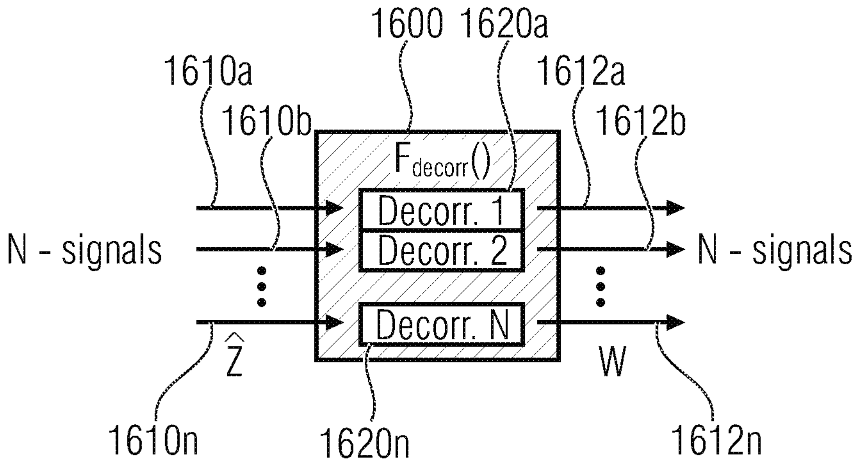
FIG. 16 shows a block schematic diagram of a decorrelation unit.

FIG. 16 shows a block schematic diagram of a simple (conventional) decorrelation unit. The decorrelation unit 1600 according to FIG. 6 is configured to receive N decorrelator input signals 1610*a* to 1610*n*, like for example rendered audio signals $\hat{Z}$. Moreover, the decorrelation unit 1600 provides N decorrelator output signals 1612*a* to 1612*n*. The decorrelation unit 1600 may, for example, comprise N individual decorrelators (or decorrelation functions) 1620*a* to 1620*n*. For example, each of the individual decorrelators 1620*a* to 1620*n* may provide one of the decorrelator output signals 1612*a* to 1612*n* on the basis of an associated one of the decorrelator input signals 1610*a* to 1610*n*. Accordingly, N individual decorrelators, or decorrelation functions, 1620*a* to 1620*n* may be necessitated to provide the N decorrelated signals 1612*a* to 1612*n* on the basis of the N decorrelator input signals 1610*a* to 1610*n*.

Figure 17:
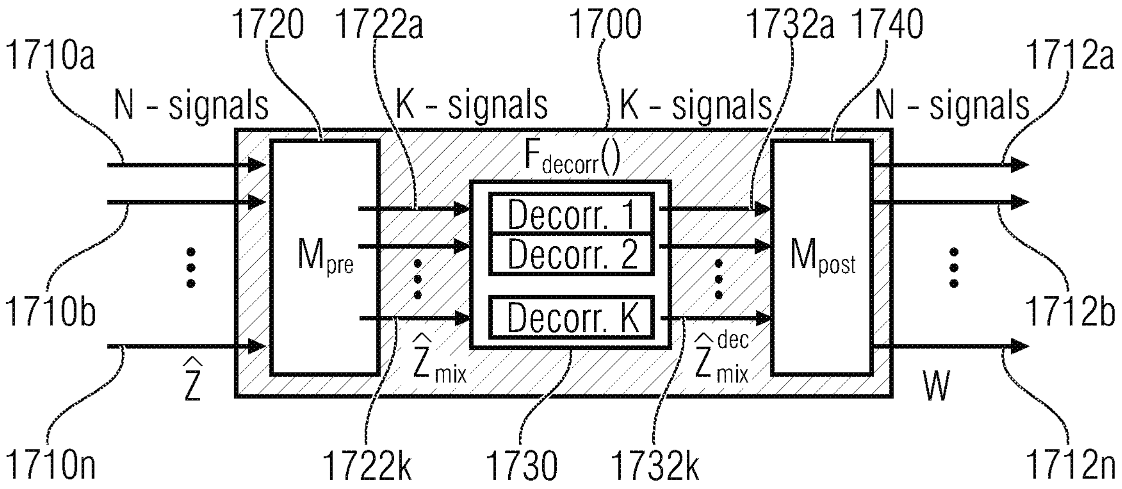
FIG. 17 shows a block schematic diagram of a reduced complexity decorrelation unit, according to an embodiment of the present invention.

However, FIG. 17 shows a block schematic diagram of a reduced complexity decorrelation unit 1700. The reduced complexity decorrelation unit 1700 is configured to receive N decorrelator input signals 1710*a* to 1710*n* and to provide, on the basis thereof, N decorrelator output signals 1712*a* to 1712*n*. For example, the decorrelator input signals 1710*a* to 1710*n* may be rendered audio signals $\hat{Z}$, and the decorrelator output signals 1712*a* to 1712*n* may be decorrelated audio signals W.

The decorrelator 1700 comprises a premixer (or equivalently, a premixing functionality) 1720 which is configured to receive the first set of N decorrelator input signals 1710*a* to 1710*n* and to provide, on the basis thereof, a second set of K decorrelator input signals 1722*a* to 1722*k*. For example, the premixer 1720 may perform a so-called "premixing" or "downmixing" to derive the second set of K decorrelator input signals 1722*a* to 1722*k* on the basis of the first set of N decorrelator input signals 1710*a* to 1710*n*. For example, the K signals of the second set of K decorrelator input signals 1722*a* to 1722*k* may be represented using a matrix $\hat{Z}_{mix}$. The decorrelation unit (or, equivalently, multichannel decorrelator) 1700 also comprises a decorrelator core 1730, which is configured to receive the K signals of the second set of decorrelator input signals 1722*a* to 1722*k*, and to provide, on the basis thereof, K decorrelator output signals which constitute a first set of decorrelator output signals 1732*a* to 1732*k*. For example, the decorrelator core 1730 may comprise K individual decorrelators (or decorrelation functions), wherein each of the individual decorrelators (or decorrelation functions) provides one of the decorrelator output signals of the first set of K decorrelator output signals 1732*a* to 1732*k* on the basis of a corresponding decorrelator input signal of the second set of K decorrelator input signals 1722*a* to 1722*k*. Alternatively, a given decorrelator, or decorrelation function, may be applied K times, such that each of the decorrelator output signals of the first set of K decorrelator output signals 1732*a* to 1732*k* is based on a single one of the decorrelator input signals of the second set of K decorrelator input signals 1722*a* to 1722*k*.

The decorrelation unit 1700 also comprises a postmixer 1740, which is configured to receive the K decorrelator output signals 1732*a* to 1732*k* of the first set of decorrelator output signals and to provide, on the basis thereof, the N signals 1712*a* to 1712*n* of the second set of decorrelator output signals (which constitute the "external" decorrelator output signals).

It should be noted that the premixer 1720 may advantageously perform a linear mixing operation, which may be described by a premixing matrix $M_{pre}$. Moreover, the postmixer 1740 may perform a linear mixing (or upmixing) operation, which may be represented by a postmixing matrix $M_{post}$, to derive the N decorrelator output signals 1712*a* to 1712*n* of the second set of decorrelator output signals from the first set of K decorrelator output signals 1732*a* to 1732*k* (i.e., from the output signals of the decorrelator core 1730).

The main idea of the proposed method and apparatus is to reduce the number of input signals to the decorrelators (or to the decorrelator core) from N to K by:

Premixing the signals (e.g., the rendered audio signals) to lower number of channels with $$\hat{Z}_{mix} = M_{pre}\hat{Z}.$$

Applying the decorrelation using the available K decorrelators (e.g., of the decorrelator core) with $$\hat{Z}_{mix}^{dec} = Decorr(\hat{Z}_{mix}).$$

Up-mixing the decorrelated signals back to N channels with $$W = M_{post}\hat{Z}_{mix}^{dec}.$$

The premixing matrix $M_{pre}$ can be constructed based on the downmix/rendering/correlation/etc information such that the matrix product $$(M_{pre}M_{pre}^H)$$

becomes well-conditioned (with respect to inversion operation). The postmixing matrix can be computed as $$M_{post} \approx M_{pre}^H(M_{pre}M_{pre}^H)^{-1}.$$

Even though the covariance matrix of the intermediate decorrelated signals $$\hat{S}\ \left(\text{or } \hat{Z}_{mix}^{dec}\right)$$

is diagonal (assuming ideal decorrelators), the covariance matrix of the final decorrelated signals W will quite likely not be diagonal anymore when using this kind of a processing. Therefore, the covariance matrix may be to be estimated using the mixing matrices as $$E_W = M_{post}[matdiag(M_{pre}E_{\hat{Z}}M_{pre}^H)]M_{post}^H$$

The number of used decorrelators (or individual decorrelations), K, is not specified and is dependent on the desired computational complexity and available decorrelators. Its value can be varied from N (highest computational complexity) down to 1 (lowest computational complexity).

The number of input signals to the decorrelator unit, N, is arbitrary and the proposed method supports any number of input signals, independent on the rendering configuration of the system.

For example in applications using 3D audio content, with high number of output channels, depending on the output configuration one possible expression for the premixing matrix $M_{pre}$ is described below.

In the following, it will be described how the premixing, which is performed by the premixer 1720 (and, consequently, the postmixing, which is performed by the postmixer 1740) is adjusted if the decorrelation unit 1700 is used in a multi-channel audio decoder, wherein the decorrelator input signals 1710*a* to 1710*n* of the first set of decorrelator input signals are associated with different spatial positions of an audio scene.

For this purpose, FIG. 18 shows a table representation of loudspeaker positions, which are used for different output formats.

In the table 1800 of FIG. 18, a first column 1810 describes a loudspeaker index number. A second column 1820 describes a loudspeaker label. A third column 1830 describes an azimuth position of the respective loudspeaker, and a fourth column 1832 describes an azimuth tolerance of the position of the loudspeaker. A fifth column 1840 describes an elevation of a position of the respective loudspeaker, and a sixth column 1842 describes a corresponding elevation tolerance. A seventh column 1850 indicates which loudspeakers are used for the output format O-2.0. An eighth column 1860 shows which loudspeakers are used for the output format O-5.1. A ninth column 1864 shows which loudspeakers are used for the output format O-7.1. A tenth column 1870 shows which loudspeakers are used for the output format O-8.1, an eleventh column 1880 shows which loudspeakers are used for the output format O-10.1, and a twelfth column 1890 shows which loudspeakers are used for the output formal O-22.2. As can be seen, two loudspeakers are used for output format O-2.0, six loudspeakers are used for output format O-5.1, eight loudspeakers are used for output format O-7.1, nine loudspeakers are used for output format O-8.1, 11 loudspeakers are used for output format O-10.1, and 24 loudspeaker are used for output format O-22.2.

However, it should be noted that one low frequency effect loudspeaker is used for output formats O-5.1, O-7.1, O-8.1 and O-10.1, and that two low frequency effect loudspeakers (LFE1, LFE2) are used for output format O-22.2. Moreover, it should be noted that, in one embodiment, one rendered audio signal (for example, one of the rendered audio signals 1582*a* to 1582*n*) is associated with each of the loudspeakers, except for the one or more low frequency effect loudspeakers. Accordingly, two rendered audio signals are associated with the two loudspeakers used according to the O-2.0 format, five rendered audio signals are associated with the five non-low-frequency-effect loudspeakers if the O-5.1 format is used, seven rendered audio signals are associated with seven non-low-frequency-effect loudspeakers if the O-7.1 format is used, eight rendered audio signals are associated with the eight non-low-frequency-effect loudspeakers if the O-8.1 format is used, ten rendered audio signals are associated with the ten non-low-frequency-effect loudspeakers if the O-10.1 format is used, and 22 rendered audio signals are associated with the 22 non-low-frequency-effect loudspeakers if the O-22.2 format is used.

However, it is often desirable to use a smaller number of (individual) decorrelators (of the decorrelator core), as mentioned above. In the following, it will be described how the number of decorrelators can be reduced flexibly when the O-22.2 output format is used by a multi-channel audio decoder, such that there are 22 rendered audio signals 1582*a* to 1582*n* (which may be represented by a matrix $\hat{Z}$, or by a vector $\hat{z}$).

FIGS. 19*a* to 19*g* represent different options for premixing the rendered audio signals 1582*a* to 1582*n* under the assumption that there are N=22 rendered audio signals. For example, FIG. 19*a* shows a table representation of entries of a premixing matrix $M_{pre}$. The rows, labeled with 1 to 11 in FIG. 19a, represent the rows of the premixing matrix $M_{pre}$, and the columns, labeled with 1 to 22 are associated with columns of the premixing matrix $M_{pre}$. Moreover, it should be noted that each row of the premixing matrix $M_{pre}$ is associated with one of the K decorrelator input signals 1722a to 1722k of the second set of decorrelator input signals (i.e., with the input signals of the decorrelator core). Moreover, each column of the premixing matrix $M_{pre}$ is associated with one of the N decorrelator input signals 1710a to 1710n of the first set of decorrelator input signals, and consequently with one of the rendered audio signals 1582a to 1582n (since the decorrelator input signals 1710a to 1710n of the first set of decorrelator input signals are typically identical to the rendered audio signals 1582 to 1582n in an embodiment). Accordingly, each column of the premixing matrix $M_{pre}$ is associated with a specific loudspeaker and, consequently, since loudspeakers are associate with spatial positions, with a specific spatial position. A row 1910 indicates to which loudspeaker (and, consequently, to which spatial position) the columns of the premixing matrix $M_{pre}$ are associated (wherein the loudspeaker labels are defined in the column 1820 of the table 1800).

In the following, the functionality defined by the premixing $M_{pre}$ of FIG. 19a will be described in more detail. As can be seen, rendered audio signals associated with the speakers (or, equivalently, speaker positions) "CH_M_000" and "CH_L_000" are combined, to obtain a first decorrelator input signal of the second set of decorrelator input signals (i.e., a first downmixed decorrelator input signal), which is indicated by the "1"-values in the first and second column of the first row of the premixing matrix $M_{pre}$. Similarly, rendered audio signals associated with speakers (or, equivalently, speaker positions) "CH_U_000" and "CH_T_000" are combined to obtain a second downmixed decorrelator input signal (i.e., a second decorrelator input signal of the second set of decorrelator input signals). Moreover, it can be seen that the premixing matrix $M_{pre}$ of FIG. 19a defines eleven combinations of two rendered audio signals each, such that eleven downmixed decorrelator input signals are derived from 22 rendered audio signals. It can also be seen that four center signals are combined, to obtain two downmixed decorrelator input signals (confer columns 1 to 4 and rows 1 and 2 of the premixing matrix). Moreover, it can be seen that the other downmixed decorrelator input signals are each obtained by combining two audio signals associated with the same side of the audio scene. For example, a third downmixed decorrelator input signal, represented by the third row of the premixing matrix, is obtained by combining rendered audio signals associated with an azimuth position of +135° ("CH_M_135"; "CH_U_L135"). Moreover, it can be seen that a fourth decorrelator input signal (represented by a fourth row of the premix matrix) is obtained by combining rendered audio signals associated with an azimuth position of −135° ("CH_M_R135"; "CH_U_R135"). Accordingly, each of the downmixed decorrelator input signals is obtained by combining two rendered audio signals associated with same (or similar) azimuth position (or, equivalently, horizontal position), wherein there is typically a combination of signals associated with different elevation (or, equivalently, vertical position).

Taking reference now to FIG. 19b, which shows premixing coefficients (entries of the premixing matrix $M_{pre}$) for N=22 and K=10. The structure of the table of FIG. 19b is identical to the structure of the table of FIG. 19a. However, as can be seen, the premixing matrix $M_{pre}$ according to FIG. 19b differs from the premixing matrix $M_{pre}$ of FIG. 19a in that the first row describes the combination of four rendered audio signals having channel IDs (or positions) "CH_M_000", "CH_L_000", "CH_U_000" and "CH_T_000". In other words, four rendered audio signals associated with vertically adjacent positions are combined in the premixing in order to reduce the number of necessitated decorrelators (ten decorrelators instead of eleven decorrelators for the matrix according to FIG. 19a).

Taking reference now to FIG. 19c, which shows premixing coefficients (entries of the premixing matrix $M_{pre}$) for N=22 and K=9, it can be seen, that the premixing matrix $M_{pre}$ according to FIG. 19c only comprises nine rows. Moreover, it can be seen from the second row of the premixing matrix $M_{pre}$ of FIG. 19c that rendered audio signals associated with channel IDs (or positions) "CH_M_L135", "CH_U_L135", "CH_M_R135" and "CH_U_R135" are combined (in a premixer configured according to the premixing matrix of FIG. 19c) to obtain a second downmixed decorrelator input signal (decorrelator input signal of the second set of decorrelator input signals). As can be seen, rendered audio signals which have been combined into separate downmixed decorrelator input signals by the premixing matrices according to FIGS. 19a and 19b are downmixed into a common downmixed decorrelator input signal according to FIG. 19c. Moreover, it should be noted that the rendered audio signals having channel IDs "CH_M_L135" and "CH_U_L135" are associated with identical horizontal positions (or azimuth positions) on the same side of the audio scene and spatially adjacent vertical positions (or elevations), and that the rendered audio signals having channel IDs "CH_M_R135" and "CH_U_R135" are associated with identical horizontal positions (or azimuth positions) on a second side of the audio scene and spatially adjacent vertical positions (or elevations). Moreover, it can be said that the rendered audio signals having channel IDs "CH_M_L135", "CH_U_L135", "CH_M_R135" and "CH_U_R135" are associated with a horizontal pair (or even a horizontal quadruple) of spatial positions comprising a left side position and a right side position. In other words, it can be seen in the second row of the premixing matrix $M_{pre}$ of FIG. 19c that two of the four rendered audio signals, which are combined to be decorrelated using a single given decorrelator, are associated with spatial positions on a left side of an audio scene, and that two of the four rendered audio signals which are combined to be decorrelated using the same given decorrelator, are associated with spatial positions on a right side of the audio scene. Moreover, it can be seen that the left sided rendered audio signals (of said four rendered audio signals) are associated with spatial positions which are symmetrical, with respect to a central plane of the audio scene, with the spatial positions associated with the right sided rendered audio signals (of said four rendered audio signal), such that a "symmetrical" quadruple of rendered audio signals are combined by the premixing to be decorrelated using a single (individual) decorrelator.

Taking reference to FIGS. 19d, 19e, 19f and 19g, it can be seen that more and more rendered audio signals are combined with decreasing number of (individual) decorrelators (i.e. with decreasing K). As can be seen in FIGS. 19a to 19g, typically rendered audio signals which are downmixed into two separate downmixed decorrelator input signals are combined when decreasing the number of decorrelators by 1. Moreover, it can be seen that typically such rendered audio signals are combined, which are associated with a "symmetrical quadruple" of spatial positions, wherein, for a comparatively high number of decorrelators, only rendered audio signals associated with equal or at least similar horizontal positions (or azimuth positions) are combined, while for comparatively lower number of decorrelators, rendered audio signals associated with spatial positions on opposite sides of the audio scene are also combined.

Taking reference now to FIGS. 20*a* to 20*d*, 21*a* to 21*c*, 22*a* to 22*b* and 23, it should be noted that similar concepts can also be applied for a different number of rendered audio signals.

For example, FIGS. 20*a* to 20*d* describe entries of the premixing matrix $M_{pre}$ for N=10 and for K between 2 and 5.

Similarly, FIGS. 21*a* to 21*c* describe entries of the premixing matrix $M_{pre}$ for N=8 and K between 2 and 4.

Similarly, FIGS. 21*d* to 21*f* describe entries of the premixing matrix $M_{pre}$ for N=7 and K between 2 and 4.

FIGS. 22*a* and 22*b* show entries of the premixing matrix for N=5 and K=2 and K=3.

Finally, FIG. 23 shows entries of the premixing matrix for N=2 and K=1.

To summarize, the premixing matrices according to FIGS. 19 to 23 can be used, for example, in a switchable manner, in a multi-channel decorrelator which is part of a multi-channel audio decoder. The switching between the premixing matrices can be performed, for example, in dependence on a desired output configuration (which typically determines a number N of rendered audio signals) and also in dependence on a desired complexity of the decorrelation (which determines the parameter K, and which may be adjusted, for example, in dependence on a complexity information included in an encoded representation of an audio content).

Taking reference now to FIG. 24, the complexity reduction for the 22.2 output format will be described in more detail. As already outlined above, one possible solution for constructing the premixing matrix and the postmixing matrix is to use the spatial information of the reproduction layout to select the channels to be mixed together and compute the mixing coefficients. Based on their position, the geometrically related loudspeakers (and, for example, the rendered audio signals associated therewith) are grouped together, taking vertical and horizontal pairs, as described in the table of FIG. 24. In other words, FIG. 24 shows, in the form of a table, a grouping of loudspeaker positions, which may be associated with rendered audio signals. For example, a first row 2410 describes a first group of loudspeaker positions, which are in a center of an audio scene. A second row 2412 represents a second group of loudspeaker positions, which are spatially related. Loudspeaker positions "CH_M_L135" and "CH_U_L135" are associated with identical azimuth positions (or equivalently horizontal positions) and adjacent elevation positions (or equivalently, vertically adjacent positions). Similarly, positions "CH_M_R135" and "CH_U_R135" comprise identical azimuth (or, equivalently, identical horizontal position) and similar elevation (or, equivalently, vertically adjacent position). Moreover, positions "CH_M_L135", "CH_U_L135", "CH_M_R135" and "CH_U_R135" form a quadruple of positions, wherein positions "CH_M_L135" and "CH_U_L135" are symmetrical to positions "CH_M_R135" and "CH_U_R135" with respect to a center plane of the audio scene. Moreover, positions "CH_M_180" and "CH_U_180" also comprise identical azimuth position (or, equivalently, identical horizontal position) and similar elevation (or, equivalently, adjacent vertical position).

A third row 2414 represents a third group of positions. It should be noted that positions "CH_M_L030" and "CH_L_L045" are spatially adjacent positions and comprise similar azimuth (or, equivalently, similar horizontal position) and similar elevation (or, equivalently, similar vertical position). The same holds for positions "CH_M_R030" and "CH_L_R045".

Moreover, the positions of the third group of positions form a quadruple of positions, wherein positions "CH_M_L030" and "CH_L_L045" are spatially adjacent, and symmetrical with respect to a center plane of the audio scene, to positions "CH_M_R030" and "CH_L_R045".

A fourth row 2416 represents four additional positions, which have similar characteristics when compared to the first four positions of the second row, and which form a symmetrical quadruple of positions.

A fifth row 2418 represents another quadruple of symmetrical positions "CH_M_L060", "CH_U_L045", "CH_M_R060" and "CH_U_R045".

Moreover, it should be noted that rendered audio signals associated with the positions of the different groups of positions may be combined more and more with decreasing number of decorrelators. For example, in the presence of eleven individual decorrelators in a multi-channel decorrelator, rendered audio signals associated with positions in the first and second column may be combined for each group. In addition, rendered audio signals associated with the positions represented in a third and a fourth column may be combined for each group. Furthermore, rendered audio signals associated with the positions shown in the fifth and sixth column may be combined for the second group. Accordingly, eleven downmix decorrelator input signals (which are input into the individual decorrelators) may be obtained. However, if it is desired to have less individual decorrelators, rendered audio signals associated with the positions shown in columns 1 to 4 may be combined for one or more of the groups. Also, rendered audio signals associated with all positions of the second group may be combined, if it is desired to further reduce a number of individual decorrelators.

To summarize, the signals fed to the output layout (for example, to the speakers) have horizontal and vertical dependencies, that should be preserved during the decorrelation process. Therefore, the mixing coefficients are computed such that the channels corresponding to different loudspeaker groups are not mixed together.

Depending on the number of available decorrelators, or the desired level of decorrelation, in each group first are mixed together the vertical pairs (between the middle layer and the upper layer or between the middle layer and the lower layer). Second, the horizontal pairs (between left and right) or remaining vertical pairs are mixed together. For example, in group three, first the channels in the left vertical pair ("CH_M_L030" and "CH_L_L045"), and in the right vertical pair ("CH_M_R030" and "CH_L_R045"), are mixed together, reducing in this way the number of necessitated decorrelators for this group from four to two. If it is desired to reduce even more the number of decorrelators, the obtained horizontal pair is downmixed to only one channel, and the number of necessitated decorrelators for this group is reduced from four to one.

Based on the presented mixing rules, the tables mentioned above (for example, shown in FIGS. 19 to 23) are derived for different levels of desired decorrelation (or for different levels of desired decorrelation complexity).

16. Compatibility with a Secondary External Renderer/Format Converter

In the case when the SAOC decoder (or, more generally, the multi-channel audio decoder) is used together with an external secondary renderer/format converter, the following changes to the proposed concept (method or apparatus) may be used:

the internal rendering matrix R (e.g., of the renderer) is set to identity $R=I_{N_{Objects}}$ (when an external renderer is used) or initialized with the mixing coefficients derived from an intermediate rendering configuration (when an external format converter is used).

the number of decorrelators is reduced using the method described in section 15 with the premixing matrix $M_{pre}$ computed based on the feedback information received from the renderer/format converter (e.g., $M_{pre}=D_{convert}$ where $D_{convert}$ is the downmix matrix used inside the format converter). The channels which will be mixed together outside the SAOC decoder, are premixed together and fed to the same decorrelator inside the SAOC decoder.

Using an external format converter, the SAOC internal renderer will pre-render to an intermediate configuration (e.g., the configuration with the highest number of loudspeakers).

To conclude, in some embodiments an information about which of the output audio signals are mixed together in an external renderer or format converter are used to determine the premixing matrix $M_{pre}$, such that the premixing matrix defines a combination of such decorrelator input signals (of the first set of decorrelator input signals) which are actually combined in the external renderer. Thus, information received from the external renderer/format converter (which receives the output audio signals of the multi-channel decoder) is used to select or adjust the premixing matrix (for example, when the internal rendering matrix of the multi-channel audio decoder is set to identity, or initialized with the mixing coefficients derived from an intermediate rendering configuration), and the external renderer/format converter is connected to receive the output audio signals as mentioned above with respect to the multi-channel audio decoder.

17. Bitstream

In the following, it will be described which additional signaling information can be used in a bitstream (or, equivalently, in an encoded representation of the audio content). In embodiments according to the invention, the decorrelation method may be signaled into the bitstream for ensuring a desired quality level. In this way, the user (or an audio encoder) has more flexibility to select the method based on the content. For this purpose, the MPEG SAOC bitstream syntax can be, for example, extended with two bits for specifying the used decorrelation method and/or two bits for specifying the configuration (or complexity).

FIG. 25 shows a syntax representation of bitstream elements "bsDecorrelationMethod" and "bsDecorrelationLevel", which may be added, for example, to a bitstream portion "SAOCSpecifigConfig( )" or "SAOC3DSpecificConfig( )". As can be seen in FIG. 25, two bits may be used for the bitstream element "bsDecorrelationMethod", and two bits may be used for the bitstream element "bsDecorrelationLevel".

FIG. 26 shows, in the form of a table, an association between values of the bitstream variable "bsDecorrelationMethod" and the different decorrelation methods. For example, three different decorrelation methods may be signaled by different values of said bitstream variable. For example, an output covariance correction using decorrelated signals, as described, for example, in section 14.3, may be signaled as one of the options. As another option, a covariance adjustment method, for example, as described in section 14.4.1 may be signaled. As yet another option, an energy compensation method, for example, as described in section 14.4.2 may be signaled. Accordingly, three different methods for the reconstruction of signal characteristics of the output audio signals on the basis of the rendered audio signals and the decorrelated audio signals can be selected in dependence on a bitstream variable.

Energy compensation mode uses the method described in section 14.4.2, limited covariance adjustment mode uses the method described in section 14.4.1, and general covariance adjustment mode uses the method described in section 14.3.

Taking reference now to FIG. 27, which shows, in the form of a table representation, how different decorrelation levels can be signaled by the bitstream variable "bsDecorrelationLevel", a method for selecting the decorrelation complexity will be described. In other words, said variable can be evaluated by a multi-channel audio decoder comprising the multi-channel decorrelator described above to decide which decorrelation complexity is used. For example, said bitstream parameter may signal different decorrelation "levels" which may be designated with the values: 0, 1, 2 and 3.

An example of decorrelation configurations (which may, for example, be designated as decorrelation levels") is given in the table of FIG. 27. FIG. 27 shows a table representation of a number of decorrelators for different "levels" (e.g., decorrelation levels) and output configurations. In other words, FIG. 27 shows the number K of decorrelator input signals (of the second set of decorrelator input signals), which is used by the multi-channel decorrelator. As can be seen in the table of FIG. 27, a number of (individual) decorrelators used in the multi-channel decorrelator is switched between 11, 9, 7 and 5 for a 22.2 output configuration, in dependence on which "decorrelation level" is signaled by the bitstream parameter "bsDecorrelationLevel". For a 10.1 output configuration, a selection is made between 10, 5, 3 and 2 individual decorrelators, for an 8.1 configuration, a selection is made between 8, 4, 3 or 2 individual decorrelators, and for a 7.1 output configuration, a selection is made between 7, 4, 3 and 2 decorrelators in dependence on the "decorrelation level" signaled by said bitstream parameter. In the 5.1 output configuration, there are only three valid options for the numbers of individual decorrelators, namely 5, 3, or 2. For the 2.1 output configuration, there is only a choice between two individual decorrelators (decorrelation level 0) and one individual decorrelator (decorrelation level 1).

To summarize, the decorrelation method can be determined at the decoder side based on the computational power and an available number of decorrelators. In addition, selection of the number of decorrelators may be made at the encoder side and signaled using a bitstream parameter.

Accordingly, both the method how the decorrelated audio signals are applied, to obtain the output audio signals, and the complexity for the provision of the decorrelated signals can be controlled from the side of an audio encoder using the bitstream parameters shown in FIG. 25 and defined in more detail in FIGS. 26 and 27.

18. Fields of Application for the Inventive Processing

It should be noted that it is one of the purposes of the introduced methods to restore audio cues, which are of greater importance for human perception of an audio scene.

Embodiments according to the invention improve a reconstruction accuracy of energy level and correlation properties and therefore increase perceptual audio quality of the final output signal. Embodiments according to the invention can be applied for an arbitrary number of downmix/upmix channels. Moreover, the methods and apparatuses described herein can be combined with existing parametric source separation algorithms. Embodiments according to the invention allow to control computational complexity of the system by setting restrictions on the number of applied decorrelator functions. Embodiments according to the invention can lead to a simplification of the object-based parametric construction algorithms like SAOC by removing an MPS transcoding step.

19. Encoding/Decoding Environment

In the following, an audio encoding/decoding environment will be described in which concepts according to the present invention can be applied.

A 3D audio codec system, in which concepts according to the present invention can be used, is based on an MPEG-D USAC codec for coding of channel and object signals to increase the efficiency for coding a large amount of objects. MPEG-SAOC technology has been adapted. Three types of renderers perform the tasks of rendering objects to channels, rendering channels to headphones or rendering channels to different loudspeaker setups. When object signals are explicitly transmitted or parametrically encoded using SAOC, the corresponding object metadata information is compressed and multiplexed into the 3D audio stream.

Figure 28:
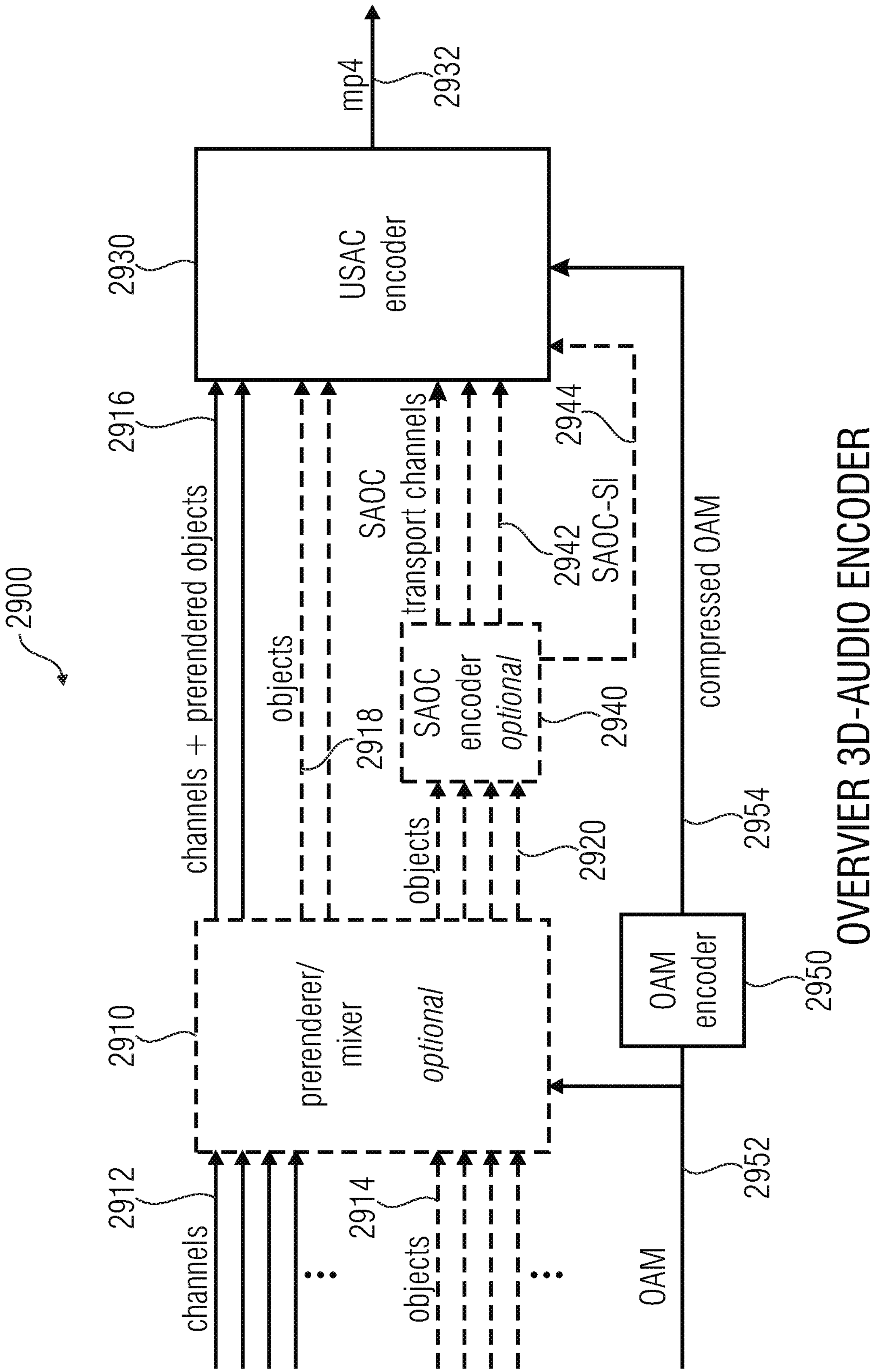
FIG. 28 shows, in the form of a block schematic diagram, an overview over a 3D audio encoder.
Figure 29:
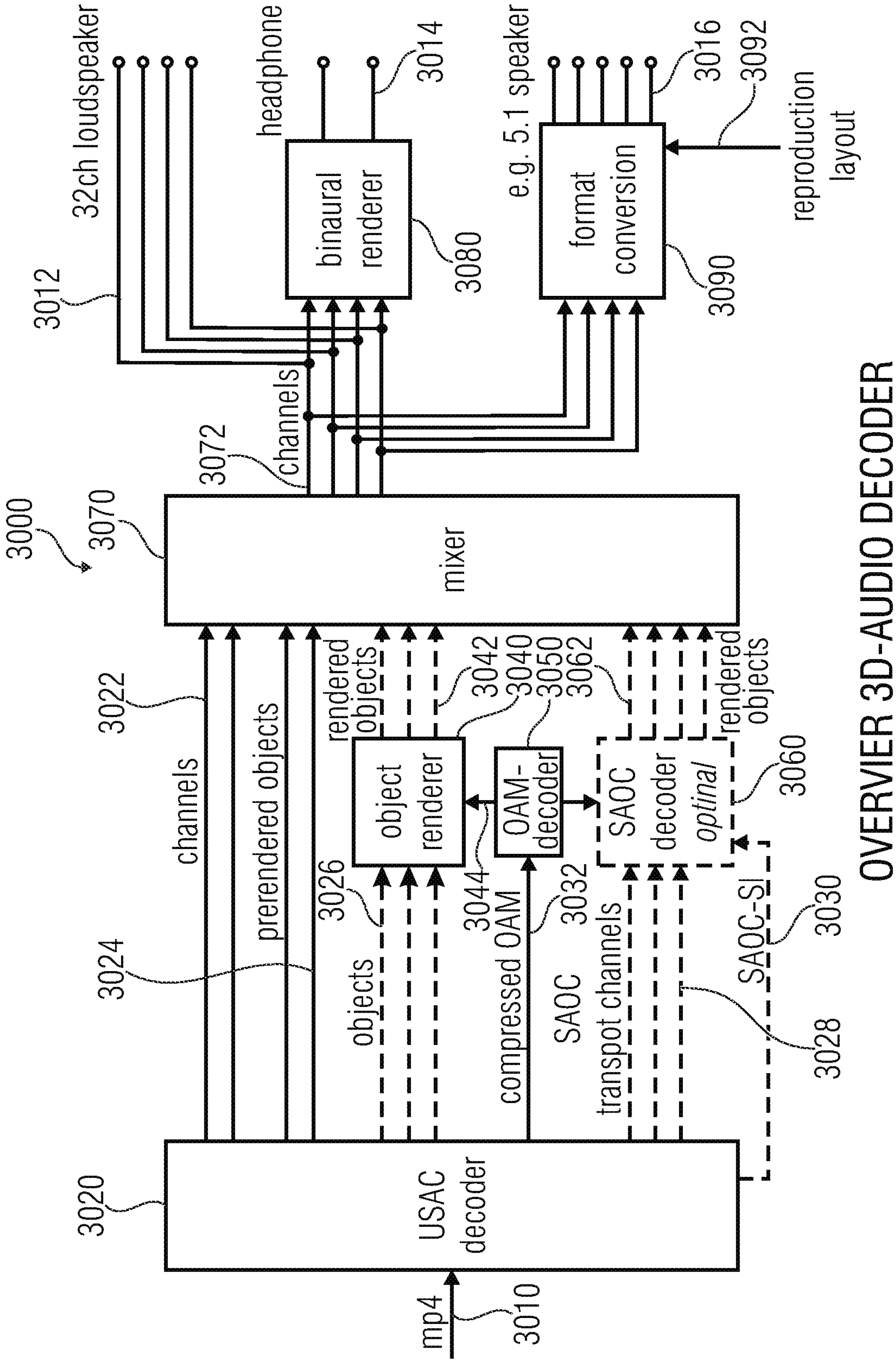
FIG. 29 shows, in the form of a block schematic diagram, an overview over a 3D audio decoder.
Figure 30:
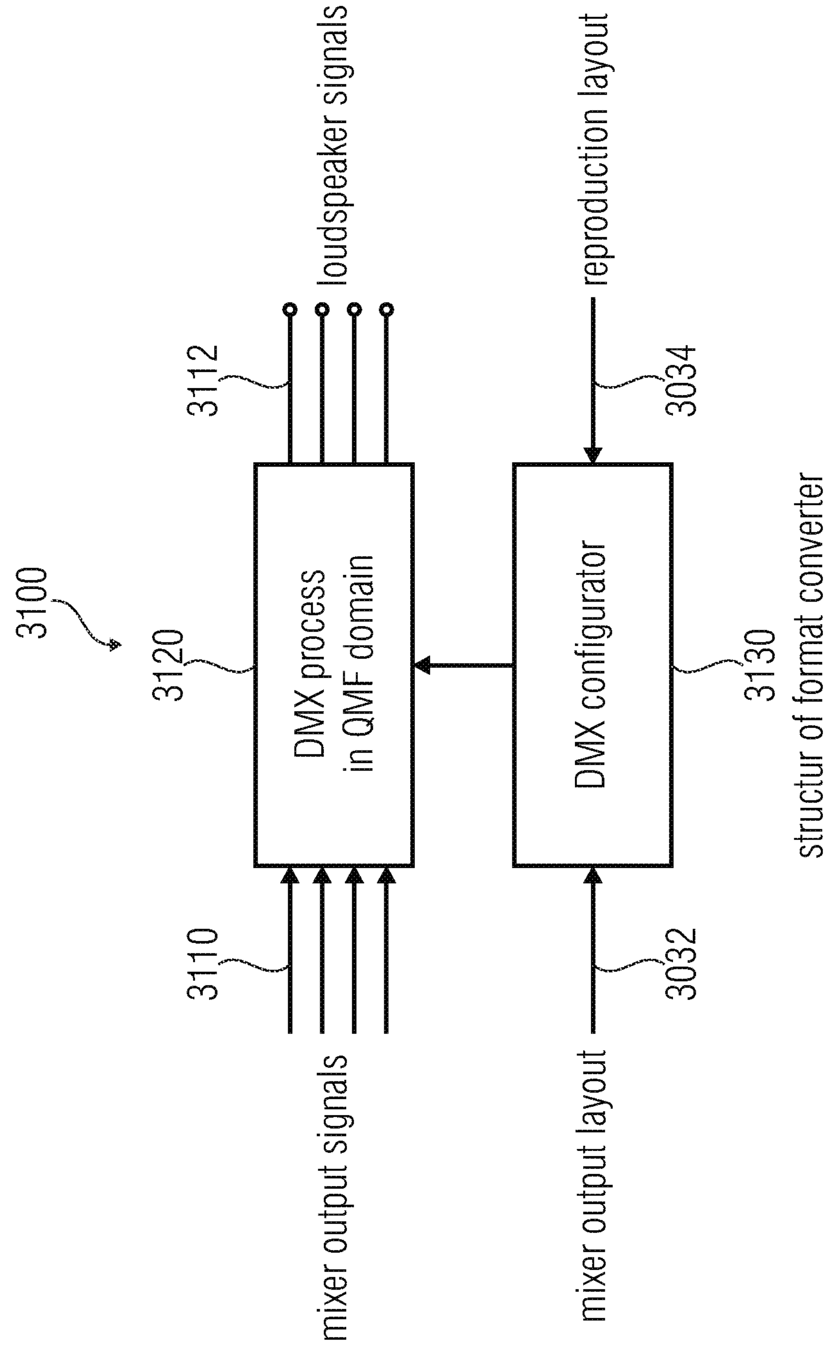
FIG. 30 shows a block schematic diagram of a structure of a format converter.

FIGS. 28, 29 and 30 show the different algorithmic blocks of the 3D audio system.

FIG. 28 shows a block schematic diagram of such an audio encoder, and FIG. 29 shows a block schematic diagram of such an audio decoder. In other words, FIGS. 28 and 29 show the different algorithm blocks of the 3D audio system.

Taking reference now to FIG. 28, which shows a block schematic diagram of a 3D audio encoder 2900, some details will be explained. The encoder 2900 comprises an optional pre-renderer/mixer 2910, which receives one or more channel signals 2912 and one or more object signals 2914 and provides, on the basis thereof, one or more channel signals 2916 as well as one or more object signals 2918, 2920. The audio encoder also comprises an USAC encoder 2930 and optionally an SAOC encoder 2940. The SAOC encoder 2940 is configured to provide one or more SAOC transport channels 2942 and a SAOC side information 2944 on the basis of one or more objects 2920 provided to the SAOC encoder. Moreover, the USAC encoder 2930 is configured to receive the channel signals 2916 comprising channels and pre-rendered objects from the pre-renderer/mixer 2910, to receive one or more object signals 2918 from the pre-renderer/mixer 2910, and to receive one or more SAOC transport channels 2942 and SAOC side information 2944, and provides, on the basis thereof, an encoded representation 2932. Moreover, the audio encoder 2900 also comprises an object metadata encoder 2950 which is configured to receive object metadata 2952 (which may be evaluated by the pre-renderer/mixer 2910) and to encode the object metadata to obtain encoded object metadata 2954. Encoded metadata is also received by the USAC encoder 2930 and used to provide the encoded representation 2932.

Some details regarding the individual components of the audio encoder 2900 will be described below.

Taking reference now to FIG. 29, an audio decoder 3000 will be described. The audio decoder 3000 is configured to receive an encoded representation 3010 and to provide, on the basis thereof, a multi-channel loudspeaker signal 3012, headphone signals 3014 and/or loudspeaker signals 3016 in an alternative format (for example, in a 5.1 format). The audio decoder 3000 comprises a USAC decoder 3020, which provides one or more channel signals 3022, one or more pre-rendered object signals 3024, one or more object signals 3026, one or more SAOC transport channels 3028, a SAOC side information 3030 and a compressed object metadata information 3032 on the basis of the encoded representation 3010. The audio decoder 3000 also comprises an object renderer 3040, which is configured to provide one or more rendered object signals 3042 on the basis of the one or more object signals 3026 and an object metadata information 3044, wherein the object metadata information 3044 is provided by an object metadata decoder 3050 on the basis of the compressed object metadata information 3032. The audio decoder 3000 also comprises, optionally, an SAOC decoder 3060, which is configured to receive the SAOC transport channel 3028 and the SAOC side information 3030, and to provide, on the basis thereof, one or more rendered object signals 3062. The audio decoder 3000 also comprises a mixer 3070, which is configured to receive the channel signals 3022, the pre-rendered object signals 3024, the rendered object signals 3042 and the rendered object signals 3062, and to provide, on the basis thereof, a plurality of mixed channel signals 3072, which may, for example, constitute the multi-channel loudspeaker signals 3012. The audio decoder 3000 may, for example, also comprise a binaural renderer 3080, which is configured to receive the mixed channel signals 3072 and to provide, on the basis thereof, the headphone signals 3014. Moreover, the audio decoder 3000 may comprise a format conversion 3090, which is configured to receive the mixed channel signals 3072 and a reproduction layout information 3092 and to provide, on the basis thereof, a loudspeaker signal 3016 for an alternative loudspeaker setup.

In the following, some details regarding the components of the audio encoder 2900 and of the audio decoder 3000 will be described.

19.1. Pre-Renderer/Mixer

The pre-renderer/mixer 2910 can be optionally used to convert a channel plus object input scene into a channel scene before encoding. Functionally, it may, for example, be identical to the object renderer/mixer described below.

Pre-rendering of objects may, for example, ensure a deterministic signal entropy at the encoder input that is basically independent of the number of simultaneously active object signals.

With pre-rendering of objects, no object metadata transmission is necessitated.

Discrete object signals are rendered to the channel layout that the encoder is configured to use, the weights of the objects for each channel are obtained from the associated object metadata (OAM) 1952.

19.2. USAC Core Codec

The core codec 2930, 3020 for loudspeaker-channel signals, discrete object signals, object downmix signals and pre-rendered signals is based on MPEG-D USAC technology. It handles decoding of the multitude of signals by creating channel- and object-mapping information based on the geometric and semantic information of the input channel and object assignment. This mapping information describes, how input channels and objects are mapped to USAC channel elements (CPEs, SCEs, LFEs) and the corresponding information is transmitted to the decoder.

All additional payloads like SAOC data or object metadata have been passed through extension elements and have been considered in the encoders rate control. Decoding of objects is possible in different ways, dependent on the rate/distortion requirements and the interactivity requirements for the renderer. The following object coding variants are possible:

Pre-rendered objects: object signals are pre-rendered and mixed to the 22.2 channel signals before encoding. The subsequent coding chain sees 22.2 channel signals.

Discrete object waveforms: objects as applied as monophonic waveforms to the encoder. The encoder uses single channel elements SCEs to transmit the objects in addition to the channel signals. The decoded objects are rendered and mixed at the receiver side. Compressed object metadata information is transmitted to the receiver/renderer alongside.

Parametric object waveforms: object properties and their relation to each other are described by means of SAOC parameters. The downmix of the object signals is coded with USAC. The parametric information is transmitted alongside. The number of downmix channels is chosen depending on the number of objects and the overall data rate. Compressed object metadata information is transmitted to the SAOC renderer.

19.3. SAOC

The SAOC encoder 2940 and the SAOC decoder 3060 for object signals are based on MPEG SAOC technology. The system is capable of recreating, modifying and rendering a number of audio objects based on a smaller number of transmitted channels and additional parametric data (object level differences OLDs, inter-object correlations IOCs, downmix gains DMGs). The additional parametric data exhibits a significantly lower data rate than necessitated for transmitted all objects individually, making decoding very efficient. The SAOC encoder takes as input the object/channel signals as monophonic waveforms and outputs the parametric information (which is packed into the 3D audio bitstream 2932, 3010) and the SAOC transport channels (which are encoded using single channel elements and transmitted). The SAOC decoder 3000 reconstructs the object/channel signals from the decoded SAOC transport channels 3028 and parametric information 3030, and generates the output audio scene based on the reproduction layout, the decompressed object metadata information and optionally on the user interaction information.

19.4. Object Metadata Codec

For each object, the associated metadata that specifies the geometrical position and volume of the object in 3D space is efficiently coded by quantization of the object properties in time and space. The compressed object metadata cOAM 2954, 3032 is transmitted to the receiver as side information.

19.5. Object Renderer/Mixer

The object renderer utilizes the decompressed object metadata OAM 3044 to generate object waveforms according to the given reproduction format. Each object is rendered to certain output channels according to its metadata. The output of this block results from the sum of the partial results.

If both channel based content as well as discrete/parametric objects are decoded, the channel based waveforms and the rendered object waveforms are mixed before outputting the resulting waveforms (or before feeding them to a post-processor module like the binaural renderer or the loudspeaker renderer module).

19.6. Binaural Renderer

The binaural renderer module 3080 produces a binaural downmix of the multi-channel audio material, such that each input channel is represented by a virtual sound source. The processing is conducted frame-wise in QMF domain. The binauralization is based on measured binaural room impulse responses.

19.7. Loudspeaker Renderer/Format Conversion

The loudspeaker renderer 3090 converts between the transmitted channel configuration and the desired reproduction format. It is thus called "format converter" in the following. The format converter performs conversions to lower numbers of output channels, i.e. it creates downmixes. The system automatically generates optimized downmix matrices for the given combination of input and output formats and applies these matrices in a downmix process. The format converter allows for standard loudspeaker configurations as well as for random configurations with non-standard loudspeaker positions.

FIG. 30 shows a block schematic diagram of a format converter. In other words, FIG. 30 shows the structure of the format converter.

As can be seen, the format converter 3100 receives mixer output signals 3110, for example the mixed channel signals 3072, and provides loudspeaker signals 3112, for example the speaker signals 3016. The format converter comprises a downmix process 3120 in the QMF domain and a downmix configurator 3130, wherein the downmix configurator provides configuration information for the downmix process 3020 on the basis of a mixer output layout information 3032 and a reproduction layout information 3034.

19.8. General Remarks

Moreover, it should be noted that the concepts described herein, for example, the audio decoder 100, the audio encoder 200, the multi-channel decorrelator 600, the multi-channel audio decoder 700, the audio encoder 800 or the audio decoder 1550 can be used within the audio encoder 2900 and/or within the audio decoder 3000. For example, the audio encoders/decoders mentioned above may be used as part of the SAOC encoder 2940 and/or as a part of the SAOC decoder 3060. However, the concepts mentioned above may also be used at other positions of the 3D audio decoder 3000 and/or of the audio encoder 2900.

Naturally, the methods mentioned above may also be used in concepts for encoding or decoding audio information according to FIGS. 28 and 29.

20. Additional Embodiment 20.1 Introduction

In the following, another embodiment according to the present invention will be described.

Figures 31, 32:
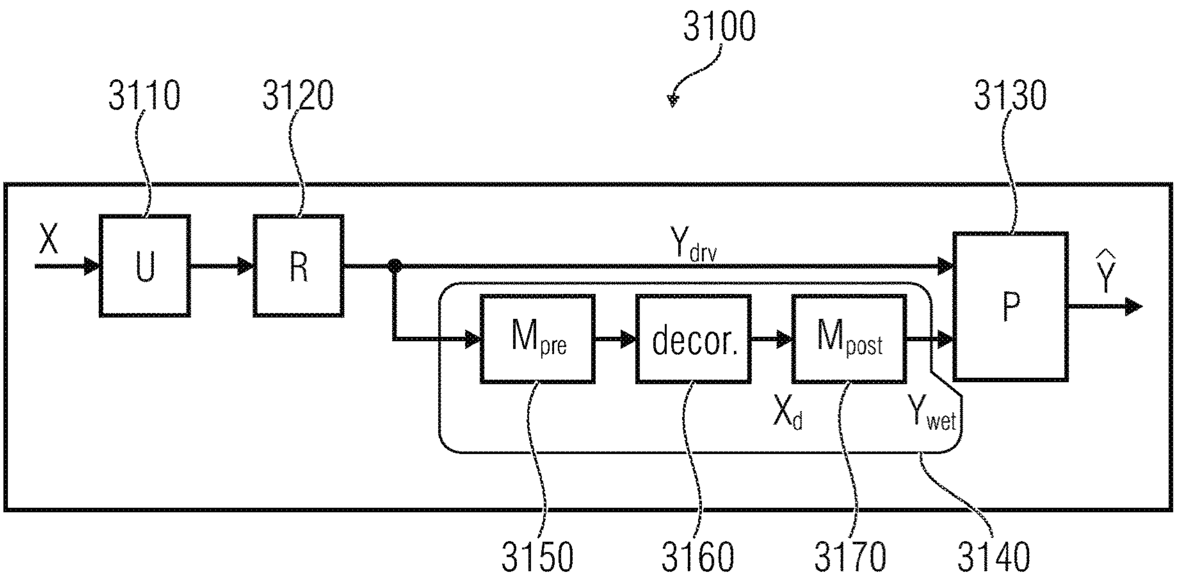
FIG. 31 shows a block schematic diagram of a downmix processor, according to an embodiment of the present invention.
FIG. 32 shows a table representing decoding modes for different number of SAOC downmix objects.

FIG. 31 shows a block schematic diagram of a downmix processor, according to an embodiment of the present invention.

The downmix processor 3100 comprises an unmixer 3110, a renderer 3120, a combiner 3130 and a multi-channel decorrelator 3140. The renderer provides rendered audio signals $Y_{dry}$ to the combiner 3130 and to the multichannel decorrelator 3140. The multichannel decorrelator comprises a premixer 3150, which receives the rendered audio signals (which may be considered as a first set of decorrelator input signals) and provides, on the basis thereof, a premixed second set of decorrelator input signals to a decorrelator core 3160. The decorrelator core provides a first set of decorrelator output signals on the basis of the second set of decorrelator input signals for usage by a postmixer 3170. the postmixer postmixes (or upmixes) the decorrelator output signals provided by the decorrelator core 3160, to obtain a postmixed second set of decorrelator output signals, which is provided to the combiner 3130.

The renderer 3130 may, for example, apply a matrix R for the rendering, the premixer may, for example, apply a matrix $M_{pre}$ for the premixing, the postmixer may, for example, apply a matrix $M_{post}$ for the postmixing, and the combiner may, for example, apply a matrix P for the combining.

It should be noted that the downmix processor 3100, or individual components or functionalities thereof, may be used in the audio decoders described herein. Moreover, it should be noted that the downmix processor may be supplemented by any of the features and functionalities described herein.

20.2 SAOC 3D Processing

The hybrid filterbank described in ISO/IEC 23003-1:2007 is applied. The dequantization of the DMG, OLD, IOC parameters follows the same rules as defined in 7.1.2 of ISO/IEC 23003-2:2010.

20.2.1 Signals and Parameters

The audio signals are defined for every time slot n and every hybrid subband k. The corresponding SAOC 3D parameters are defined for each parameter time slot l and processing band m. The subsequent mapping between the hybrid and parameter domain is specified by Table A.31 of ISO/IEC 23003-1:2007. Hence, all calculations are performed with respect to the certain time/band indices and the corresponding dimensionalities are implied for each introduced variable.

The data available at the SAOC 3D decoder consists of the multi-channel downmix signal X, the covariance matrix E, the rendering matrix R and downmix matrix D.

20.2.1.1 Object Parameters

The covariance matrix E of size N×N with elements $e_{i,j}$ represents an approximation of the original signal covariance matrix E≈SS* and is obtained from the OLD and IOC parameters as:

$$e_{i,j} = \sqrt{OLD_i OLD_j}\, IOC_{i,j},$$

Here, the dequantized object parameters are obtained as:

$$OLD_i = D_{OLD}(i, 1, m),\ IOC_{i,j} = D_{IOC}(i, j, l, m).$$

20.2.1.3 Downmix Matrix

The downmix matrix D applied to the input audio signals S determines the downmix signal as X=DS. The downmix matrix D of size $N_{dmx}$×N is obtained as:

$$D = D_{dmx} D_{premix}.$$

The matrix $D_{dmx}$ and matrix $D_{premix}$ have different sizes depending on the processing mode. The matrix $D_{dmx}$ is obtained from the DMG parameters as:

$$d_{i,j} = \begin{cases} 0, & \text{if no } DMG \text{ data for } (i, j) \text{ is present in the bitstream} \\ 10^{0.05\, DMG_{i,j}}, & \text{otherwise} \end{cases}.$$

Here, the dequantized downmix parameters are obtained as:

$$DMG_{i,j} = D_{DMG}(i, j, l).$$

20.2.1.3.1 Direct Mode

In case of direct mode, no premixing is used. The matrix $D_{premix}$ has the size N×N and is given by: $D_{premix}$=I. The matrix $D_{dmx}$ has size $N_{dmx}$×N and is obtained from the DMG parameters according to 20.2.1.3.

20.2.1.3.2 Premixing Mode

In case of premixing mode the matrix $D_{premix}$ has size ($N_{ch}$+$N_{premix}$)×N and is given by:

$$D_{premix} = \begin{pmatrix} I & 0 \\ 0 & A \end{pmatrix},$$

where the premixing matrix A of size $N_{premix}$×$N_{obj}$ is received as an input to the SAOC 3D decoder, from the object renderer.

The matrix $D_{dmx}$ has size $N_{dmx}$×($N_{ch}$+$N_{premix}$) and is obtained from the DMG parameters according to 20.2.1.3

2.2.1.2 Rendering Matrix

The rendering matrix R applied to the input audio signals S determines the target rendered output as Y=RS. The rendering matrix R of size $N_{out}$×N is given by $$R = (R_{ch}\ R_{obj}),$$

where $R_{ch}$ of size $N_{out}$×$N_{ch}$ represents the rendering matrix associated with the input channels and $R_{obj}$ of size $N_{out}$×$N_{obj}$ represents the rendering matrix associated with the input objects.

20.2.1.4 Target Output Covariance Matrix

The covariance matrix c of size $N_{out}$×$N_{out}$ with elements $c_{i,j}$ represents an approximation of the target output signal covariance matrix C≈YY* and is obtained from the covariance matrix E and the rendering matrix R:

$$C = RER^*.$$

20.2.2 Decoding

The method for obtaining an output signal using SAOC 3D parameters and rendering information is described. The SAOC 3D decoder my, for example, and consist of the SAOC 3D parameter processor and the SAOC 3D downmix processor.

20.2.2.1 Downmix Processor

The output signal of the downmix processor (represented in the hybrid QMF domain) is fed into the corresponding synthesis filterbank as described in ISO/IEC 23003-1:2007 yielding the final output of the SAOC 3D decoder. A detailed structure of the downmix processor is depicted in FIG. 31

The output signal $\hat{Y}$ is computed from the multi-channel downmix signal X and the decorrelated multi-channel signal $X_d$ as:

$$\hat{Y} = P_{dry}RUX + P_{wet}M_{post}X_d,$$

where U represents the parametric unmixing matrix and is defined in 20.2.2.1.1 and 20.2.2.1.2.

The decorrelated multi-channel signal $X_d$ is computed according to 20.2.3.

$$X_d = decorrFunc(M_{pre}Y_{dry}).$$

The mixing matrix $P=(P_{dry}\ P_{wet})$ is described in 20.2.3. The matrices $M_{pre}$ for different output configuration are given in FIGS. 19 to 23 and the matrices $M_{post}$ are obtained using the following equation:

$$M_{post} = M_{pre}^*\left(M_{pre}M_{pre}^*\right)^{-1}.$$

The decoding mode is controlled by the bitstream element bsNumSaocDmxObjects, as shown in FIG. 32.

20.2.2.1.1 Combined Decoding Mode

In case of combined decoding mode the parametric unmixing matrix u is given by:

$$U = ED^*J.$$

The matrix J of size $N_{dmx}\times N_{dmx}$ is given by $J\approx\Delta^{-1}$ with $\Delta=DED^*$.

20.2.2.1.2 Independent Decoding Mode

In case of independent decoding mode the unmixing matrix u is given by:

$$U = \begin{pmatrix} U_{ch} & 0 \\ 0 & U_{obj} \end{pmatrix}, \text{ where}$$

$$U_{ch} = E_{ch}D_{ch}^*J_{ch} \text{ and } U_{obj} = E_{obj}D_{obj}^*J_{obj}.$$

The channel based covariance matrix $E_{ch}$ of size $N_{ch}\times N_{ch}$ and the object based covariance matrix $E_{obj}$ of size $N_{obj}\times N_{obj}$ are obtained from the covariance matrix E by selecting only the corresponding diagonal blocks:

$$E = \begin{pmatrix} E_{cb} & E_{ch,obj} \\ E_{obj,ch} & E_{obj} \end{pmatrix},$$

where the matrix $E_{ch,obj}=(E_{obj,ch})^*$ represents the cross-covariance matrix between the input channels and input objects and is not required to be calculated.

The channel based downmix matrix $D_{ch}$ of size $$N_{ch}^{dmx}\times N_{ch}$$

and the object based downmix matrix $D_{obj}$ of size $$N_{obj}^{dmx}\times N_{obj}$$

are obtained from the downmix matrix D by selecting only the corresponding diagonal blocks:

$$D = \begin{pmatrix} D_{ch} & 0 \\ 0 & D_{obj} \end{pmatrix}.$$

The matrix $$J_{ch} \approx (D_{ch}E_{ch}D_{ch}^*)^{-1}$$

of size $$N_{ch}^{dmx}\times N_{ch}^{dmx}$$

is derived accordingly to 20.2.2.1.4 for $$\Delta = D_{ch}E_{ch}D_{ch}^*.$$

The matrix $$J_{obj} \approx \left(D_{obj}E_{obj}D_{obj}^*\right)^{-1}$$

of size $$N_{obj}^{dmx}\times N_{obj}^{dmx}$$

is derived accordingly to 20.2.2.1.4 for $$\Delta = D_{obj}E_{obj}D_{obj}^*.$$

20.2.2.1.4 Calculation of Matrix J

The matrix $J \approx \Delta^{-1}$ is calculated using the following equation:

$$J = V\Lambda^{inv}V^*.$$

Here the singular vector V of the matrix Δ are obtained using the following characteristic equation:

$$V\Lambda V^* = \Delta.$$

The regularized inverse $\Lambda^{inv}$ of the diagonal singular value matrix Λ is computed as $$\lambda_{i,j}^{inv} = \begin{cases} \frac{1}{\lambda_{i,j}}, & \text{if } i = j \text{ and } \lambda_{i,j} \geq T_{reg}^{\Lambda} \\ 0, & \text{otherwise} \end{cases},$$

The relative regularization scalar $$T_{reg}^{\Lambda}$$

is determined using absolute threshold $T_{reg}$ and maximal value of Λ as $$T_{reg}^{\Lambda} = \max(\lambda_{i,i})T_{reg},\ T_{reg} = 10^{-2}.$$

20.2.3. Decorrelation

The decorrelated signals $X_d$ are created from the decorrelator described in 6.6.2 of ISO/IEC 23003-1:2007, with bsDecorrConfig==0 and a decorrelator index, X, according to tables in FIGS. 19 to 24. Hence, the decorrFunc( ) denotes the decorrelation process:

$$X_d = decorrFunc(M_{pre}Y_{dry}).$$

20.2.4. Mixing Matrix P

The calculation of mixing matrix $P=(P_{dry}\ P_{wet})$ is controlled by the bitstream element bsDecorrelationMethod. The matrix P has size $N_{out}\times 2N_{out}$ and the $P_{dry}$ and $P_{wet}$ have both the size $N_{out}\times N_{out}$.

20.2.4.1 Energy Compensation Mode

The energy compensation mode uses decorrelated signals to compensate for the loss of energy in the parametric reconstruction. The mixing matrices $P_{dry}$ and $P_{wet}$ are given by:

$$P_{dry} = I,$$

$$p_{i,j}^{wet} = \begin{cases} \sqrt{\min\left(\lambda_{Dec}, \max\left(0, \frac{C(i,j) - E_Y^{dry}(i,i)}{\max(\varepsilon, E_Y^{wet}(i,i))}\right)\right)} & i = j, \\ 0 & i \neq j \end{cases}.$$

where $\lambda_{Dec}=4$ is a constant used to limit the amount of decorrelated component added to the output signals.

20.2.4.2 Limited Covariance Adjustment Mode

The limited covariance adjustment mode ensures that the covariance matrix of the mixed decorrelated signals $P_{wet}Y_{dry}$ approximates the difference covariance matrix $$\Delta_E : P_{wet}E_Y^{wet}P_{wet}^* \approx \Delta_E.$$

The mixing matrices $P_{dry}$ and $P_{wet}$ are defined using the following equations:

$$P_{dry} = I,$$

$$P_{wet} = \left(V_1\sqrt{Q_1}\,V_1^*\right)\left(V_2\sqrt{Q_2^{inv}}\,V_2^*\right),$$

where the regularized inverse $$Q_2^{inv}$$

of the diagonal singular value matrix $Q_2$ is computed as $$Q_2^{inv}(i,j) = \begin{cases} \frac{1}{Q_2(i,j)}, & \text{if } i = j \text{ and } Q_2(i,j) \geq T_{reg}^{\Lambda}, \\ 0, & \text{otherwise} \end{cases},$$

The relative regularization scalar $$T_{reg}^{\Lambda}$$

is determined using absolute threshold $T_{reg}$ and maximal value of $$Q_2^{inv}$$

as $$T_{reg}^{\Lambda} = \max\left(Q_2^{inv}(i,i)\right)T_{reg},\ T_{reg} = 10^{-2}.$$

The matrix $\Delta_E$ is decomposed using the Singular Value Decomposition as:

$$\Delta_E = V_1 Q_1 V_1^*.$$

The covariance matrix of the decorrelated signals $$E_Y^{wet}$$

is also expressed using Singular Value Decomposition:

$$E_Y^{wet} = V_2 Q_2 V_2^*.$$

20.2.4.3. General Covariance Adjustment Mode

The general covariance adjustment mode ensures that the covariance matrix of the final output signals $\hat{Y}$ ($E_{\hat{Y}}=\hat{Y}\hat{Y}^*$) approximates the target covariance matrix: $E_{\hat{Y}} \approx C$. The mixing matrix P is defined using the following equation:

$$P = \left(V_1 \sqrt{Q_1} V_1^*\right) H \left(V_2 \sqrt{Q_2^{inv}} V_2^*\right),$$

where the regularized inverse $$Q_2^{inv}$$

of the diagonal singular value matrix $Q_2$ is computed as $$Q_2^{inv}(i, j) = \begin{cases} \frac{1}{Q_2(i, j)}, & \text{if } i = j \text{ and } Q_2(i, j) \geq T_{reg}^{\Lambda}, \\ 0, & \text{otherwise} \end{cases}$$

The relative regularization scalar $$T_{reg}^{\Lambda}$$

is determined using absolute threshold $T_{reg}$ and maximal value of $$Q_2^{inv}$$

as $$T_{reg}^{\Lambda} = \max\left(Q_2^{inv}(i, i)\right) T_{reg}, \; T_{reg} = 10^{-2}.$$

The target covariance matrix C is decomposed using the Singular Value Decomposition as:

$$C = V_1 Q_1 V_1^*.$$

The covariance matrix of the combined signals $$E_Y^{com}$$

is also expressed using Singular Value Decomposition:

$$E_Y^{com} = V_2 Q_2 V_2^*.$$

The matrix H represents a prototype weighting matrix of size ($N_{out} \times 2N_{out}$) and is given by the following equation:

$$H = \begin{pmatrix} 1/\sqrt{2} & 0 & \dots & 0 & 1/\sqrt{2} & 0 & \dots & 0 \\ 0 & 1/\sqrt{2} & \dots & 0 & 0 & 1/\sqrt{2} & \dots & 0 \\ \vdots & \vdots & \ddots & 0 & \vdots & \vdots & \ddots & 0 \\ 0 & 0 & \dots & 1/\sqrt{2} & 0 & 0 & \dots & 1/\sqrt{2} \end{pmatrix}.$$

20.2.4.4 Introduced Covariance Matrices

The matrix $\Delta_E$ represents the difference between the target output covariance matrix C and the covariance matrix $$E_Y^{dry}$$

of the parametrically reconstructed signals and is given by:

$$\Delta_E = C - E_Y^{dry}.$$

The matrix $$E_Y^{dry}$$

represents the covariance matrix of the parametrically estimated signals $$E_Y^{dry} \approx Y_{dry} Y_{dry}^*$$

and is defined using the following equation:

$$E_Y^{dry} = RUEU^*R^*.$$

The matrix $$E_Y^{wet}$$

represents the covariance matrix of the decorrelated signals $$E_Y^{wet} \approx Y_{wet} Y_{wet}^*$$

and is defined using the following equation:

$$E_Y^{wet} = M_{post}\left[matdiag\left(M_{pre} E_Y^{dry} M_{pre}^*\right)\right] M_{post}^*.$$

Considering the signal $Y_{com}$ consisting of the combination of the parametric estimated and decorrelated signals:

$$Y_{com} = \begin{pmatrix} Y_{dry} \\ Y_{wet} \end{pmatrix},$$

the covariance matrix of $Y_{com}$ is defined by the following equation:

$$E_Y^{com} = \begin{pmatrix} E_Y^{dry} & 0 \\ 0 & E_Y^{wet} \end{pmatrix},$$

21. Implementation Alternatives

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

The inventive encoded audio signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[BCC] C. Faller and F. Baumgarte, "Binaural Cue Coding—Part II: Schemes and applications," IEEE Trans. on Speech and Audio Proc., vol. 11, no. 6, November 2003.

[Blauert] J. Blauert, "Spatial Hearing—The Psychophysics of Human Sound Localization", Revised Edition, The MIT Press, London, 1997.

[JSC] C. Faller, "Parametric Joint-Coding of Audio Sources", 120th AES Convention, Paris, 2006.

[ISS1] M. Parvaix and L. Girin: "Informed Source Separation of underdetermined instantaneous Stereo Mixtures using Source Index Embedding", IEEE ICASSP, 2010.

[ISS2] M. Parvaix, L. Girin, J.-M. Brossier: "A watermarking-based method for informed source separation of audio signals with a single sensor", IEEE Transactions on Audio, Speech and Language Processing, 2010.

[ISS3] A. Liutkus and J. Pinel and R. Badeau and L. Girin and G. Richard: "Informed source separation through spectrogram coding and data embedding", Signal Processing Journal, 2011.

[ISS4] A. Ozerov, A. Liutkus, R. Badeau, G. Richard: "Informed source separation: source coding meets source separation", IEEE Workshop on Applications of Signal Processing to Audio and Acoustics, 2011.

[ISS5] S. Zhang and L. Girin: "An Informed Source Separation System for Speech Signals", INTERSPEECH, 2011.

[ISS6] L. Girin and J. Pinel: "Informed Audio Source Separation from Compressed Linear Stereo Mixtures", AES 42nd International Conference: Semantic Audio, 2011.

[MPS] ISO/IEC, "Information technology—MPEG audio technologies—Part 1: MPEG Surround," ISO/IEC JTC1/SC29/WG11 (MPEG) international Standard 23003-1: 2006.

[OCD] J. Vilkamo, T. Bäckström, and A. Kuntz. "Optimized covariance domain framework for time-frequency processing of spatial audio", Journal of the Audio Engineering Society, 2013. in press.

[SAOC1] J. Herre, S. Disch, J. Hilpert, O. Hellmuth: "From SAC To SAOC—Recent Developments in Parametric Coding of Spatial Audio", 22nd Regional UK AES Conference, Cambridge, UK, April 2007.

[SAOC2] J. EngdegArd, B. Resch, C. Falch, O. Hellmuth, J. Hilpert, A. Hölzer, L. Terentiev, J. Breebaart, J. Koppens, E. Schuijers and W. Oomen: "Spatial Audio Object Coding (SAOC)—The Upcoming MPEG Standard on Parametric Object Based Audio Coding", 124th AES Convention, Amsterdam 2008.

[SAOC] ISO/IEC, "MPEG audio technologies—Part 2: Spatial Audio Object Coding (SAOC)," ISO/IEC JTC1/SC29/WG11 (MPEG) International Standard 23003-2.

International Patent No. WO/2006/026452, "MULTI-CHANNEL DECORRELATION IN SPATIAL AUDIO CODING" issued on 9 Mar. 2006.

The invention claimed is:

1. A multi-channel decorrelator for processing a plurality of decorrelator input audio signals, wherein the multi-channel decorrelator is configured to premix a first set of N decorrelator input audio signals into a second set of K decorrelator input audio signals;

wherein the multi-channel decorrelator is configured to provide a first set of K' decorrelator output audio signals on the basis of the second set of K decorrelator input audio signals; and wherein the multi-channel decorrelator is configured to upmix the first set of K' decorrelator output audio signals into a second set of N' decorrelator output audio signals, wherein N'>K';

wherein the multi-channel decorrelator is configured to receive an information about a rendering configuration associated with channel signals of the first set of N decorrelator input audio signals, and wherein the multi-channel decorrelator is configured to select a premixing matrix in dependence on the information about the rendering configuration;

wherein the information about the rendering configuration describes an association of the channel signals of the first set of N decorrelator input audio signals with loudspeaker positions.

2. The multi-channel decorrelator according to claim 1, wherein K=K'.

3. The multi-channel decorrelator according to claim 1, wherein N=N'.

4. The multi-channel decorrelator according to claim 1, wherein N>=3 and N'>=3.

5. The multi-channel decorrelator according to claim 1, wherein the multi-channel decorrelator is configured to premix the first set Z of N decorrelator input audio signals into the second set $\hat{Z}_{mix}$ of K decorrelator input audio signals using a premixing matrix $M_{pre}$ according to $$\hat{Z}_{mix} = M_{pre}\hat{Z}$$

wherein the multi-channel decorrelator is configured to acquire the first set $$\hat{Z}_{mix}^{dec}$$

of K' decorrelator output audio signals on the basis of the second set $\hat{Z}_{mix}$ of K decorrelator input audio signals, and wherein the multi-channel decorrelator is configured to upmix the first set $$\hat{Z}_{mix}^{dec}$$

of K' decorrelator output audio signals into the second set W of N' decorrelator output audio signals using a postmixing matrix $M_{post}$ according to $$W = M_{post}\hat{Z}_{mix}^{dec}.$$

6. A method for processing a plurality of decorrelator input audio signals, the method comprising:

premixing a first set of N decorrelator input audio signals into a second set of K decorrelator input audio signals;

providing a first set of K' decorrelator output audio signals on the basis of the second set of K decorrelator input audio signals; and upmixing the first set of K' decorrelator output audio signals into a second set of N' decorrelator output audio signals, wherein N'>K';

wherein the method comprises receiving an information about a rendering configuration associated with channel signals of the first set of N decorrelator input audio signals, and wherein the method comprises selecting a premixing matrix in dependence on the information about the rendering configuration, wherein the information about the rendering configuration describes an association of the channel signals of the first set of N decorrelator input audio signals with loudspeaker positions.

7. A non-transitory digital storage medium having stored thereon a computer program for performing the method for processing a plurality of decorrelator input audio signals of claim 6, when the computer program is run by a computer.

8. A multi-channel decorrelator for processing a plurality of decorrelator input audio signals, wherein the multi-channel decorrelator is configured to premix a first set of N decorrelator input audio signals into a second set of K decorrelator input audio signals;

wherein the multi-channel decorrelator is configured to provide a first set of K' decorrelator output audio signals on the basis of the second set of K decorrelator input audio signals using a decorrelation functionality; and wherein the multi-channel decorrelator is configured to upmix the first set of K' decorrelator output audio signals into a second set of N' decorrelator output audio signals, wherein N'>K':

wherein the multi-channel decorrelator is configured to receive an information about a mixing configuration associated with channel signals of the first set of N decorrelator input audio signals, and wherein the multi-channel decorrelator is configured to select a premixing matrix in dependence on the information about the mixing configuration, wherein the information about the mixing configuration describes an association of the channel signals of the first set of N decorrelator input audio signals with loudspeaker positions.

9. A multi-channel decorrelator for processing a plurality of decorrelator input audio signals, wherein the multi-channel decorrelator is configured to premix a first set of N decorrelator input audio signals into a second set of K decorrelator input audio signals;

wherein the multi-channel decorrelator is configured to provide a first set of K' decorrelator output audio signals on the basis of the second set of K decorrelator input audio signals; and wherein the multi-channel decorrelator is configured to upmix the first set of K' decorrelator output audio signals into a second set of N' decorrelator output audio signals, wherein N'>K';

wherein the multi-channel decorrelator is configured to receive an information about a rendering configuration associated with channel signals of the first set of N decorrelator input audio signals, and wherein the multi-channel decorrelator is configured to select a premixing matrix in dependence on the information about the rendering configuration;

wherein the information about the rendering configuration describes an association of the channel signals of the first set of N decorrelator input audio signals with loudspeaker positions and an output configuration describing an allocation of output audio signals with spatial positions of the audio scene.

* * * * *